US007974123B2

(12) United States Patent
Yerushalmi et al.

(10) Patent No.: US 7,974,123 B2
(45) Date of Patent: *Jul. 5, 2011

(54) METHOD USING A SYNTHETIC MOLECULAR SPRING DEVICE IN A SYSTEM FOR DYNAMICALLY CONTROLLING A SYSTEM PROPERTY AND A CORRESPONDING SYSTEM THEREOF

(75) Inventors: Roie Yerushalmi, Moshav Kfar Warburg (IL); Avigdor Scherz, Rechovot (IL)

(73) Assignee: Yeda Research and Development Co. Ltd., Rehovot (IL)

(*) Notice: Subject to any disclaimer, the term of this patent is extended or adjusted under 35 U.S.C. 154(b) by 0 days.

This patent is subject to a terminal disclaimer.

(21) Appl. No.: 12/071,710

(22) Filed: Feb. 25, 2008

(65) Prior Publication Data

US 2008/0232156 A1    Sep. 25, 2008

Related U.S. Application Data

(63) Continuation-in-part of application No. 10/468,840, filed as application No. PCT/US02/07178 on Mar. 12, 2002, now Pat. No. 7,830,702, application No. 12/071,710, which is a continuation of application No. 10/207,860, filed on Jul. 31, 2002, now abandoned, which is a continuation-in-part of application No. PCT/US02/07178.

(60) Provisional application No. 60/274,635, filed on Mar. 12, 2001.

(51) Int. Cl.
*C07D 487/22* (2006.01)
*G11C 13/00* (2006.01)
*G11C 11/15* (2006.01)

(52) U.S. Cl. ........ 365/173; 365/106; 365/151; 365/153; 540/145

(58) Field of Classification Search .......... 540/145; 365/106, 151, 153, 173
See application file for complete search history.

(56) References Cited

U.S. PATENT DOCUMENTS

| | | | |
|---|---|---|---|
| 3,556,553 A | 1/1971 | Kolbe | |
| 4,412,675 A | 11/1983 | Kawakubo | |
| 4,588,638 A | 5/1986 | Dolinar | |
| 4,848,511 A | 7/1989 | Ohyama et al. | |
| 5,464,987 A | 11/1995 | Ihara et al. | |
| 5,900,405 A | 5/1999 | Urry | |
| 6,212,093 B1 | 4/2001 | Lindsey | |
| 6,243,248 B1 | 6/2001 | Gimzewski et al. | |
| 6,324,091 B1 | 11/2001 | Gryko et al. | |
| 2003/0107927 A1 | 6/2003 | Yerushalmi et al. | |
| 2004/0011821 A1 | 1/2004 | Petit | |
| 2004/0096860 A1 | 5/2004 | Yerushalmi et al. | |

FOREIGN PATENT DOCUMENTS

| | | |
|---|---|---|
| EP | 1215613 | 6/2002 |
| EP | 1368579 | 12/2003 |
| JP | 08-151205 | 6/1996 |
| JP | 2001-39995 | 2/2001 |
| WO | WO 99/40812 | 8/1999 |
| WO | WO 00/22101 | 4/2000 |
| WO | WO 00/44094 | 7/2000 |
| WO | WO 01/44302 | 6/2001 |
| WO | WO 01/49984 | 7/2001 |
| WO | WO 01/81446 | 11/2001 |
| WO | WO 2004/011821 | 2/2004 |

OTHER PUBLICATIONS

Amendola et al. "Molecuar Movements and Translocations Controlled by Transition Metals and Signaled by Light Emission", Structure and Bonding, 99: 80, 2001.
Amendola et al. "Molecular Events Switched by Transition Metals", Coordination Chemistry Reviews, 190-192: 649-669, 1999.
Amendola et al. "Molecular Machines Based on Metal Ion Translocation", Accounts of Chemical Research, 34(6): 488-493, 2001.
Asakawa et al. "Current/Voltage Characteristics of Monolayers of Redox-Switchable [2]Catenanes on Gold", Advanced Materials, 12(15): 1099-1102, 2000.
Asfari et al. "Molecular Machines", Journal of Inclusion Phenomena and Macrocyclic Chemistry, 36: 103-118, 2000.
Ashton et al. "Dual-Mode 'Co-Conformational' Switching in Catenanes Incorporating Bipyridinium and Dialkylammonium Recognition Sites", Chemical European Journal, 7(16): 3482-3493, 2001.
Ballardini et al. "Molecular-Level Artificial Machines Based on Photoinduced Electron-Transfer Processes", Structure & Bonding, 99: 174-183, 2001.
Balzani et al. "Artificial Molecular Machines", Angewandte Chemie, International Edition, 39: 3348-3391, 2000.
Balzani et al. "Photochemistry and Photophysics of Ru(II)-Polypyridine Complexes in the Bologna Group. From Early Studies to Recent Developments", Coordination Chemistry Reviews, 211: 97-115, 2001. Bampos et al. "Metalloporphyrin Oligomers With Collapsible Cavities: Characterisation and Recognition Properties of Individual Atropisomers", Chemical European Journal, 4(2): 335-345, 1998.

(Continued)

Primary Examiner — Paul V. Ward

(57) ABSTRACT

Using a synthetic molecular spring device in a system for dynamically controlling a system property, such as momentum, topography, and electronic behavior. System features (a) the synthetic molecular spring device having (i) at least one synthetic molecular assembly each featuring at least one chemical unit including at least one: (1) atom; (2) complexing group complexed to at least one atom; (3) axial ligand reversibly physicochemically paired with at least one complexed atom; and (4) substantially elastic molecular linker; and, (ii) an activating mechanism directed to at least one atom-axial ligand pair; and, (b) a selected unit operatively coupled to synthetic molecular assembly, and exhibiting the system property. Activating mechanism sends an activating signal to atom-axial ligand pairs, for physicochemically modifying atom-axial ligand pairs, thereby activating at least one cycle of spring-type elastic reversible transitions between contracted and expanded linear conformational states of substantially elastic molecular linkers, causing dynamically controllable change in the system property.

10 Claims, 18 Drawing Sheets

OTHER PUBLICATIONS

Baughman et al. "Conducting Polymer Electromechanical Actuators", Conjugated Polymeric Materials: Opportunities in Electronics, Optoelectronics, and Molecular Electronics, p. 559-582, 1990.
Bissell et al. "A Chemically and Electrochemically Switchable Molecular Shuttle", Nature, 369: 13-137, 1994.
Bredas et al. "Conjugated Polymeric Materials: Opportunities in Electronics, Optoelectronics, and Molecular Electronics", Applied Sciences 182, (1999).
Brouwer et al. "Photoinduction of Fast, Reversible Translational Motion in A Hydrogen-Bonded Molecular Shuttle", Science, 291: 2124-2128, 2001.
Buchler et al. "Oxidation and Reduction of Cerium(IV) Sandwich Complexes With Porphyrin Ligands Linked by Aliphatic Diether Bridges of Variable Chain Length", European Journal of Inorganic Chemistry, p. 445-449, 1998.
Cardenas et al. "Synthesis, X-Ray Structure, and Electrochemical and Exited-State Properties of Multicomponent Made of A [Ru(Tpy)2]2+ Unit Covalently Linked to A [2]-Catenate Moiety. Controlling the Energy-Transfer Direction by Changing the Catenate Metal Ion", Journal of the American Chemical Society, 121: 5481-5488, 1999.
Chia et al. "Working Supramolecular Machines Trapped in Glass and Mounted on A Film Surface", Angewandte Chemie, Internationale Edition, 40(13): 2447-2451, 2001.
Collin et al. "Construction of One-Dimensional Multicomponent Molecular Arrays: Control of Electronic and Molecular Motions", European Journal of Inorganic Chemistry, p. 1-14, 1998.
Collin et al. "Shuttles and Muscles: Linear Molecular Machines Based on Transition Metals", Accounts of Chemical Research, 34(6): 477-487, 2001.
Collman et al. "Synthetic, Electrochemical, Optical, and Conductivity Studies of Coordination Polymers of Iron, Ruthenium, and Osmium Octaethylporphyrin", Journal of the American Chemical Society, 109: 4606-4614, 1987.
Cotton et al. "Supramolecular Arrays Based on Dimetal Building Units", Accounts of Chemical Research, 34(10): 759-771, 2001.
Davis "Synthetic Molecular Motors", Nature, 401: 120-121, 1999.
Feringa "In Control of Molecular Motion", Nature, 408: 151-154, 2000.
Feringa "In Control of Motion: From Molecular Switches to Molecular Motors", Accounts of Chemical Research, 34(6): 504-513, 2001.
Funatsu et al. "Perpendicularly Arranged Ruthenium Porphyrin Dimers and Trimers", Inorganic Chemistry, 36: 1625-1635, 1997.
Gomez-Lopes et al. "The Art and Science of Self-Assembling Molecular Machines", Nanotechnology, 7: 183-192, 1996.
Grund et al. "Resonant Nonlinear Optical Properties of Spin-Cast Films of Soluble Oligomeric Bridged (Phthalocyaninato) Ruthenium(II) Complexes", Journal of Physical Chemistry, 96: 7450-7454, 1992.
Hanack et al. "Synthesis and Properties of Conducting Bridged Macrocyclic Metal Complexes" Institut fuer Organische Chemie, Universität Tübingen, Germany, p. 126, (2000).
Hannak et al. "An Organometallic B12-Rotaxane and A B12-Dimer, Relaxed and Loaded Forms of A Molecular Spring", Journal of the American Chemical Society, 119: 2313-2314, 1997.
Hirsch et al. "Bridged Mixed Valence Phthalocyaninato-Metal Compounds", Conjugated Polymeric Materials: Opportunities in Electronics, Optoelectronics, and Molecular Electronics, p. 163-169, 1990.
Jimenez et al. "Towards Synthetic Molecular Muscles: Contaction and Streching of A Linear Rotaxane Dimer", Angewandte Chemie, Internationale Edition, 39(18): 3284-3287, 2000.
Joachim et al. "An Electrochemical Amplifier Using A Single Molecule", Chemical Physics Letters, 265: 353-357, 1997.
Kahn "Chemistry and Physics of Molecular-Based Polymers Exhibiting A Spontaneous Magnetization", Conjugated Polymeric Materials: Opportunities in Electronics, Optoelectronics, and Molecular Electronics, p. 247-261, 1990.
Kelly "Progress Toward A Rationally Designed Molecular Motor", Accounts of Chemical Research, 34(6): 514-522, 2001.
Kim et al. "Synthesis, Structure, and Modeling of A Cyclic Rhodium(III) Porphyrin Dimer With An Encapsulated 4,4-Bipyridine Ligand", Inorganic Chemistry, 38: 5178-5183, 1999.
Kobel et al. "Bisaxially Coordinated (Phthalocyaninato) Ruthenium(II) Compounds", Inorganic Chemistry, 25: 103-107, 1986.
Kurzweil "The Drexler-Smalley Debate on Molecular Assembly", Kurzweilai.net, p. 1-15, 2003.
Leigh et al. "A Quantum-Mechanical Description of Macrocyclic Ring Rotation in Benzylic Amide[2]Catenanes", Chemical European Journal, 7(7): 1450-1454, 2001.
Lui et al. "Switchable Molecular Devices: From Rotaxanes to Nanoparticles", Structure and Bonding, 99: 141-145, 2001.
Mahadevan et al. "Motility Powered by Supramolecular Springs and Rachets", Science, 288: 95-99, 2000.
Merkle "Molecular Building Blocks and Development Strategies for Molecular Nanotechnology", Nanotechnology, 11: 89-99, 2000.
Nagata et al. "Synthesis and Optical Properties of Conformationally Constrained Trimeric and Pentameric Porphyrin Arrays", Journal of American Chemical Society, 112: 3054-3059, 1990.
Nakash et al. "Product-Induced Distortion of A Metalloporphyrin Host: Implications for Acceleration of Diels-Alder Reactions", Journal of the American Chemical Society, 122: 5286-5293, 2000.
Nakash et al. "Structure-Activity Relationships in the Acceleration of A Hetero Diels-Alder Reaction by Metalloporphyrin Hosts", Journal of Organic Chemistry, 65: 7266-7271, 2000.
Noy et al. "Optical Absorption and Computational Studies of [Ni]-Bacteriochlorophyll-$\alpha$. New Insight Into Charge Distribution Between Metal and Ligands", Journal of the American Chemical Society, 122: 3937-3944, 2000.
Otero et al. "Soft and Wet Conducting Polymers for Artificial Muscles", Advanced Materials, 10(6): 491-494, 1998.
Pease et al. "Computing at the Molecular Level", Structure & Bonding, 99: 224-227, 2001.
Schneider et al. "Phthalocyaninatoeisen mit Pyrazin als zweizähnigem Brückenliganden", Angewandte Chemie, 92(5): 391-393, 1980.
Seki et al. "Photoresponsive Monolayers on Water and Solid Surfaces", Supramolecular Science, 5(3-4): 373-377, 1998.
Tanaka et al. "Clathrate Formation by and Self-Assembled Supramolecular Structures of A 'Molecular Spring'", Chemical Society, Perkin Transactions, 2: 2492-2497, 2000.
Tashiro et al. "A Cyclinc Dimer of Metalloporphyrin Forms A Highly Stable Inclusion Complex With C60", Journal of the American Chemical Society, 121: 9477-9478, 1999.
Tashiro et al. "Metal Bisporphyrinate Double-Decker Complexes as Redox-Responsive Rotating Modules. Studies in Ligand Rotation Activities of the Reduced and Oxidized Forms Using Chirality as A Probe", Journal of the American Chemical Society, 122: 7921-7926, 2000.
Taylor et al. "Cooperative Self-Assembly of Double-Strand Conjugated Porphyrin Ladders", Journal of the American Chemical Society, 121: 11538-11545, 1999.
Tuzun et al. "Dynamics of A Laser Driven Molecular Motor", Nanotechnology, 6: 52-63, 1995.
Venturi et al. "Electrochemistry of Coordination Compounds: An Extended View", Coordination Chemistry Reviews, 185-186: 233-256, 1999.
Willner "Layered Molecular Optoelectronic Assemblies", Journal of Materials Chemistry, 8: 2543-2556, 1998.
Examiner Report Dated Jun. 24, 2008 From the Australian Government Re.: Application No. 2003281730.
Offical Action Dated Aug. 24, 2007 From the US Patent and Trademark Office Re.: U.S. Appl. No. 10/207,860.
Office Action Dated Mar. 7, 2007 From the US Patent and Trademark Office Re.: U.S. Appl. No. 10/207,860.
Offical Action Dated Jul. 10, 2006 From the US Patent and Trademark Office Re.: U.S. Appl. No. 10/207,860.
Supplementary European Search Report Dated Jul. 13, 2005 From the European Patent Office Re.: Application No. 02725096.8.
Communication Pursuant to Article 96(2) EPC Dated Jul. 10, 2006 From the European Patent Office Re.: Application No. 02725096.8.
International Preliminary Examination Report Dated Jun. 19, 2003 From the International Preliminary Examining Authority Re.: Application No. PCT/US02/07178.

International Preliminary Examination Report Dated Apr. 15, 2004 From the International Preliminary Examining Authority Re.: Application No. PCT/IL03/00612.

International Search Report Dated Jan. 30, 2004 From the International Searching Authority Re.: Application No. PCT/IL03/00612.

Offical Action Dated Oct. 20, 2008 From the US Patent and Trademark Office Re.: U.S. Appl. No. 10/468,840.

Response Dated Oct. 14, 2009 to Offical Action of May 14, 2009 from the US Patent and Trademark Office Re.: U.S. Appl. No. 10/468,840.

Communication Pursuant to Article 94(3) EPC Dated Mar. 18, 2010 From the European Patent Office Re.: Application No. 03741037.0.

Offical Action Dated Aug. 24, 2007 From the US Patent Trademark Office Re.: U.S. Appl. No. 10/207,860.

Office Action Dated Feb. 22, 2009 From the Israeli Patent Office Re.: Application No. 166566 and Its Translation Into English.

Office Action Dated Feb. 22, 2009 From the Israeli Patent Office Re.: Application No. 166566.

Official Action Dated May 14, 2009 From the US Patent and Trademark Office Re.: U.S. Appl. No. 10/468,840.

Official Action Dated Oct. 20, 2008 From the US Patent Office Re.: U.S. Appl. No. 10/468,840.

Translation of Notice of Reason for Rejection Dated Dec. 5, 2008 From the Japanese Patent Office Re.: Application No. 2004-524034.

Official Action Dated Dec. 15, 2009 From the US Patent and Trademark Office Re.: U.S. Appl. No. 10/468,840.

Official Action Dated Jul. 30, 2009 From the US Patent and Trademark Office Re.: U.S. Appl. No. 12/071,710.

Response Dated Mar. 15, 2010 to Offical Action Dated Dec. 15, 2009 From the US Patent and Trademark Office Re.: U.S. Appl. No. 10/468,840.

International Search Report Dated May 20, 2003 From the International Searching Authority Re. Application No. PCT/US2002/07178.

Response Dated Sep. 16, 2010 to Communication Pursuant to Article 94(3) EPC of Mar. 18, 2010 From the European Patent Office Re.: Application No. 03741037.0.

Requisition by the Examiner Dated Aug. 11, 2010 From the Canadian Intellectual Property Office Re. Application No. 2,440,561.

METHOD USING A SYNTHETIC MOLECULAR SPRING DEVICE IN A SYSTEM FOR DYNAMICALLY CONTROLLING A SYSTEM PROPERTY AND A CORRESPONDING SYSTEM THEREOF

RELATED APPLICATIONS

This is a Continuation-In-Part of U.S. patent application Ser. No. 10/468,840, filed on Sep. 3, 2003, which is a National Phase Application of PCT International Patent Application No. PCT/US02/07178, filed on Mar. 12, 2002, claiming priority from U.S. Provisional Patent Application No. 60/274,635, filed on Mar. 12, 2001. This is also a Continuation of U.S. patent application Ser. No. 10/207,860, filed on Jul. 31, 2002, which is a Continuation-In-Part of PCT International Patent Application No. PCT/US02/07178, filed on Mar. 12, 2002, claiming priority from U.S. Provisional Patent Application No. 60/274,635, filed on Mar. 12, 2001. The contents of all of the above documents are incorporated as if fully set forth herein.

FIELD AND BACKGROUND OF THE INVENTION

The present invention relates to methods using a synthetic molecular level device, such as a synthetic molecular spring, engine, or, machine, in a system, and more particularly, to a method using a synthetic molecular spring device in a system for dynamically controlling a system property, and a corresponding system thereof. Exemplary system properties used for describing and illustrating implementation of the present invention are momentum, topography, and electronic behavior. Using the synthetic molecular spring device for dynamically controlling each of these system properties is illustratively described with respect to several specific exemplary preferred embodiments of the corresponding system of the present invention.

Molecular structures featuring the capability of contracting or expanding, in a controllable fashion, under the action of an external triggering or activating mechanism are expected to become key components in the developing fields of nano-devices, material science, robotics, biomimetics, and molecular electronics. Particularly, molecular structures capable of exhibiting and/or causing directional motions, for example, linear and/or rotational directional motions, triggered or activated by appropriate triggering or activating signals are needed in order to construct molecular devices whose operation and function exhibit, or include, spring-like, engine-like, and/or machine-like, behavior.

In recent years, an increasing number of works and attempts to design, develop, and implement, synthetic molecular level devices, such as synthetic molecular springs, engines, and machines, have been presented. Several such teachings are: Bissell, R. A., Cordova, E., Kaifer, A. E., and, Stoddart, J. F., "A Chemically and Electrochemically Switchable Molecular Shuttle", *Nature* 369, 133-137 (1994); Feringa, B. L., "In Control Of Molecular Motion", *Nature* 408, 151-154 (2000); Jimenez, M. C., Dietrich-Buchecker, C., and Sauvage, J. P., "Towards Synthetic Molecular Muscles: Contraction and Stretching of a Linear Rotaxane Dimer", *Angewandte Chemie-International Edition in English* 39, 3284-3287 (2000); Mahadevan, L. and Matsudaira, P., "Motility Powered by Supramolecular Springs and Ratchets", *Science* 288, 95-99 (2000); Otero, T. F. and Sansinena, J. M., "Soft and Wet Conducting Polymers for Artificial Muscles", *Advanced Materials* 10, 491-494 (1998); and, Tashiro, K., Konishi, K., and Aida, T., "Metal Bisporphyrinate Double-Decker Complexes as Redox-Responsive Rotating Modules, Studies on Ligand Rotation Activities of the Reduced and Oxidized Forms Using Chirality as a Probe", *Journal of the American Chemical Society* 122, 7921-7926 (2000).

These teachings relate to such molecular structures in the form of rotaxane molecules, catenanes molecules, polypyrrole films, single-walled nanotube sheets, among others. Several teachings relating specifically to rotaxane molecules and/or catenanes molecules are: Leigh, D. A., Troisi, A., and, Zebetto, F., "A Quantum-Mechanical Description of Macrocyclic Ring Rotation in Benzylic Amide [2]-Catenanes", *Chemistry European Journal* 7, 1450-1454 (2001); Amendola, V., Fabbrizzi, L., Mangano, C., and, Pallavicini, P., "Molecular Machines Based on Metal Ion Translocation", *Accounts of Chemical Research* 34, 488-493 (2001); Collin, J. P., Dietrich-Buchecker, C., Gavina, P., Jimenez-Molero, M., and, Sauvage, J. P., "Shuttles and Muscles: Linear Molecular Machines Based on Transition Metals", *Accounts of Chemical Research* 34, 477-487 (2001); Ashton, P. R. et al., "Dual-Mode 'Co-Conformational' Switching in Catenanes Incorporating Bipyridinium and Dialkylammonium Recognition Sites", *Chemistry European Journal* 7, 3482-3493 (2001); and, Cardenas, D. J. et al., "Synthesis, X-ray Structure, and Electrochemical and Excited-State Properties of Multicomponent Complexes Made of a [Ru(Tpy)2]2+ Unit Covalently Linked to a [2]-Catenate Moiety. Controlling the Energy-Transfer Direction by Changing the Catenate Metal Ion", *Journal of the American Chemical Society* 121, 5481-5488 (1999).

Yet, these teachings, either singly or in combination, do not provide a satisfactory realization of a complete set of prerequisites and characteristics critically important for practical commercial application of a molecular device, especially as part of a system featuring a system property amenable to dynamic control. Several such prerequisites and characteristics are: (1) capability of coupling to the macroscopic world, (2) capability of performing work, (3) modularity with respect to single or multi-dimensional scalability, (4) versatility, (5) robustness, (6) reversability, (7) operability in a continuous or discontinuous mode, (8) highly resolvable temporal response, and (9) capability of being monitored during operation by a variety of different techniques.

A machine is generally defined as a device, usually having separate entities, bodies, components, and/or elements, formed and connected to alter, transmit, and direct, applied forces in a predetermined manner, in order to accomplish a specific objective or task, such as the performance of useful work, or for controlling a particular property or properties of a system including the machine. An engine is generally defined as a device or machine that converts energy into mechanical motion, to be clearly distinguished from an electric, spring-driven, or hydraulic, motor operating by consuming an externally provided fuel.

Thus, a molecular structure, in the form of a chemical unit or module, featuring an interrelating collection of components and/or elements, that has the ability to store energy of predetermined chemical bonds in a particular molecular conformation, and convert the stored energy into mechanical motion, for performing useful work, or for dynamically controlling a particular property or properties of a system, in general, and a system, in particular, including the molecular structure, may be regarded as a molecular engine. In order to use such a molecular module as a whole or part of a molecular engine, it is necessary to control its action. One possibility relies on conditional formation and breakage of chemical bonds. Here, formation and breakage of chemical bonds translates to storage and release of potential energy, and concomitant molecular mechanical motion or movement. Although, it is quite common to find terms such as 'molecular machines', 'molecular engines', 'molecular springs', and other similar terms related to molecular structures and assemblies, in the prior art, practical implementation of the related mechanical properties, currently, is generally far from being demonstrated, for example, as highlighted by Amendola, V. et al., "Molecular Events Switched by Transition Metals", *Coordination Chemistry Reviews* 190, 649-669 (1999).

The synthetic molecular spring device disclosed in PCT/US02/07178, filed Mar. 12, 2002, by the same inventors of the present invention, the teachings of which are specifically incorporated by reference as if fully set forth herein, generally features at least one synthetic molecular assembly and an activating mechanism, and exhibits multi-parametric controllable spring-type elastic reversible function, structure, and behavior, operable in a wide variety of different environments. As described therein, different types of the primary components, that is, each synthetic molecular assembly and the activating mechanism, may be selected from a wide variety of corresponding groups and sub-groups, while preserving the controllable spring-type elastic reversible function, structure, and behavior of the device.

A molecular device, such as the synthetic molecular spring device disclosed in PCT/US02/07178, whose operation and function exhibit, or include, spring-like, engine-like, and/or machine-like, behavior, featuring a molecular structure in the form of a scaleable chemical unit or module, can be effectively utilized as the critical component of a system needed for dynamically controlling a system property of the system. Ultimately, such a system, including the molecular device, can be incorporated into or integrated with the macroscopic world, for fulfilling the above indicated prerequisites and characteristics critically important for practical commercial application.

In the prior art, there are teachings of using a molecular device for controlling a system property of a system. In U.S. Pat. No. 6,212,093, issued to Lindsey, there is disclosed a molecular electronic device for high-density non-volatile memory, featuring a metal porphyrin in a sandwich coordination compound, as part of a molecular system, for controlling electrical properties. In Chemical Physics Letters, 265, 353-357 (1997), "An Electromechanical Amplifier Using A Single Molecule", Joachim et al. describes a molecular electromechanical amplifier as part of a system featuring molecular level and macroscopic components. In that teaching, a fullerene molecule is used as a quantum dot and a metallic STM (scanning tunneling microscope) tip is used in order to apply mechanical forces on the fullerene molecule, thereby causing structural deformation and changing of the energy gap of the fullerene molecule.

Additional attempts of externally controlling a system property by using a molecular device are known, but they are typically impracticable for implementing in commercial applications because they lack the capability of directly and easily controlling the desired property at the molecular level. Other teachings in the prior art, such as those previously cited above, feature only general, non-detailed and non-enabling, indications and/or suggestions of utilizing a synthetic molecular level device, such as a synthetic molecular spring, engine, or, machine, in a system for controlling a system property. In the prior art, there is no teaching of a method for using a synthetic molecular device which exhibits the multi-parametric controllable spring-type elastic reversible function, structure, and behavior, of the synthetic molecular spring device disclosed in PCT/US02/07178, for dynamically controlling a system property, in general, such as momentum, topography, or electronic behavior, in particular, which has potential for commercial application.

There is thus a need for, and it would be highly advantageous to have a method using a synthetic molecular spring device in a system for dynamically controlling a system property, and a corresponding system thereof. Moreover, there is a need for such a method and corresponding system thereof, which are generally applicable to a wide variety of different fields and applications, for dynamically controlling a system property, such as momentum, topography, and electronic behavior, and which can be commercially implemented.

SUMMARY OF THE INVENTION

The present invention relates to a method using a synthetic molecular spring device in a system for dynamically controlling a system property, and a corresponding system thereof. Exemplary system properties used for describing and illustrating implementation of the present invention are momentum, topography, and electronic behavior. Using the synthetic molecular spring device for dynamically controlling each of these system properties is illustratively described with respect to several specific exemplary preferred embodiments of the corresponding system of the present invention.

The synthetic molecular spring device, generally featuring at least one synthetic molecular assembly and an activating mechanism, exhibits multi-parametric controllable spring-type elastic reversible function, structure, and behavior, operable in a wide variety of different environments, and is generally applicable to dynamically controlling a wide variety of different specific types of system properties, such as momentum, topography, and electronic behavior. Different types of the primary components, that is, each of the at least one synthetic molecular assembly and the activating mechanism, of the synthetic molecular spring device, may be selected from a wide variety of corresponding groups and sub-groups, while preserving the controllable spring-type elastic reversible function, structure, and behavior.

Thus, according to the present invention, there is provided a method using a synthetic molecular spring device in a system for dynamically controlling a system property, comprising the steps of: (a) providing the synthetic molecular spring device comprising: (i) at least one synthetic molecular assembly, each synthetic molecular assembly featuring at least one chemical unit or module including components: (1) at least one atom; (2) at least one complexing group complexed to at least one of the at least one atom; (3) at least one axial ligand reversibly physicochemically paired with at least one complexed atom; and (4) at least one substantially elastic molecular linker having a body and having two ends with at least one end chemically bonded to another component of the synthetic molecular assembly; and (ii) an activating mechanism operatively directed to at least one predetermined atom-axial ligand pair of each synthetic molecular assembly; (b) selecting a unit of the system, the selected unit exhibits the system property which is dynamically controllable by the synthetic molecular spring device; (c) operatively coupling each synthetic molecular assembly to the selected unit, for forming a coupled unit; and (d) sending an activating signal from the activating mechanism to the at least one predetermined atom-axial ligand pair of at least one synthetic molecular assembly of the coupled unit, for physicochemically modifying the at least one predetermined atom-axial ligand pair, for activating at least one cycle of spring-type elastic reversible transitions between contracted and expanded linear conformational states, or, between expanded and contracted linear conformational states, of the at least one substantially elastic molecular linker of the at least one synthetic molecular assembly of the coupled unit, thereby causing a dynamically controllable change in the system property exhibited by the selected unit.

According to another aspect of the present invention, there is provided a system including a synthetic molecular spring device for dynamically controlling a system property, comprising: (a) the synthetic molecular spring device comprising: (i) at least one synthetic molecular assembly, each synthetic molecular assembly featuring at least one chemical unit or module including components: (1) at least one atom; (2) at least one complexing group complexed to at least one of the at least one atom; (3) at least one axial ligand reversibly physicochemically paired with at least one complexed atom; and (4) at least one substantially elastic molecular linker having a body and having two ends with at least one end chemically bonded to another component of the synthetic molecular assembly; and (ii) an activating mechanism operatively directed to at least one predetermined atom-axial ligand pair of each synthetic molecular assembly; and (b) a selected unit of the system, the selected unit exhibits the system property which is dynamically controllable by the synthetic molecular spring device; each synthetic molecular assembly is operatively coupled to the selected unit, for forming a coupled unit, whereby following the activating mechanism sending an activating signal to the at least one predetermined atom-axial ligand pair of at least one synthetic molecular assembly of the coupled unit, for physicochemically modifying the at least one predetermined atom-axial ligand pair, there is activating at least one cycle of spring-type elastic reversible transitions between contracted and expanded linear conformational states, or, between expanded and contracted linear conformational states, of the at least one substantially elastic molecular linker of the at least one synthetic molecular assembly of the coupled unit, thereby causing a dynamically controllable change in the system property exhibited by the selected unit.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the present invention. In this regard, no attempt is made to show structural details of the present invention in more detail than is necessary for a fundamental understanding of the invention, the description taken with the drawings making apparent to those skilled in the art how the several forms of the invention may be embodied in practice. In the drawings.

DESCRIPTION OF THE PREFERRED EMBODIMENTS

Figure 1:
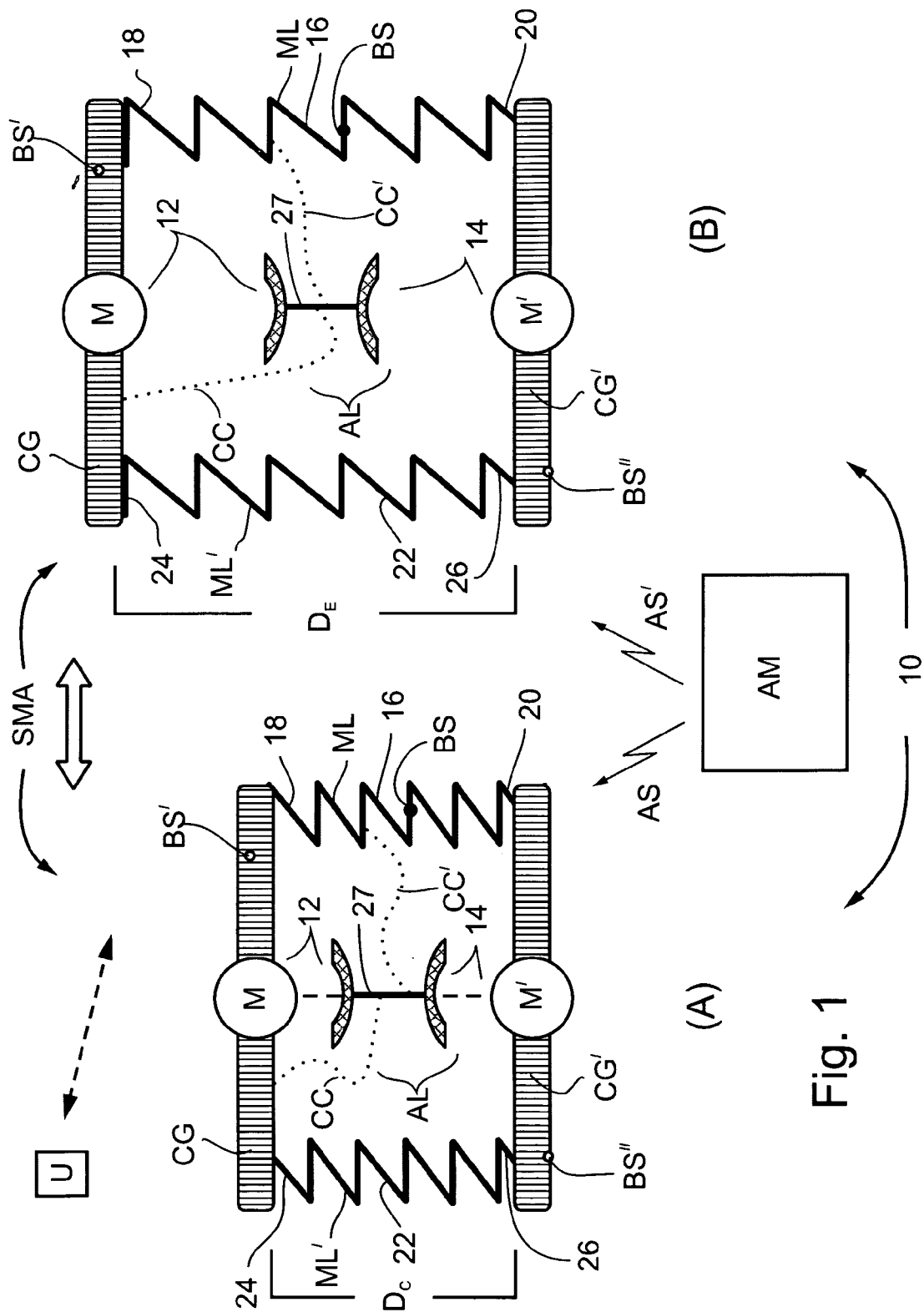
FIG. 1 is a schematic diagram illustrating a side view of a first exemplary preferred embodiment of the synthetic molecular spring device, showing a single synthetic molecular assembly, SMA, as a non-limiting example, wherein (A) shows the molecular linkers, ML and ML', in a contracted conformational state, and, (B) shows the molecular linkers, ML and ML', in an expanded conformational state, in accordance with the present invention.

The present invention relates to a method using a synthetic molecular spring device in a system for dynamically controlling a system property, and a corresponding system thereof. Exemplary system properties used for describing and illustrating implementation of the present invention are momentum, topography, and electronic behavior. Using the synthetic molecular spring device for dynamically controlling each of these system properties is illustratively described with respect to several specific exemplary preferred embodiments of the corresponding system of the present invention.

It is noted herein, that the present invention relates to and is focused on using a 'synthetic' molecular spring device, featuring a 'synthetic' molecular assembly which is constructed from components and elements that are synthetically made and/or modified using techniques of synthetic chemistry. Accordingly, this includes alternative embodiments of the synthetic molecular spring device of the present invention, featuring a synthetic molecular assembly which is constructed from any number of components and/or elements themselves made or obtained by synthetically modifying one or more initially, naturally existing types of raw materials, such as initially, naturally existing biological, biochemical, or molecular biological, types of raw materials. This is in contrast to using 'natural' molecular spring devices, featuring molecular structures and/or assemblies which are used in the form of naturally existing components and elements, such as naturally existing biological, biochemical, or molecular biological types of molecular structures and assemblies which may, under specified conditions, be considered to exhibit properties and behavior of a molecular spring device.

A main aspect of novelty, inventiveness, and, commercial applicability, of the present invention is that of using a synthetic molecular spring device which exhibits multi-parametric controllable spring-type elastic reversible function, structure, and behavior, operable in a wide variety of different environments, for highly effectively dynamically controlling a system property of a system including the synthetic molecular spring device as one of its components. This is in strong contrast to prior art methods of using synthetic molecular devices which are claimed as exhibiting parametric controllable spring-type elastic structure, function, and behavior, typically, operable only in very specific types of environments, thereby significantly limiting their ability to dynamically control a system property of a system including such a synthetic molecular spring-type device.

Another aspect of novelty and inventiveness of the present invention is that different types of the primary components, that is, each of the at least one synthetic molecular assembly and the activating mechanism, of the synthetic molecular spring device, may be selected from a wide variety of corresponding groups and sub-groups, while preserving the controllable spring-type elastic reversible function, structure, and behavior. This aspect is in strong contrast to prior art synthetic molecular devices whose 'apparent' spring-type structure, function, and behavior, and control thereof, are not readily preserved by changing types of primary components.

Another aspect of novelty and inventiveness of the present invention is that the multi-parametric controllable spring-type elastic reversible function, structure, and behavior, are deterministic in a relatively simple manner, whereby, for example, a profile or graphical plot of deformation versus equilibrium energy of the synthetic molecular assembly, is predictable in a relatively simple manner.

Another aspect of novelty and inventiveness of the present invention is that the multi-parametric controllable spring-type elastic reversible function, structure, and behavior, exhibited by the synthetic molecular spring device, feature several prerequisites and characteristics critically important for practical commercial application. Such prerequisites and characteristics are (1) capability of coupling to the macroscopic world, (2) capability of performing work, (3) modularity with respect to single or multi-dimensional scalability and scale-up, (4) versatility, (5) robustness, (6) elastic type of reversability, (7) operability in a continuous or discontinuous mode, (8) highly resolvable temporal response, and, (9) capability of being monitored during operation by using different techniques, for example, spectroscopic and/or mechanical techniques.

Based upon the above indicated aspects of novelty and inventiveness, the present invention successfully overcomes limitations and widens the scope of presently known methods of using a molecular device in a system for controlling a system property, and corresponding systems thereof.

A significant advantage of the present invention is relatively diverse applicability of the synthetic molecular spring device for dynamically controlling a variety of very different types of system properties. More specifically, for example, in a non-limiting way, implementation of the present invention is illustratively described for dynamically controlling very different types of system properties, such as momentum, topography, and electronic behavior.

As a direct result of the immediately previously indicated advantage, an additional advantage of the present invention is that the method and corresponding system are generally applicable to a wide variety of different technological fields and arts involving molecular level devices and systems including such molecular level devices, encompassing physics, chemistry, biology, in general, and, encompassing the various different sub-fields, combinations, and integrations thereof, in particular, involving a wide variety of different types of applications, each application featuring a system having a system property which is dynamically controllable.

More specifically, for example, in a non-limiting way, the method and corresponding system of the present invention are applicable to the technologies and arts of solid state physics, solid state chemistry, materials science, electro-active materials, photo-active materials, chemical active materials, acoustic materials, inorganic and/or organic semiconductors, integrated circuits, semiconductor chips, microelectronics, nanoelectronics, molecular electronics, robotics, chemical catalysis, biochemistry, biophysics, biophysical chemistry, biomedical chemistry, molecular biology, and, bio-mimetics.

Additional specific unique aspects and advantages of the present invention are as follows:

Capability of fast, for example, in the case of photoexcitation, as well as slow, for example, in the case of pH control, time scale functioning, of the synthetic molecular spring device for dynamically controlling a system property.

No chemical, or other by-products are generated during the working cycle of the synthetic molecular spring device while dynamically controlling a system property of the system. The working cycle is based on reversible processes. This aspect of the invention is highly important for the synthetic molecular spring device to operate in a continuous and efficient manner, as part of the system.

The modular functional/structural approach of the synthetic molecular spring device provides a variety of activating and controlling means. Thus, it is possible to activate the synthetic molecular spring device in accordance with specific properties and characteristics of the individual components and elements thereof. For example, it is possible to activate a [Ni]Porphyrin based synthetic molecular spring device by photoexcitation, electro-reduction/oxidation, or, by a chemical manipulation such as introducing a monodentate ligand into the synthetic molecular assembly of the synthetic molecular spring device. In a similar embodiment of the synthetic molecular spring device based on [Zn]Porphyrin, preferably, chemical control is accessible, thereby providing selectivity with respect to using the synthetic molecular spring device for dynamically controlling a system property of the system.

It is possible to operate various embodiments of the synthetic molecular spring device in different environments. For example, it is possible to introduce hydrophilic or hydrophobic substituents in peripheral positions of the synthetic molecular assembly, in order to make the synthetic molecular assembly more water or organic soluble. The intrinsic functions of the synthetic molecular spring device, via the expansion/contraction transitions are generally not sensitive to the solvent environment.

The induced motion of the molecular linker in the synthetic molecular assembly, and therefore the induced motion of the synthetic molecular assembly operatively coupled to the unit of the system having the system property which is dynamically controllable, is not based on a thermal fluctuation type of phenomenon, such as that described by Asfari, Z. and Vicens, J., "Molecular Machines", *Journal of Inclusion Phenomena and Macrocyclic Chemistry* 36, 103-118 (2000).

Spectroscopic techniques, and, more 'mechanical' types of monitoring techniques, for example, Atomic Force Microscopy, can be used in order to monitor operation of the synthetic molecular spring device dynamically controlling a system property of the system.

The synthetic molecular spring device of the present invention is operable under variable operating conditions and in a variety of different environments, and is included as part of a stand-alone system, or as part of a system integrated and/or interactive with other elements, components, units, devices, mechanisms, or systems, of the macroscopic world. For example, as part of implementing the synthetic molecular spring device, one or more synthetic molecular assemblies are used as a system component in a phase or state of matter selected from the group consisting of the solid state, the liquid state, the gas state, interfaces thereof, and, combinations thereof, for performing mechanical work at the molecular level, for mechanically altering the conformation of a substrate molecule, or essentially any other manipulation at the molecular level. In particular, one or more synthetic molecular assemblies are used in a variety of modes physicochemically interactive with a substrate, where the substrate is, for example, a molecular or macromolecular entity, or a composite of atoms.

It is to be understood that the invention is not limited in its application to the details of the order or sequence of steps of operation or implementation of the method using the synthetic molecular spring device, or to the details of construction, arrangement, and composition of the components and elements of the corresponding system thereof, including the synthetic molecular spring device, set forth in the following description, drawings, or examples. For example, the following description includes only a few practically applicable and potentially commercially feasible specific exemplary preferred embodiments of the synthetic molecular spring device, in order to illustrate implementation of the present invention.

In particular, for example, in each of FIGS. 1 through 8, the synthetic molecular spring device, of the present invention, is illustrated as featuring a 'single' synthetic molecular assembly, herein, referred to as (SMA) or as SMA, or, for embodiments of a scaled-up synthetic molecular assembly, herein, referred to as (SMA-U) or as SMA-U, as non-limiting examples. With respect to typical commercial application of the method and corresponding system thereof, of the present invention, the synthetic molecular spring device features a plurality of synthetic molecular assemblies, herein, referred to as (SMAs) or as SMAs, whereby each synthetic molecular assembly, (SMA) or SMA, of the plurality of synthetic molecular assemblies, (SMAs) or SMAs, is characterized and used according to the below described and illustrated structure/function relationships and behavior of a single synthetic molecular assembly (SMA) or SMA. Accordingly, the present invention is capable of other embodiments or of being practiced or carried out in various ways. Moreover, although methods and materials similar or equivalent to those described herein can be used for practicing or testing the present invention, suitable methods and materials are described herein.

It is also to be understood that unless otherwise defined, all technical and scientific words, terms, and/or phrases, used herein have the same meaning as commonly understood by one of ordinary skill in the art to which this invention belongs.

Phraseology, terminology, and notation, employed herein are for the purpose of description and should not be regarded as limiting.

For example, especially with respect to phraseology, terminology, and notation used for describing and illustrating function and affect of the activating signal of the activating mechanism of the synthetic molecular spring device, in general, and used for describing and illustrating the resulting spring-type elastic reversible transition from a contracted linear conformational state (A) to an expanded linear conformational state (B), or, from an expanded linear conformational state (B) to a contracted linear conformational state (A), of the at least one molecular linker (ML) of the at least one synthetic molecular assembly (SMA), of the synthetic molecular spring device functioning either on its own, or functioning as part of an operatively coupled unit in a system including the synthetic molecular spring device, in particular, as specifically noted herein below.

The method using a synthetic molecular spring device in a system for dynamically controlling a system property, and a corresponding system thereof, according to the present invention, are better understood with reference to the following description and accompanying drawings. Throughout the following description and accompanying drawings, like reference letters, acronyms, symbols, or numbers, refer to like components, elements, or units of the system. Immediately following are brief descriptions of the generalized method and corresponding generalized system thereof, of the present invention. Thereafter is a brief description of the structure and function of the generalized synthetic molecular spring device of the present invention. Following thereafter is illustrative description of eight different specific exemplary preferred embodiments of the generalized synthetic molecular spring device.

Following thereafter is illustrative description of nine different specific exemplary preferred embodiments of implementing the generalized method and corresponding generalized system thereof, according to the present invention. Therein, exemplary system properties used for describing and illustrating implementation of the present invention are momentum, topography, and electronic behavior. Each specific exemplary preferred embodiment of the generalized system is implemented according to the described method, whereby the corresponding system property is dynamically controllable using the synthetic molecular spring device of the present invention.

The generalized method using a synthetic molecular spring device in a system for dynamically controlling a system property features the following main steps: (a) providing the synthetic molecular spring device, having components whose structure/function relationships and behavior are described below and illustrated in FIGS. 1-8, featuring (i) at least one synthetic molecular assembly (SMA), and (ii) an activating mechanism (AM); (b) selecting a unit (U) of the system, the selected unit (U) exhibits the system property which is dynamically controllable by the synthetic molecular spring device; (c) operatively coupling each synthetic molecular assembly (SMA) of the synthetic molecular spring device to the selected unit (U), for forming a coupled unit (CU); and (d) sending an activating signal (AS/AS') from the activating mechanism (AM) to at least one predetermined atom-axial ligand pair of at least one synthetic molecular assembly (SMA) of the coupled unit (CU), for physicochemically modifying the at least one predetermined atom-axial ligand pair, for activating at least one cycle of spring-type elastic reversible transitions between contracted and expanded linear conformational states, or, between expanded and contracted linear conformational states, of at least one substantially elastic molecular linker (ML) of the at least one synthetic molecular assembly (SMA) of the coupled unit (CU), thereby causing a dynamically controllable change in the system property exhibited by the selected unit (U).

The corresponding generalized system including a synthetic molecular spring device for dynamically controlling a system property features the following main components: (a) the synthetic molecular spring device, having components whose structure/function relationships and behavior are described below and illustrated in FIGS. 1-8, featuring (i) at least one synthetic molecular assembly (SMA), and (ii) an activating mechanism (AM); and (b) a selected unit (U) of the system, the selected unit (U) exhibits the system property which is dynamically controllable by the synthetic molecular spring device. Each synthetic molecular assembly (SMA) is operatively coupled to the selected unit (U), for forming a coupled unit (CU), whereby following the activating mechanism (AM) sending an activating signal (AS/AS') to at least one predetermined atom-axial ligand pair of at least one synthetic molecular assembly (SMA) of the coupled unit (CU), for physicochemically modifying the at least one predetermined atom-axial ligand pair, there is activating at least one cycle of spring-type elastic reversible transitions between contracted and expanded linear conformational states, or, between expanded and contracted linear conformational states, of at least one substantially elastic molecular linker (ML) of the at least one synthetic molecular assembly (SMA) of the coupled unit (CU), thereby causing a dynamically controllable change in the system property exhibited by the selected unit (U).

The generalized synthetic molecular spring device of the present invention features the following primary components: (i) at least one synthetic molecular assembly (SMA), each synthetic molecular assembly (SMA) featuring at least one chemical unit or module including components: (1) at least one atom (M), (2) at least one complexing group (CG) complexed to at least one atom (M), (3) at least one axial ligand (AL) reversibly physicochemically paired with at least one atom (M) complexed to a complexing group (CG), and, (4) at least one substantially elastic molecular linker (ML) having a body, and, having two ends with at least one end chemically bonded to another component of the synthetic molecular assembly (SMA); and, (ii) an activating mechanism (AM) operatively directed to at least one predetermined atom-axial ligand pair of at least one synthetic molecular assembly (SMA); whereby following the activating mechanism (AM) sending an activating signal (AS/AS') to the at least one predetermined atom-axial ligand pair for physicochemically modifying the atom-axial ligand pair, there is activating at least one cycle of spring-type elastic reversible transitions between contracted and expanded linear conformational states of the at least one substantially elastic molecular linker (ML) of the at least one synthetic molecular assembly (SMA).

Each synthetic molecular assembly (SMA), optionally, includes additional components: (5) at least one chemical connector (CC) for chemically connecting components of the synthetic molecular assembly (SMA) to each other, and/or, (6) at least one binding site (BS), each located at a predetermined position of another component of the synthetic molecular assembly (SMA), for potentially binding or operatively coupling that position of the synthetic molecular assembly (SMA) to an external entity, such as a selected unit (U), part of or separate from a more encompassing mechanism, device, or system.

In the method and corresponding system of the present invention, the step of operatively coupling each synthetic molecular assembly (SMA) to the selected unit (U), for forming a coupled unit (CU), is generally performed by coupling at least one component of each synthetic molecular assembly (SMA) of a given synthetic molecular spring device, to at least one element or component of the selected unit (U) of the system including the synthetic molecular spring device, thereby forming the coupled unit (CU) of the system.

Specifically, the step of operatively coupling is performed by using a coupling mechanism selected from the group consisting of physical coupling mechanisms, chemical coupling mechanisms, physicochemical coupling mechanisms, combinations thereof, and, integrations thereof. Preferred physical coupling mechanisms are selected from the group consisting of physical adsorption, physical absorption, non-bonding physical interaction, mechanical coupling, simple juxtaposition, electrical coupling, electronic coupling, magnetic coupling, electromagnetic coupling, electromechanical coupling, and magneto-mechanical coupling. Preferred chemical coupling mechanisms are selected from the group consisting of covalent types of chemical bonding, coordinative types of chemical bonding, ionic types of chemical bonding, hydrogen types of chemical bonding, and, Van der Waals types of chemical bonding.

In principle, the step of operatively coupling can be performed by using essentially any combination of at least one of the preceding preferred physical coupling mechanisms and at least one of the preceding preferred chemical coupling mechanisms. A few specific examples of such combination types of coupling mechanisms are electrical and/or electronic types of physical coupling mechanisms combined or integrated with at least one of the preceding preferred chemical coupling mechanisms, whereby the phenomena of electrical conductance, electronic conductance, and/or electronic tunneling, occurs between the at least one component of each synthetic molecular assembly (SMA) of a given synthetic molecular spring device, and the operatively coupled at least one element or component of the selected unit (U) of the system.

Preferably, the step of operatively coupling is performed via one or more optional binding sites (BS), and/or via at least one complexing group (CG) complexed to the at least one atom (M), and/or via at least one axial ligand (AL), and/or via at least one other component, of each synthetic molecular assembly (SMA) of a given synthetic molecular spring device, to at least one element or component of the selected unit (U) of the system including the synthetic molecular spring device, for forming the coupled unit (CU).

Several specific examples of the above listed ways of performing the step of operatively coupling each synthetic molecular assembly (SMA) to the selected unit (U), for forming a coupled unit (CU) of the system, are illustratively described in detail below, in the descriptions of the eight different specific exemplary preferred embodiments of the generalized synthetic molecular spring device, and following thereafter in the descriptions of the nine different specific exemplary preferred embodiments of implementing the generalized method and corresponding generalized system thereof.

The activating signal has two controllable general complementary levels, each with defined amplitude and duration, that is, a first general complementary level, herein referred to as AS, and, a second general complementary level, herein referred to as AS'. The first general complementary level, AS, of the activating signal (AS/AS') is sent to the at least one predetermined atom-axial ligand pair for physicochemically modifying the atom-axial ligand pair, via a first direction of a reversible physicochemical mechanism consistent with the basis of operation of the corresponding activating mechanism (AM), whereby there is activating a spring-type elastic reversible transition from a contracted linear conformational state, herein referred to as (A), to an expanded linear conformational state, herein referred to as (B), of the at least one molecular linker (ML). The second general complementary level, AS', of the activating signal (AS/AS') allows the at least one molecular linker (ML) to return to contracted linear conformational state (A).

In alternative embodiments of the present invention, the physicochemical relationship between the atom-axial ligand pair and the molecular linker (ML) is opposite to that relationship described above, whereby the first general complementary level, AS, of the activating signal (AS/AS') allows the at least one molecular linker (ML) to come to a contracted linear conformational state (A). The second general complementary level, AS', of the activating signal (AS/AS') is sent to the at least one predetermined atom-axial ligand pair for physicochemically modifying the atom-axial ligand pair, via a second direction of a reversible physicochemical mechanism consistent with the basis of operation of the corresponding activating mechanism (AM), whereby there is activating a spring-type elastic reversible transition from an expanded linear conformational state (B) to a contracted linear conformational state (A) of the at least one molecular linker (ML).

It is noted that, in order not to limit the meaning of the function of the activating signal of the activating mechanism (AM), in practice, with respect to terminology and notation, the two controllable general complementary levels, AS and AS', of the activating signal (AS/AS'), are interchangeable, whereby, the activating signal (AS/AS') may be written as the activating signal (AS'/AS). Moreover, it is noted herein that each general complementary level, AS and AS', or, AS' and AS, of the activating signal (AS/AS') or (AS'/AS), respectively, features at least one specific sub-level, preferably, a plurality of specific sub-levels, each having a particular magnitude, intensity, amplitude, or strength.

With respect to understanding for the purpose of implementing the present invention, herein, the spring-type elastic reversible transition from a contracted linear conformational state (A) to an expanded linear conformational state (B), or, from an expanded linear conformational state (B) to a contracted linear conformational state (A), of the spring-type, substantially elastic molecular linker (ML) included in a particular synthetic molecular assembly (SMA), refers to the change of the 'effective' distance of the length or height of the body of the molecular linker (ML), in the 'linear' direction along a longitudinal axis extending between the two ends of the molecular linker (ML).

In actuality, during and following completion of the spring-type elastic reversible transition from a contracted linear conformational state (A) to an expanded linear conformational state (B), or, from an expanded linear conformational state (B) to a contracted linear conformational state (A), of the molecular linker (ML) included in a particular synthetic molecular assembly (SMA), there may exist an insignificant, but measurable, change of the 'effective' width of the body of the molecular linker (ML), in directions other than along a longitudinal axis extending between the two ends of the molecular linker (ML). In particular, primarily, in a direction substantially perpendicular to the longitudinal axis extending between the two ends of the molecular linker (ML). This insignificant, but measurable, change of the 'effective' width of the body of the molecular linker (ML), is a result of phenomena relating to torsion and/or stress occurring along the body of the molecular linker (ML) during a given spring-type elastic reversible transition between contracted and expanded linear conformational states, or, between expanded and contracted linear conformational states, of the molecular linker (ML).

Accordingly, the spring-type elastic reversible transition from a contracted to an expanded linear conformational state, or, from an expanded to a contracted linear conformational state, of a substantially elastic molecular linker (ML) is characterized by a parameter, herein, referred to as the molecular linker inter-end effective distance change, $D_E-D_C$, or, $D_C-D_E$, respectively, indicating the sign, that is, positive or negative, respectively, and, the magnitude, of the change of the 'effective' distance, D, in the linear direction along a longitudinal axis extending between the two ends of a single molecular linker (ML), or, of the change of the 'effective' distance, D, in the linear direction between two arbitrarily selected ends of a plurality of molecular linkers (ML), included in a particular synthetic molecular assembly (SMA), following the respective spring-type elastic reversible transition in linear conformational states. For this parameter, $D_C$ refers to the molecular linker inter-end effective distance, D, when the synthetic molecular assembly (SMA), is in a contracted linear conformational state, and, $D_E$ refers to the molecular linker inter-end effective distance, D, when the synthetic molecular assembly (SMA), is in an expanded linear conformational state.

With respect to the method and corresponding system of the present invention, whereby the spring-type elastic reversible transition between the conformational states of the at least one molecular linker (ML) of each synthetic molecular assembly (SMA) causes a dynamically controllable change in a system property exhibited by a selected unit (U) of the system, the above described parameter, molecular linker inter-end effective distance change, $D_E-D_C$, or, $D_C-D_E$, is therefore directly associated with and correlated to the extent by which the system property is dynamically controllable by the synthetic molecular spring device.

Atom-axial ligand binding, in the form of an atom-axial ligand pair, imposes deformation of at least one substantially elastic molecular linker (ML), included in a synthetic molecular assembly (SMA), into a contracted or expanded linear conformational state, due to the bonding energy released upon axial ligation of the atom (M) to the axial ligand (AL). The activating signal (AS/AS'), for example, photoactivation by electromagnetic radiation of an appropriate wavelength, or chemical activation by changing pH of the host solution, causes the bonding interaction between the atom (M) and the axial ligand (AL) to be altered, resulting in a partial or full dissociation of the atom-axial ligand pair. This allows the contracted linear conformational state of each substantially elastic molecular linker (ML) to relax/expand into its equilibrium (relaxed/expanded) conformational state. The relaxation/expansion is translated into a concomitant expansion of the molecular linker (ML), in particular, and of the synthetic molecular assembly (SMA), in general.

Typical binding energies for axial ligation are about 10 Kcal/mol, depending on the particular axial ligand (AL), atom (M), and/or complexing group (CG), of a particular synthetic molecular assembly (SMA). Binding energies are also influenced by the particular phase or state of matter, that is, solid, liquid, or gas, of the synthetic molecular assembly (SMA), and/or of the selected unit of the system to which each synthetic molecular assembly (SMA) is operatively coupled, and/or of the overall host environment of the system. Such binding energy is sufficient to cause a substantial change in the end-to-end distance of each substantially elastic molecular linker (ML), therefore changing the effective total length of the structure of the synthetic molecular assembly (SMA).

Terminating the activating signal (AS/AS'), for example, terminating the electromagnetic radiation, or terminating the change in pH of the host solution, results in re-binding/association of the of atom (M) to the axial ligand (AL), and deforming the conformation of each substantially elastic molecular linker (ML) to its initial contracted conformational state. Thus, in most cases, by activating each synthetic molecular assembly (SMA), there is completing a cycle of transitions of linear conformational states of each substantially elastic molecular linker (ML) of the synthetic molecular assembly (SMA), which can be repeated by consecutive activation using the activating mechanism (AM). In some cases, by activating a synthetic molecular assembly (SMA), there is activating at least one spring-type elastic reversible transition between contracted and expanded linear conformational states, or, between expanded and contracted linear conformational states, of each substantially elastic molecular linker (ML) of the synthetic molecular assembly (SMA).

The immediately preceding described structure/function relationship and behavior of the synthetic molecular spring device is applicable to the synthetic molecular spring device functioning either on its own, or functioning as part of an operatively coupled unit in a system including the synthetic molecular spring device. Moreover, the immediately preceding described structure/function relationship and behavior of the synthetic molecular spring device is exploited for accomplishing a main aspect of novelty and inventiveness of the present invention, of using each of at least one synthetic molecular assembly (SMA) of the synthetic molecular spring device included in a system, for causing a dynamically controllable change in a system property exhibited by a selected unit (U) of the system, as described hereinafter the immediately following detailed illustrative description of the synthetic molecular spring device of the present invention.

Referring now to the drawings, FIG. 1 is a schematic diagram illustrating a side view of a first exemplary preferred embodiment of the synthetic molecular spring device of the present invention, showing a single synthetic molecular assembly, SMA, as a non-limiting example, wherein (A) shows the molecular linkers, ML and ML', in a contracted conformational state, and, (B) shows the molecular linkers, ML and ML', in an expanded conformational state.

In FIGS. 1[(A) and (B)], synthetic molecular spring device 10 features primary components: (i) a synthetic molecular assembly, SMA, featuring one chemical unit or module including: (1) two atoms, M and M', (2) two complexing groups, CG and CG', each complexed to a corresponding atom, M and M', respectively, (3) an axial bidentate ligand, AL, reversibly physicochemically paired with each of the two atoms M and M', via corresponding atom-axial ligand pairs 12 and 14, respectively, and, (4) a first substantially elastic molecular linker, ML, having a body 16, and, having two ends 18 and 20 each chemically bonded to a single corresponding complexing group, CG and CG', respectively, and, a second substantially elastic molecular linker, ML', having a body 22, and, having two ends 24 and 26 each chemically bonded to a single corresponding complexing group, CG and CG', respectively; and, (ii) an activating mechanism, AM, operatively directed to at least one of the two atom-axial ligand pairs 12 and 14, whereby following the activating mechanism, AM, sending an activating signal, AS/AS', to at least one of the two atom-axial ligand pairs 12 and 14, for physicochemically modifying at least one of the two atom-axial ligand pairs 12 and 14, there is activating at least one cycle of spring-type elastic reversible transitions (indicated by the double lined two directional arrow) between a contracted linear conformational state (A) and an expanded linear conformational state (B) of at least one of the molecular linkers, ML and ML'.

As shown in FIG. 1, the synthetic molecular assembly, SMA, includes additional components: (5) two chemical connectors, CC and CC', for chemically connecting the body 27 of the axial bidentate ligand, AL, to the complexing group, CG, and, to the body 16 of the first molecular linker, ML, respectively, and, (6) three binding sites, BS, BS', and BS", located at the body 16 of the first molecular linker, ML, at the complexing group, CG, and, at the complexing group, CG', respectively, for potentially binding or operatively coupling at least one of these positions of the synthetic molecular assembly, SMA, to an external entity, such as a selected unit (U), part of or separate from a more encompassing mechanism, device, or system, generally indicated in FIG. 1 by the dashed arrow between the synthetic molecular assembly, SMA, and a selected unit, U.

The spring-type elastic reversible transition (indicated by the double lined two directional arrow) from the contracted (A) to the expanded (B) linear conformational state, or, from the expanded (B) to the contracted (A) linear conformational state, of each of the two molecular linkers, ML, and ML', is characterized by the previously defined parameter, the molecular linker inter-end effective distance change, $D_E$–$D_C$, or, $D_C$–$D_E$, respectively, indicating the sign, that is, positive or negative, respectively, and, the magnitude, of the change in the inter-end effective distance, D, in the linear direction along a longitudinal axis extending between the two arbitrarily selected ends of either of the molecular linkers, ML and ML', for example, ends 24 and 26 of the second molecular linker, ML', following the respective spring-type elastic reversible transition in linear conformational states, as shown in FIG. 1.

With respect to the method using a synthetic molecular spring device, such as synthetic molecular spring device 10 illustrated in FIG. 1, in a system for dynamically controlling a system property, and a corresponding system thereof, according to the present invention, at least one of binding sites, BS, BS', and BS", of the synthetic molecular assembly, SMA, of synthetic molecular spring device 10, is for binding or operatively coupling the indicated position or positions of the synthetic molecular assembly, SMA, to at least one element or component of an external entity being a selected unit, U, of the system, for example, by using a physical, chemical, or physicochemical, binding or coupling mechanism (as further described below and illustratively exemplified in FIGS. 9-18), wherein the selected unit, U, exhibits the system property which is dynamically controllable by synthetic molecular spring device 10. Moreover, the parameter, molecular linker inter-end effective distance change, $D_E$–$D_C$, or, $D_C$–$D_E$, is directly associated with and correlated to the extent by which the system property is dynamically controllable by synthetic molecular spring device 10.

As stated above, FIG. 1 shows a single synthetic molecular assembly, SMA, as a non-limiting example, whereby, with respect to typical commercial application of the method and corresponding system thereof, of the present invention, synthetic molecular spring device 10 features a plurality of synthetic molecular assemblies, SMAs, whereby each synthetic molecular assembly, SMA, of the plurality of synthetic molecular assemblies, SMAs, is characterized and used according to the above described and illustrated structure/function relationships and behavior of a single synthetic molecular assembly, SMA.

Figure 2:
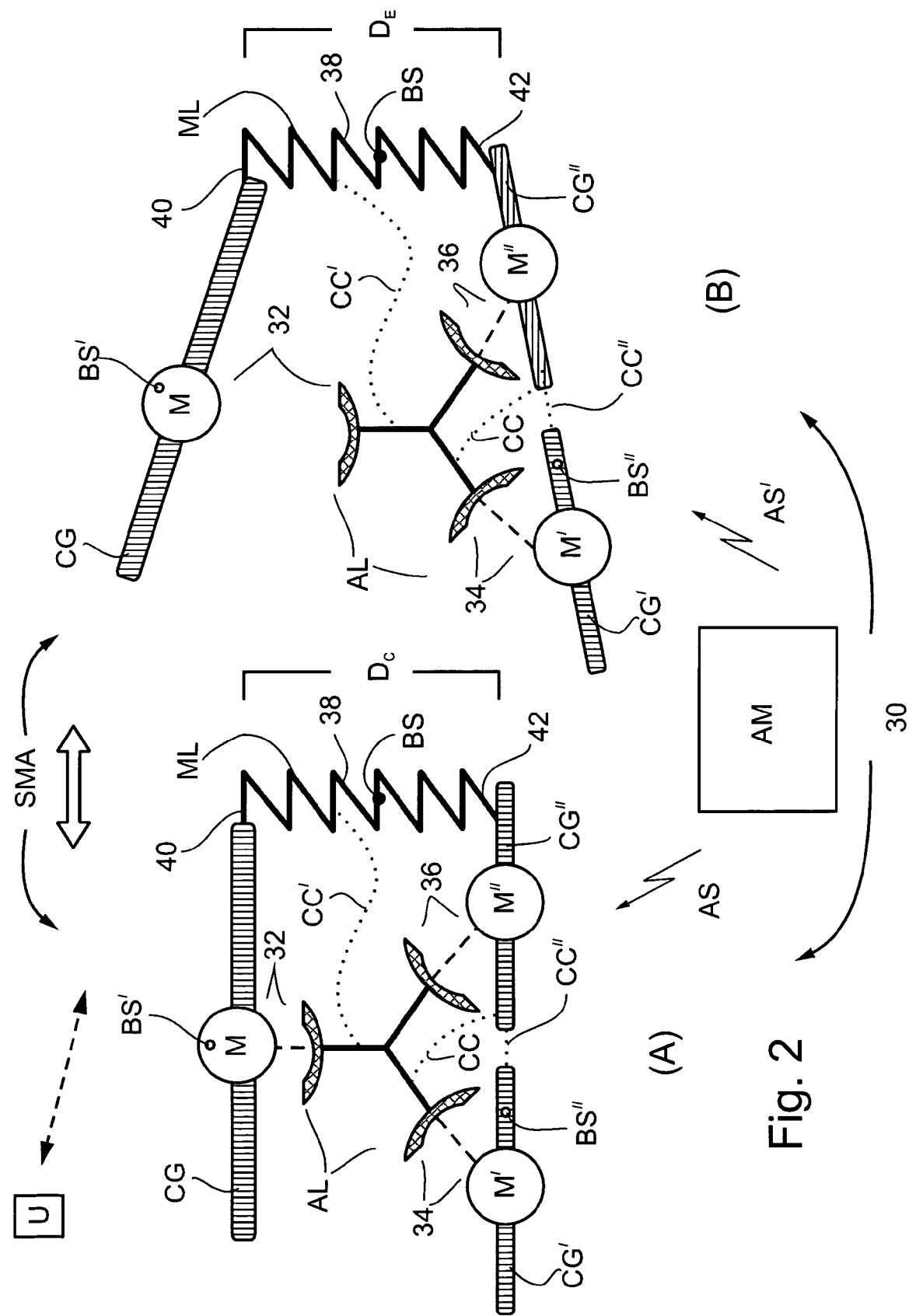
FIG. 2 is a schematic diagram illustrating a side view of a second exemplary preferred embodiment of the synthetic molecular spring device, showing a single synthetic molecular assembly, SMA, as a non-limiting example, wherein (A) shows the molecular linker, ML, in a contracted conformational state, and, (B) shows the molecular linker, ML, in an expanded conformational state, in accordance with the present invention.

FIG. 2 is a schematic diagram illustrating a side view of a second exemplary preferred embodiment of the synthetic molecular spring device of the present invention, showing a single synthetic molecular assembly, SMA, as a non-limiting example, wherein (A) shows the molecular linker, ML, in a contracted conformational state, and, (B) shows the molecular linker, ML, in an expanded conformational state.

In FIGS. 2[(A) and (B)], synthetic molecular spring device 30 features primary components: (i) a synthetic molecular assembly, SMA, featuring one chemical unit or module including: (1) three atoms, M, M', and, M", (2) three complexing groups, CG, CG', and, CG", each complexed to a corresponding atom, M, M', M", respectively, (3) an axial tridentate ligand, AL, reversibly physicochemically paired with each of the three atoms M, M', and, M", via corresponding atom-axial ligand pairs 32, 34, and, 36, respectively, and, (4) a substantially elastic molecular linker, ML, having a body 38, and, having two ends 40 and 42 each chemically bonded to a single complexing group, CG and CG", respectively; and, (ii) an activating mechanism, AM, operatively directed to at least one of the three atom-axial ligand pairs 32, 34, and, 36, for example, atom-axial ligand pair 32 (as shown), whereby following the activating mechanism, AM, sending an activating signal, AS/AS', to at least one of the three atom-axial ligand pairs 32, 34, and, 36, for example, atom-axial ligand pair 32 (as shown), for physicochemically modifying at least one of the three atom-axial ligand pairs 32, 34, and, 36, for example, atom-axial ligand pair 32 (as shown), there is activating at least one cycle of spring-type elastic reversible transitions (indicated by the double lined two directional arrow) between a contracted linear conformational state (A) and an expanded linear conformational state (B) of the molecular linker, ML.

As shown in FIG. 2, the synthetic molecular assembly, SMA, includes additional components: (5) three chemical connectors, CC and CC', for chemically connecting the axial tridentate ligand, AL, to the body 38 of the molecular linker, ML, and, to the complexing group, CG", respectively, and, CC" for chemically connecting the two complexing groups, CG' and CG", to each other, and, (6) three binding sites, BS, BS', and BS", located at the body 38 of the molecular linker, ML, at the atom, M, and, at the complexing group, CG', respectively, for potentially binding or operatively coupling at least one of these positions of the synthetic molecular assembly, SMA, to an external entity, such as a selected unit (U), part of or separate from a more encompassing mechanism, device, or system, generally indicated in FIG. 2 by the dashed arrow between the synthetic molecular assembly, SMA, and a selected unit, U.

The spring-type elastic reversible transition (indicated by the double lined two directional arrow) from the contracted (A) to the expanded (B) linear conformational state, or, from the expanded (B) to the contracted (A) linear conformational state, of the molecular linker, ML, is characterized by the previously defined parameter, the molecular linker inter-end effective distance change, $D_E$–$D_C$, or, $D_C$–$D_E$, respectively, indicating the sign, that is, positive or negative, respectively, and, the magnitude, of the change in the inter-end effective distance, D, in the linear direction along a longitudinal axis extending between the two ends 40 and 42 of the molecular linker, ML, following the respective spring-type elastic reversible transition in linear conformational states, as indicated in FIG. 2.

With respect to the method using a synthetic molecular spring device, such as synthetic molecular spring device 30 illustrated in FIG. 2, in a system for dynamically controlling a system property, and a corresponding system thereof, according to the present invention, at least one of binding sites, BS, BS', and BS", of synthetic molecular spring device 30, is for binding or operatively coupling the indicated position or positions of the synthetic molecular assembly, SMA, to at least one element or component of an external entity being a selected unit, U, of the system, for example, by using a physical, chemical, or physicochemical, binding or coupling mechanism (as further described below and illustratively exemplified in FIGS. 9-18), wherein the selected unit, U, exhibits the system property which is dynamically controllable by synthetic molecular spring device 30. Moreover, the parameter, molecular linker inter-end effective distance change, $D_E$–$D_C$, or, $D_C$–$D_E$, is directly associated with and correlated to the extent by which the system property is dynamically controllable by synthetic molecular spring device 30.

As stated above, FIG. 2 shows a single synthetic molecular assembly, SMA, as a non-limiting example, whereby, with respect to typical commercial application of the method and corresponding system thereof, of the present invention, synthetic molecular spring device 30 features a plurality of synthetic molecular assemblies, SMAs, whereby each synthetic molecular assembly, SMA, of the plurality of synthetic molecular assemblies, SMAs, is characterized and used according to the above described and illustrated structure/function relationships and behavior of a single synthetic molecular assembly, SMA.

Figure 3:
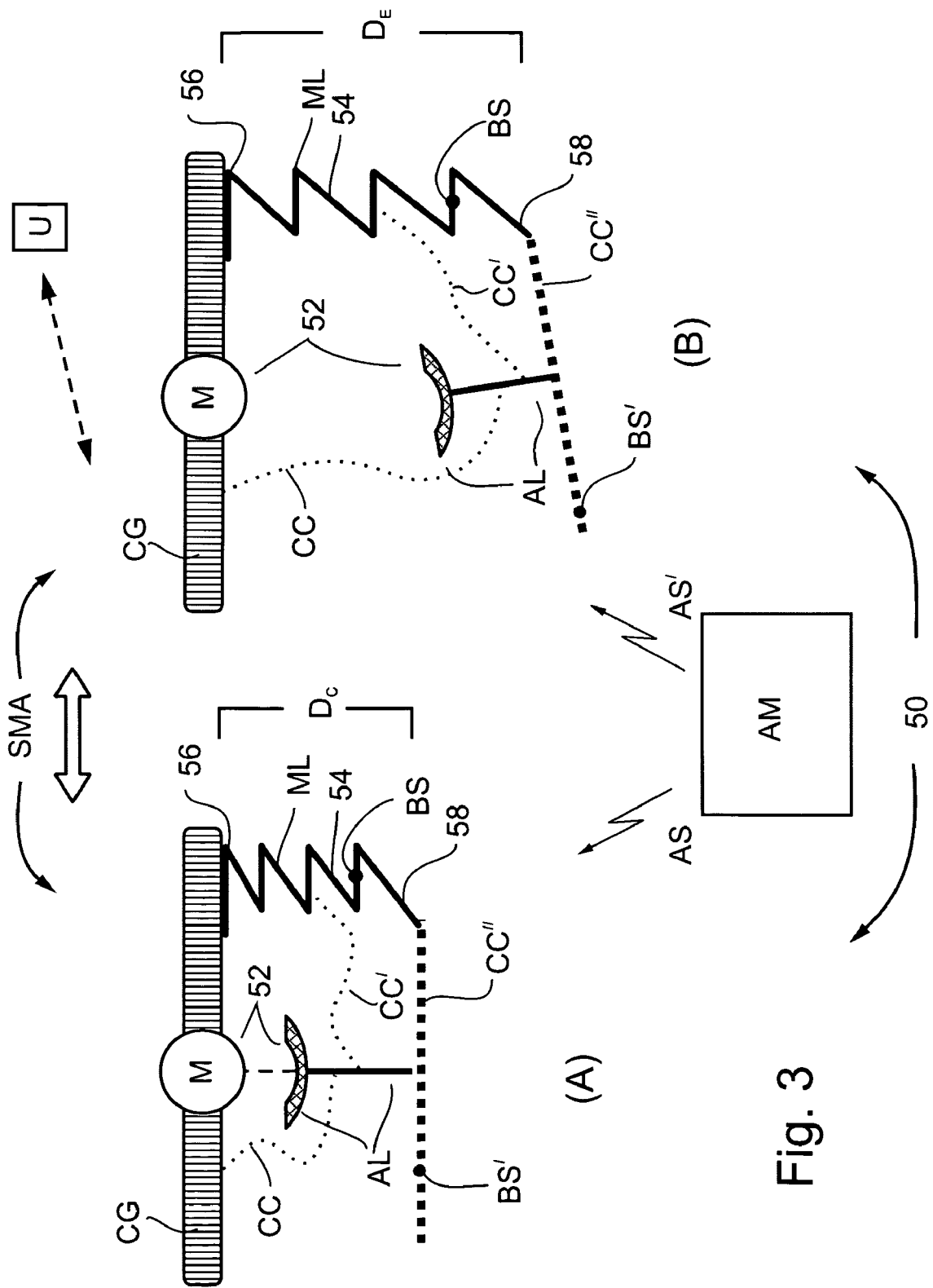
FIG. 3 is a schematic diagram illustrating a side view of a third exemplary preferred embodiment of the synthetic molecular spring device, showing a single synthetic molecular assembly, SMA, as a non-limiting example, wherein (A) shows the molecular linker, ML, in a contracted conformational state, and, (B) shows the molecular linker, ML, in an expanded conformational state, in accordance with the present invention.

FIG. 3 is a schematic diagram illustrating a side view of a third exemplary preferred embodiment of the synthetic molecular spring device of the present invention, showing a single synthetic molecular assembly, SMA, as a non-limiting example, wherein (A) shows the molecular linker, ML, in a contracted conformational state, and, (B) shows the molecular linker, ML, in an expanded conformational state.

In FIGS. 3[(A) and (B)], synthetic molecular spring device 50 features primary components: (i) a synthetic molecular assembly, SMA, featuring one chemical unit or module including: (1) one atom, M, (2) one complexing group, CG, complexed to the atom, M, (3) an axial monodentate ligand, AL, reversibly physicochemically paired with the atom M, via atom-axial ligand pair 52, and, (4) a substantially elastic molecular linker, ML, having a body 54, and, having two ends 56 and 58, where end 54 is chemically bonded to the complexing group, CG, and, end 56 is chemically bonded via chemical connector, CC", to the axial monodentate ligand, AL; and, (ii) an activating mechanism, AM, operatively directed to atom-axial ligand pair 52, whereby following activating mechanism, AM, sending an activating signal, AS/AS', to the atom-axial ligand pair 52, for physicochemically modifying the atom-axial ligand pair 52, there is activating at least one cycle of spring-type elastic reversible transitions (indicated by the double lined two directional arrow) between a contracted linear conformational state (A) and an expanded linear conformational state (B) of the molecular linker, ML.

As shown in FIG. 3, the synthetic molecular assembly, SMA, includes additional components: (5) three chemical connectors, CC and CC', for chemically connecting the axial monodentate ligand, AL, to the complexing group, CG, and, to the body 54 of the molecular linker, ML, respectively, and, CC" for chemically connecting the end 58 of the molecular linker, ML, to the axial monodentate ligand, AL, and, (6) two binding sites, BS and BS', located at the body 54 of the molecular linker, ML, and, at the chemical connector, CC", respectively, for potentially binding or operatively coupling at least one of these positions of the synthetic molecular assembly, SMA, to an external entity, such as a selected unit (U), part of or separate from a more encompassing mechanism, device, or system, generally indicated in FIG. 3 by the dashed arrow between the synthetic molecular assembly, SMA, and a selected unit, U.

The spring-type elastic reversible transition (indicated by the double lined two directional arrow) from the contracted (A) to the expanded (B) linear conformational state, or, from the expanded (B) to the contracted (A) linear conformational state, of the molecular linker, ML, is characterized by the previously defined parameter, the molecular linker inter-end effective distance change, $D_E$–$D_C$, or, $D_C$–$D_E$, respectively, indicating the sign, that is, positive or negative, respectively, and, the magnitude, of the change in the inter-end effective distance, D, in the linear direction along a longitudinal axis extending between the two ends 56 and 58 of the molecular linker, ML, following the respective spring-type elastic reversible transition in linear conformational states, as indicated in FIG. 3.

With respect to the method using a synthetic molecular spring device, such as synthetic molecular spring device 50 illustrated in FIG. 3, in a system for dynamically controlling a system property, and a corresponding system thereof, according to the present invention, at least one of binding sites, BS and BS', of synthetic molecular spring device 50, is for binding or operatively coupling the indicated position or positions of the synthetic molecular assembly, SMA, to at least one element or component of an external entity being a selected unit, U, of the system, for example, by using a physical, chemical, or physicochemical, binding or coupling mechanism (as further described below and illustratively exemplified in FIGS. 9-18), wherein the selected unit, U, exhibits the system property which is dynamically controllable by synthetic molecular spring device 50. Moreover, the parameter, molecular linker inter-end effective distance change, $D_E$–$D_C$, or, $D_C$–$D_E$, is directly associated with and correlated to the extent by which the system property is dynamically controllable by synthetic molecular spring device 50.

As stated above, FIG. 3 shows a single synthetic molecular assembly, SMA, as a non-limiting example, whereby, with respect to typical commercial application of the method and corresponding system thereof, of the present invention, synthetic molecular spring device 50 features a plurality of synthetic molecular assemblies, SMAs, whereby each synthetic molecular assembly, SMA, of the plurality of synthetic molecular assemblies, SMAs, is characterized and used according to the above described and illustrated structure/function relationships and behavior of a single synthetic molecular assembly, SMA.

Figure 4:
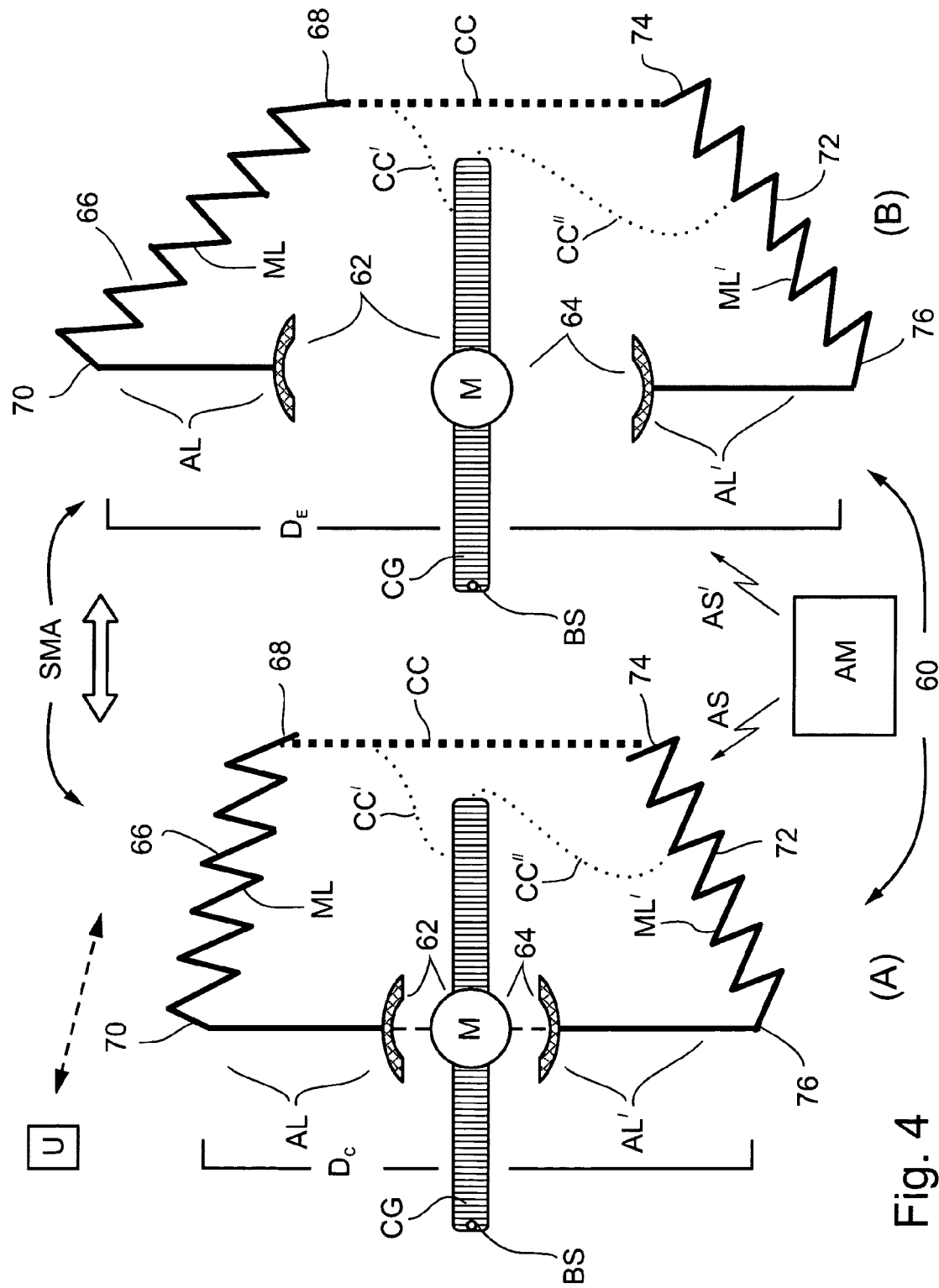
FIG. 4 is a schematic diagram illustrating a side view of a fourth exemplary preferred embodiment of the synthetic molecular spring device, showing a single synthetic molecular assembly, SMA, as a non-limiting example, wherein (A) shows the molecular linkers, ML and ML', in a contracted conformational state, and, (B) shows the molecular linkers, ML and ML', in an expanded conformational state, in accordance with the present invention.

FIG. 4 is a schematic diagram illustrating a side view of a fourth exemplary preferred embodiment of the synthetic molecular spring device of the present invention, showing a single synthetic molecular assembly, SMA, as a non-limiting example, wherein (A) shows the molecular linkers, ML and ML', in a contracted conformational state, and, (B) shows the molecular linkers, ML and ML', in an expanded conformational state.

In FIGS. 4[(A) and (B)], synthetic molecular spring device 60 features primary components: (i) a synthetic molecular assembly, SMA, featuring one chemical unit or module including: (1) one atom, M, (2) one complexing group, CG, complexed to the atom, M, (3) two axial monodentate ligands, AL and AL', each reversibly physicochemically paired with atom M, via corresponding atom-axial ligand pairs 62 and 64, respectively, and, (4) a first substantially elastic molecular linker, ML, having a body 66, and, having two ends 68 and 70, where end 68 is chemically bonded to a first chemical connector, CC, and, end 70 is chemically bonded to the first axial monodentate ligand, AL, and, a second substantially elastic molecular linker, ML', having a body 72, and, having two ends 74 and 76, where end 74 is chemically bonded to the first chemical connector, CC, and, end 76 is chemically bonded to the second axial monodentate ligand, AL'; and, (ii) an activating mechanism, AM, operatively directed to at least one of the two atom-axial ligand pairs 62 and 64, for example, both atom-axial ligand bonds 62 and 64 (as shown), whereby following the activating mechanism, AM, sending an activating signal, AS/AS', to at least one of the two atom-axial ligand pairs 62 and 64, for example, both atom-axial ligand bonds 62 and 64 (as shown), for physicochemically modifying at least one of the two atom-axial ligand bonds 62 and 64, for example, both atom-axial ligand bonds 62 and 64 (as shown), there is activating at least one cycle of spring-type elastic reversible transitions (indicated by the double lined two directional arrow) between a contracted linear conformational state (A) and an expanded linear conformational state (B) of the molecular linkers, ML and ML'.

As shown in FIG. 4, the synthetic molecular assembly, SMA, includes additional components: (5) three chemical connectors, CC, for chemically connecting the end 68 of the first molecular linker, ML, to the end 74 of the second molecular linker, ML', CC', for chemically connecting the complexing group, CG, to the chemical connector, CC, and, CC", for chemically connecting the complexing group, CG, to the body 72 of the second molecular linker, ML', and, (6) one binding site, BS, located at the complexing group, CG, for potentially binding or operatively coupling this position of the synthetic molecular assembly, SMA, to an external entity, such as a selected unit (U), part of or separate from a more encompassing mechanism, device, or system, generally indicated in FIG. 4 by the dashed arrow between the synthetic molecular assembly, SMA, and a selected unit, U.

The spring-type elastic reversible transition (indicated by the double lined two directional arrow) from the contracted (A) to the expanded (B) linear conformational state, or, from the expanded (B) to the contracted (A) linear conformational state, of at least one of the two molecular linkers, ML and ML', is characterized by the previously defined parameter, the molecular linker inter-end effective distance change, $D_E$–$D_C$, or, $D_C$–$D_E$, respectively, indicating the sign, that is, positive or negative, respectively, and, the magnitude, of the change in the inter-end effective distance, D, in the linear direction along a longitudinal axis extending between the two arbitrarily selected ends 70 and 76 of the first molecular linker, ML, and the second molecular linker, ML', respectively, following the respective spring-type elastic reversible transition in linear conformational states, as indicated in FIG. 4.

With respect to the method using a synthetic molecular spring device, such as synthetic molecular spring device 60 illustrated in FIG. 4, in a system for dynamically controlling a system property, and a corresponding system thereof, according to the present invention, binding site, BS, of synthetic molecular spring device 60, is for binding or operatively coupling the indicated position of the synthetic molecular assembly, SMA, to at least one element or component of an external entity being a selected unit, U, of the system, for example, by using a physical, chemical, or physicochemical, binding or coupling mechanism (as further described below and illustratively exemplified in FIGS. 9-18), wherein the selected unit, U, exhibits the system property which is dynamically controllable by synthetic molecular spring device 60. Moreover, the parameter, molecular linker inter-end effective distance change, $D_E$–$D_C$, or, $D_C$–$D_E$, is directly associated with and correlated to the extent by which the system property is dynamically controllable by synthetic molecular spring device 60.

As stated above, FIG. 4 shows a single synthetic molecular assembly, SMA, as a non-limiting example, whereby, with respect to typical commercial application of the method and corresponding system thereof, of the present invention, synthetic molecular spring device 60 features a plurality of synthetic molecular assemblies, SMAs, whereby each synthetic molecular assembly, SMA, of the plurality of synthetic molecular assemblies, SMAs, is characterized and used according to the above described and illustrated structure/function relationships and behavior of a single synthetic molecular assembly, SMA.

Figure 5:
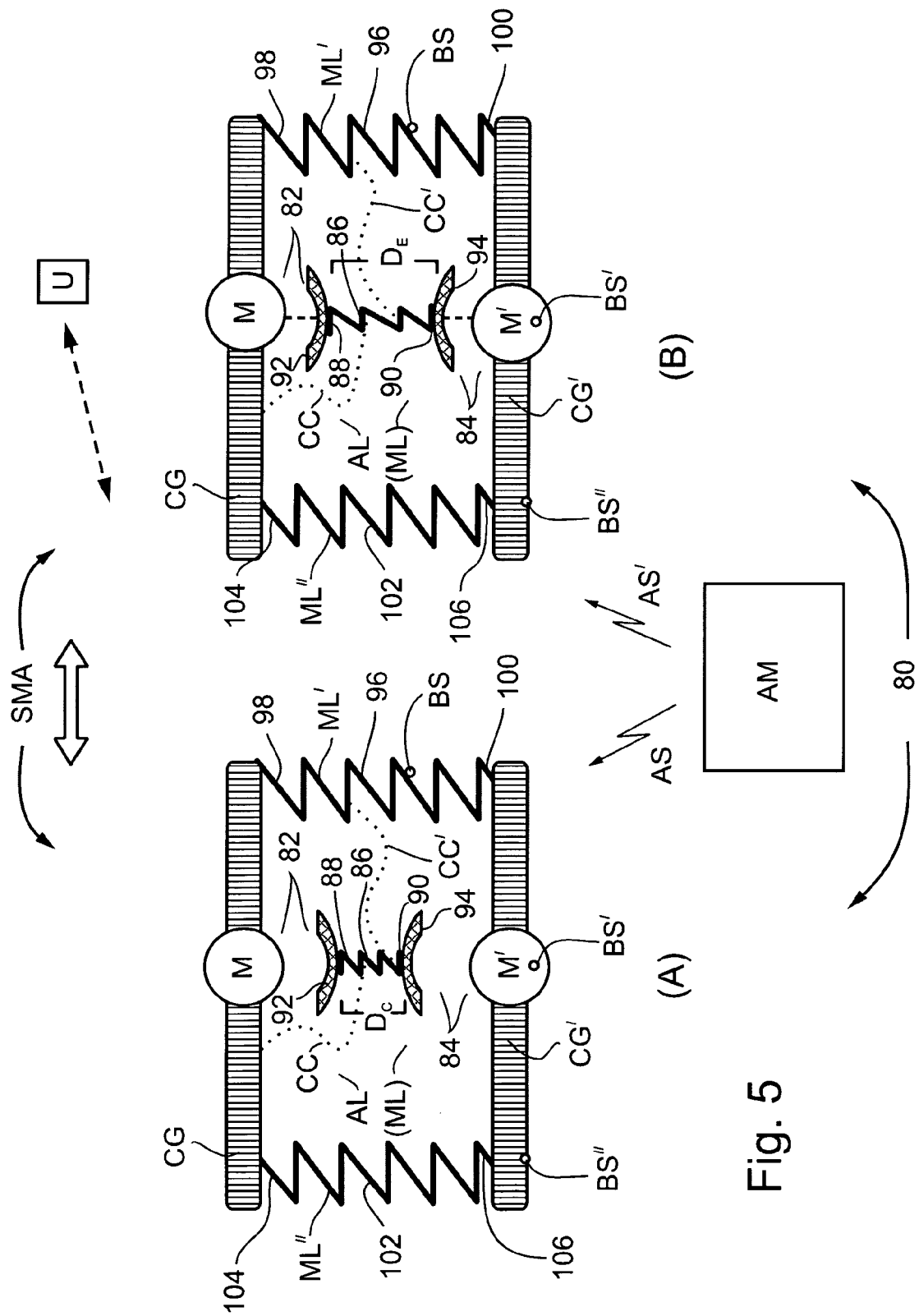
FIG. 5 is a schematic diagram illustrating a side view of a fifth exemplary preferred embodiment of the synthetic molecular spring device, showing a single synthetic molecular assembly, SMA, as a non-limiting example, wherein (A) shows the molecular linker, ML, in a contracted conformational state, and, (B) shows the molecular linker, ML, in an expanded conformational state, in accordance with the present invention.

FIG. 5 is a schematic diagram illustrating a side view of a fifth exemplary preferred embodiment of the synthetic molecular spring device of the present invention, showing a single synthetic molecular assembly, SMA, as a non-limiting example, wherein (A) shows the molecular linker, ML, in a contracted conformational state, and, (B) shows the molecular linker, ML, in an expanded conformational state.

In FIGS. 5[(A) and (B)], synthetic molecular spring device 80 features primary components: (i) a synthetic molecular assembly, SMA, featuring one chemical unit or module including: (1) two atoms, M and M', (2) two complexing groups, CG and CG', each complexed to a corresponding atom, M and M', respectively, (3) an axial bidentate ligand, AL, reversibly physicochemically paired with each of the two atoms M and M', via corresponding atom-axial ligand pairs 82 and 84, respectively, where, in this exemplary preferred embodiment, in contrast to the four previously described and illustrated exemplary preferred embodiments (FIGS. 1-4), the body 86 of the axial bidentate ligand, AL, is a substantially elastic molecular linker, ML, having body 86, and, having two ends 88 and 90 each chemically bonded to a single end 92 and 94, respectively, of the axial bidentate ligand, AL, and, (4) a first substantially rigid molecular linker, ML', having a body 96, and, having two ends 98 and 100 each chemically bonded to a single corresponding complexing group, CG and CG', respectively, and, a second substantially rigid molecular linker, ML", having a body 102, and, having two ends 104 and 106 each chemically bonded to a single corresponding complexing group, CG and CG', respectively; and, (ii) an activating mechanism, AM, operatively directed to at least one of the two atom-axial ligand pairs 82 and 84, for example, both atom-axial ligand bonds 82 and 84 (as shown), whereby following the activating mechanism, AM, sending an activating signal, AS/AS', to at least one of the two atom-axial ligand pairs 82 and 84, for example, both atom-axial ligand bonds 82 and 84 (as shown), for physicochemically modifying at least one of the two atom-axial ligand pairs 82 and 84, for example, both atom-axial ligand bonds 82 and 84 (as shown), there is activating at least one cycle of spring-type elastic reversible transitions (indicated by the double lined two directional arrow) between a contracted linear conformational state (A) and an expanded linear conformational state (B) of the substantially elastic molecular linker, ML.

As shown in FIG. 5, the synthetic molecular assembly, SMA, includes additional components: (5) two chemical connectors, CC and CC', for chemically connecting the body 86 (that is, the first molecular linker, ML) of the axial bidentate ligand, AL, to the body 96 of the second molecular linker, ML', and, to the complexing group, CG, respectively, and, (6) three binding sites, BS, BS', and BS", located at the body 96 of the second molecular linker, ML', at the atom, M', and, at the complexing group, CG', respectively, for potentially binding or operatively coupling at least one of these positions of the synthetic molecular assembly, SMA, to an external entity, such as a selected unit (U), part of or separate from a more encompassing mechanism, device, or system, generally indicated in FIG. 5 by the dashed arrow between the synthetic molecular assembly, SMA, and a selected unit, U.

The spring-type elastic reversible transition (indicated by the double lined two directional arrow) from the contracted (A) to the expanded (B) linear conformational state, or, from the expanded (B) to the contracted (A) linear conformational state, of the first substantially elastic molecular linker, ML, is characterized by the previously defined parameter, the molecular linker inter-end effective distance change, $D_E$–$D_C$, or, $D_C$–$D_E$, respectively, indicating the sign, that is, positive or negative, respectively, and, the magnitude, of the change in the inter-end effective distance, D, in the linear direction along a longitudinal axis extending between the two ends 88 and 90 of the molecular linker, ML, following the respective spring-type elastic reversible transition in linear conformational states, as indicated in FIG. 5.

With respect to the method using a synthetic molecular spring device, such as synthetic molecular spring device 80 illustrated in FIG. 5, in a system for dynamically controlling a system property, and a corresponding system thereof, according to the present invention, at least one of binding sites, BS, BS', and BS", of synthetic molecular spring device 80, is for binding or operatively coupling the indicated position or positions of the synthetic molecular assembly, SMA, to at least one element or component of an external entity being a selected unit, U, of the system, for example, by using a physical, chemical, or physicochemical, binding or coupling mechanism (as further described below and illustratively exemplified in FIGS. 9-18), wherein the selected unit, U, exhibits the system property to be dynamically controllable by synthetic molecular spring device 80. Moreover, the parameter, molecular linker inter-end effective distance change, $D_E$–$D_C$, or, $D_C$–$D_E$, is directly associated with and correlated to the extent by which the system property is dynamically controllable by synthetic molecular spring device 80.

As stated above, FIG. 5 shows a single synthetic molecular assembly, SMA, as a non-limiting example, whereby, with respect to typical commercial application of the method and corresponding system thereof, of the present invention, synthetic molecular spring device 80 features a plurality of synthetic molecular assemblies, SMAs, whereby each synthetic molecular assembly, SMA, of the plurality of synthetic molecular assemblies, SMAs, is characterized and used according to the above described and illustrated structure/function relationships and behavior of a single synthetic molecular assembly, SMA.

It is especially noted that the term 'reversibly physicochemically paired' used for describing an axial ligand, AL, reversibly physicochemically paired with an atom, M, means that the axial ligand, AL, and the atom, M, are capable of reversibly physicochemically debonding or dissociating from each other, to a controllable extent or degree, and, bonding to, or associating with, each other, to a controllable extent or degree, following the activating mechanism, AM, sending an activating signal, AS/AS', to a predetermined atom-axial ligand pair, that is, to an atom-axial ligand 'bonded' pair, or, to an atom-axial ligand 'non-bonded' pair, for physicochemically modifying, that is, for 'debonding' the atom-axial ligand bonded pair, to a controllable extent or degree, or, for 'bonding' the atom-axial ligand non-bonded pair, to a controllable extent or degree, respectively, as illustrated by (A) and (B), respectively, in FIGS. 1-5.

It is this type of controllable reversible chemical debonding and bonding capability of the atom-axial ligand pair, initiated by controllable operation of the activating mechanism, AM, which provides the driving force for activating each cycle of spring-type elastic reversible transitions between contracted and expanded linear conformational states of a substantially elastic molecular linker, ML, of the synthetic molecular assembly, SMA, of the synthetic molecular spring device of the present invention.

Accordingly, for implementing the synthetic molecular spring device of the present invention, an operator operates and controls the activating mechanism, AM, for sending an activating signal, AS/AS', to 'either' the atom-axial ligand 'bonded' pair, or, to the atom-axial ligand 'non-bonded' pair, for physicochemically modifying, that is, for 'debonding' the atom-axial ligand bonded pair, to a controllable extent or degree, or, for 'bonding' the atom-axial ligand non-bonded pair, to a controllable extent or degree, respectively, thereby activating at least one cycle of spring-type elastic reversible transitions between contracted and expanded linear conformational states of a substantially elastic molecular linker, ML.

In the immediately preceding five exemplary preferred embodiments of the generalized synthetic molecular spring device, this type of controllable reversible debonding and bonding, or, bonding and debonding, process, is generally referred to along with use of the phrase 'activating at least one cycle of spring-type elastic reversible transitions between a contracted linear conformational state (A) and an expanded linear conformational state (B) of the molecular linker, where the linear conformational states (A) and (B) are appropriately illustrated in each accompanying drawing.

Following are further details describing function and structure, along with specific preferred categories and sub-categories of different types of each of the above indicated components of the synthetic molecular spring device of the present invention. The following details are applicable to the above described generalized synthetic molecular spring device, and, to each of the previously described five exemplary preferred embodiments of the synthetic molecular spring device, illustrated in FIGS. 1-5. For illustrative purposes, typically, function and structure are described below with reference to each single component, for example, the atom, M, the complexing group, CG, the axial ligand, AL, and, the molecular linker ML, of the synthetic molecular assembly, SMA, and, of the activating mechanism, AM, however, it is to be clearly understood that such description is extendable and applicable to embodiments of the synthetic molecular spring device of the present invention featuring a plurality of these single components.

The atom, M, which is complexed to the complexing group, CG, functions by being reversibly physicochemically paired, as described above, with the axial ligand, AL, thereby, forming the reversibly physicochemically paired atom-axial ligand pair, for example, atom-axial ligand pairs 12 and 14 (FIG. 1), 32, 34, and 36 (FIG. 2), 52 (FIG. 3), 62 and 64 (FIG. 4), and, 82 and 84 (FIG. 5).

In general, in each of the contracted linear conformational state (A) and the expanded linear conformational state (B), the nature of the reversible physicochemical pairing interaction between the complexed atom, M, and the axial ligand, AL, varies from being a clearly defined chemical interaction or bond, such as a covalent, coordination, or, ionic, bond of varying degree or extent of covalency, coordination, or, ionic strength, to being a pair of two non-interacting, non-bonding, or anti-bonding, components, that is, the complexed atom, M, and the axial ligand, AL, located as neighbors in the same immediate vicinity within the synthetic molecular assembly, SMA.

In most cases, for example, as applicable to the previously described first four exemplary preferred embodiments of the synthetic molecular spring device, illustrated in FIGS. 1-4, in the contracted linear conformational state (A), the complexed atom, M, and the axial ligand, AL, are in the form of a chemical bond, such as a covalent, coordination, or, ionic, bond of varying degree or extent of covalency, coordination, or, ionic strength, whereas, in the expanded linear conformational state (B), the complexed atom, M, and the axial ligand, AL, are in the form of a pair of non-interacting, non-bonding, or anti-bonding, components located as neighbors in the same immediate vicinity within the synthetic molecular assembly, SMA.

In some cases, however, for example, as applicable to the previously described fifth exemplary preferred embodiment of the synthetic molecular spring device, illustrated in FIG. 5, the opposite phenomenon takes place, whereby in the contracted linear conformational state (A), the complexed atom, M, and the axial ligand, AL, are in the form of a pair of non-interacting, non-bonding, or anti-bonding, components located as neighbors in the same immediate vicinity within the synthetic molecular assembly, SMA, whereas, in the expanded linear conformational state (B), the complexed atom, M, and the axial ligand, AL, are in the form of a chemical bond, such as a covalent, coordination, or, ionic, bond of varying degree or extent of covalency, coordination, or, ionic strength.

In principle, the atom, M, which is complexed to the complexing group, CG, is at least one neutral atom or at least one positively charged atom (cation), capable of forming at least one additional chemical bond of varying degree or extent of covalency, coordination, or, ionic strength, with another component of the synthetic molecular assembly, SMA. In particular, the atom, M, is any neutral atom or positively charged atom (cation), of an element selected from the group consisting of metals, semi-metals, and, non-metals. For example, the atom, M, is a cation selected from the group consisting of divalent transition metal cations, and, trivalent transition metal cations. Additionally, for example, the atom, M, is a cation of a metallic element selected from the group consisting of magnesium, chromium, manganese, iron, ruthenium, osmium, cobalt, rhodium, nickel, copper, zinc, silicon, and, titanium. Additionally, for example, the atom, M, is a cation of a metallic element selected from the group consisting of magnesium, iron, nickel, cobalt, copper, and, zinc.

The complexing group, CG, complexed to the atom, M, primarily functions by locally positioning the atom, M, in relation to the overall structure of the synthetic molecular assembly, SMA, in general, and, in relation to the structure and position of a substantially elastic molecular linker, ML, in particular, which is activated for undergoing the spring-type elastic reversible transitions between contracted and expanded linear conformational states.

For example, with reference to FIG. 1, wherein the synthetic molecular spring device 10, the synthetic molecular assembly, SMA, includes two substantially elastic molecular linkers, ML and ML', each having a body, and, having two ends each chemically bonded to a single corresponding complexing group, CG and CG', respectively, in the particular case whereby the atom, M, is the same as the atom, M', being Co(II) metal cation, and, whereby the first complexing group, CG, is the same as the second complexing group, CG', being a porphyrin, the Co(II) cations are essentially confined to the porphyrin core. Each Co-Porphyrin complex is chemically connected, via covalent bonding, to both molecular linkers, ML and ML', thereby determining the relative positions of the Co(II) cations.

A second function of the complexing group, CG, is for tuning or adjusting the bonding/debonding energy of the atom-axial ligand pair. This tuning or adjusting function exists due to the fact that the bonding/debonding energy of the atom-axial ligand pair is related to the type, strength, and, physicochemical characteristics, of the complex between the atom, M, and the complexing group, CG. For example, the metal atom of a typical metal-porphyrin type of atom-complexing group complex usually has a higher binding energy to a particular axial ligand, specifically functioning as a sigma donor, when the porphyrin complexing group has electron withdrawing groups in peripheral meso-positions. For example, in meso-tetra (pentafluorophenyl) substituted porphyrin.

A third function of the complexing group, CG, is for tuning or adjusting the activation energy, necessarily contained in the activating signal, AS/AS', sent by the activating mechanism, AM, which is required for activating the spring-type elastic reversible transitions between the contracted linear conformational state (A) and the expanded linear conformational state (B) of the molecular linker, ML. For example, the redox potential, relating to the activation energy contained in the activating signal, AS/AS', sent by an electrochemical type of activating mechanism, AM, can be designed by selecting a complexing group, CG, skeleton and an atom, M, such that the complexing group, CG, can be a macrocylic compound selected from the group consisting of porphyrins, substituted porphyrins, dihydroporphyrins, substituted dihydroporphyrins, tetrahydroporphyrins, and, substituted tetrahydroporphyrins. In this case, the degree of macrocycle saturation is increased, while maintaining the same additional substituting groups on the macrocycle used for creating chemical bonds, for example, to one or more molecular linkers, ML. Usually, the degree of macrocycle saturation has a major effect on redox potentials, and, therefore, on the activation energy contained in the activating signal, AS/AS', while conserving functional and structural characteristics and behavior of the synthetic molecular assembly, SMA.

A fourth, optional, function of the complexing group, CG, as part of the synthetic molecular assembly, SMA, is for serving as a medium of electrical and/or electronic conduction, as a type of molecular conducting wire, for providing an efficient electrical/electronic operative coupling or connection either between two components of the synthetic molecular assembly, SMA, or, between a component of the synthetic molecular assembly, SMA, and at least one element or component, such as at least one electrode, of an entity external to the synthetic molecular assembly, SMA, such as a selected unit, U, (generally indicated in FIGS. 1-5 as selected unit, U), part of or separate from a more encompassing mechanism, device, or system. Accordingly, at least one of the phenomena of electrical conductance, electronic conductance, and electronic tunneling, occurs either between the two components of the synthetic molecular assembly, SMA, or, between the component of the synthetic molecular assembly, SMA, and the at least one element or component, such as the at least one electrode, of the entity external to the synthetic molecular assembly, SMA, such as the selected unit, U.

When functioning as a type of molecular conducting wire, the particular chemical type, structural geometrical configuration or form, and dimensions, of the complexing group, CG, are selected for optimizing electrical/electronic charge flow along a designated electrical/electronic path of an electrical/electronic circuit, including at least part of the synthetic molecular assembly, SMA, either between the two components of the synthetic molecular assembly, SMA, or, between the component of the synthetic molecular assembly, SMA, and the at least one element or component, such as the at least one electrode, of the entity external to the synthetic molecular assembly, SMA, such as the selected unit, U.

Exemplary utilization of this fourth, optional, function of the complexing group, CG, is illustratively described below in several specific exemplary preferred embodiments of implementing the generalized method and the corresponding generalized system thereof, of the present invention. In particular, in embodiments of systems 300, 400, and 550, illustrated in FIGS. 11, 13, and 16, respectively, wherein the complexing group, CG or CG', is part of a designated electrical/electronic path of an electronic circuit U, including at least part of the synthetic molecular assembly, SMA, which is electrically/electronically operatively coupled or connected to at least two electrodes, $E_i$, of electronic circuit U, of the respective system.

In general, the complexing group, CG, is a chemical compound capable of complexing, via at least one chemical bond of varying degree or extent of covalency, coordination, or, ionic strength, the atom, M, and, has a variable geometrical configuration or form with variable dimensions and flexibility.

Preferably, the complexing group, CG, is a chemical compound selected from the group consisting of cyclic chemical compounds, polycyclic chemical compounds, noncyclic chemical compounds, linear chemical compounds, branched chemical compounds, and, combinations thereof.

In particular, as a cyclic chemical compound, the complexing group, CG, is selected from the group consisting of macroheterocyclic chemical compounds, and, macrocyclic chemical compounds. More specifically, as a macroheterocyclic chemical compound, the complexing group, CG, is selected from the group consisting of polyazamacrocycles, crown ethers, and, cryptates. More specifically, as a polyazamacrocycle type of chemical compound, the complexing group, CG, is selected from the group consisting of tetrapyrroles, phtalocyanines, and, naphthalocyanines. More specifically, as a tetrapyrrole type of chemical compound, the complexing group, CG, is selected from the group consisting of porphyrins, chlorines, bacteriochlorines, corroles, and, porphycens.

In particular, as a non-cyclic chemical compound, the complexing group, CG, is selected from the group consisting of open tetrapyrroles, for example, phycocyanobilin, and, phycoerythrobilin.

Preferably, the complexing group, CG, is a chemical compound which functions as a chemical chelator for chelating the atom, M, thereby forming a chelate with the atom, M. In this case, the chelate corresponds to a heterocyclic ring containing the atom, M, preferably, as a metal cation, attached by coordinate bonds to at least two nonmetal ions of the complexing group, CG.

The axial ligand, AL, primarily functions by being reversibly physicochemically paired with the atom, M, which is complexed to the complexing group, CG, as described above, thereby, forming the reversibly physicochemically paired atom-axial ligand pair.

A second function of the axial ligand, AL, is for chemically interacting with at least one other component, in addition to the complexed atom, M, of the synthetic molecular assembly, SMA. More specifically, the axial ligand, AL, secondarily functions by chemically interacting with at least one other component, in addition to the complexed atom, M, selected from the group consisting of an additional atom, M', the complexing group, CG, the molecular linker, ML, the optional chemical connector, CC, and, the optional binding site, BS, of the synthetic molecular assembly, SMA. In particular, the axial ligand, AL, is for inducing the reversible transitions between contracted and expanded linear conformational states of a substantially elastic molecular linker, ML, by producing at least one coordinative bonding interaction with an atom, M, and, at least one additional bonding interaction with at least one other component of the synthetic molecular assembly, SMA.

As is well known in the art of ligand chemistry, an axial ligand may feature more than one type of region of physicochemical behavior. In the present invention, preferably, the axial ligand, AL, features at least two types of regions of physicochemical behavior. A first type of region of physicochemical behavior corresponds to that part of the axial ligand, AL, which participates in coordinative bonding interaction with the atom, M. A second type of region of physicochemical behavior corresponds to that part of the axial ligand, AL, connecting between either two first type of regions of the axial ligand, AL, or, connecting between a first type of region and another component of the synthetic molecular assembly, SMA.

In general, the first or second type of region of physicochemical behavior of the axial ligand, AL, may correspond to an 'end' or 'terminal' region of the axial ligand, AL, or, an 'intermediate' region of the axial ligand, AL. For example, in the particular case where the axial ligand, AL, is of a linear or branched geometrical configuration or form, the first or second type of region of physicochemical behavior of the axial ligand, AL, may correspond to an 'end' or 'terminal' region of the axial ligand, AL. In the particular case where the axial ligand, AL, is of a cyclic geometrical configuration or form, the first or second type of region of physicochemical behavior of the axial ligand, AL, necessarily corresponds to an 'intermediate' region of the axial ligand, AL, since, unless arbitrarily defined or assigned, a cyclic axial ligand has no 'end' or 'terminal' region.

A third function of the axial ligand, AL, is for tuning or adjusting the bonding/debonding energy of the atom-axial ligand pair. This tuning or adjusting function exists due to the fact that the bonding/debonding energy of the atom-axial ligand pair is directly related to the type, strength, and, physicochemical characteristics, of the axial ligand, AL, as well as those of the atom, M.

For illustrating this tuning or adjusting effect, calculations of the ligation energy, directly relating to the bonding energy, for bonding the axial ligand to the complex of the atom, M, and the complexing group, CG, being nickel-Bacteriocholrophyll, [Ni]—BChl, in the gas phase, were performed. The results are shown in the following table, and details of the calculation procedure follow hereinafter. It is noted that the exemplary axial ligands used in the calculations and presented in the table are not necessarily axial ligands included in a particular synthetic molecular assembly, SMA.

| Axial Ligand | Ligation Energy [KCal/Mol] |
| --- | --- |
| Imidazole | −15.4 |
| Pyridine | −13.1 |
| 4-tert butyl pyridine | −13.8 |
| 3-Flouropyridine | −11.9 |

The conformational analyses of the molecular systems indicated in the table, including the structural and orbital arrangements as well as property calculations, were carried out using a variety of computational techniques for comparative purposes, using GAUSSIAN98. The hybrid density functional (HDFT) technique used is B3LYP, which employs the Lee-Yang-Parr correlation functional in conjunction with a hybrid exchange functional first proposed by Becke. The Hay and Wadt relativistic effective core potentials (RECP) were used for the transition metal. The specific effective core potential/basis set combination chosen was LANL2DZ (Los Alamos National Laboratory 2-double-$\zeta$; the '2' indicating that the valence and 'valence-1' shells are treated explicitly). The LANL2DZ basis set is of double-$\zeta$ quality in the valence and 'valence-1' shells, whereas the RECP contains Darwin and mass-velocity contribution. For more accurate properties, fine-integration grid, tight single point property calculations were carried out using a larger basis set denoted LANL2DZ+1, which consists of the LANL2DZ basis set augmented with single f functions on Ni, and the standard Dunning's cc-pvdz (correlation consistent polarized valence double-$\zeta$) basis set ([4s3p1d/3s2p1d/2s1p]) on first and second row atoms.

A fourth function of the axial ligand, AL, is for tuning or adjusting the activation energy, necessarily contained in the activating signal, AS/AS', sent by the activating mechanism, AM, which is required for activating the spring-type elastic reversible transitions between the contracted linear conformational state (A) and the expanded linear conformational state (B) of the molecular linker, ML.

For example, measurements of the spectroscopic electronic p-p* transition directly relating to the activation energy, needed for debonding the axial ligand from a complex of the atom, M, and the complexing group, CG, being nickel-Bacteriocholrophyll, [Ni]—BChl, in acetonitrile, were performed. The results are shown in the following table. It is noted that the exemplary axial ligands used in the calculations and presented in the table are not necessarily axial ligands included in a particular synthetic molecular assembly, SMA.

Change in the optical spectrum of [Ni]—BChl with different axial ligands, measured in acetonitrile.

such as at least one electrode, of an entity external to the synthetic molecular assembly, SMA, such as a selected unit, U, (generally indicated in FIGS. 1-5 as selected unit, U), part of or separate from a more encompassing mechanism, device, or system. Accordingly, at least one of the phenomena of electrical conductance, electronic conductance, and electronic tunneling, occurs either between the two components of the synthetic molecular assembly, SMA, or, between the component of the synthetic molecular assembly, SMA, and the at least one element or component, such as the at least one electrode, of the entity external to the synthetic molecular assembly, SMA, such as the selected unit, U.

When functioning as a type of molecular conducting wire, the particular chemical type, structural geometrical configuration or form, and dimensions, of the axial ligand, AL, are selected for optimizing electrical/electronic charge flow along a designated electrical/electronic path of an electrical/electronic circuit, including at least part of the synthetic molecular assembly, SMA, either between the two components of the synthetic molecular assembly, SMA, or, between the component of the synthetic molecular assembly, SMA, and the at least one element or component, such as the at least one electrode, of the entity external to the synthetic molecular assembly, SMA, such as the selected unit, U.

For example, in a synthetic molecular assembly, SMA, wherein there are at least two atoms, M, or, M and M'. In this case, it is preferable to have the axial ligand, AL, featuring a conjugated $\pi$-system electronic configuration. A specific example of this case, is where the synthetic molecular assembly, SMA, includes the complexing group, CG, being porphyrin or phtalocyanine, the atoms, M and M', each being an iron cation at a different oxidation state, and the axial ligand, AL, being 1,4-diisocyanobenzene.

Exemplary utilization of this fifth, optional, function of the axial ligand, AL, is illustratively described below in two specific exemplary preferred embodiments of implementing the generalized method and the corresponding generalized system thereof, of the present invention. In particular, in embodiments of systems 400 and 450, illustrated in FIGS. 13

| Ligand | $\Delta$Qy [cm$^{-1}$] | | $\Delta$Qx [cm$^{-1}$] | | $\Delta$Bx [cm$^{-1}$] | | $\Delta$By [cm$^{-1}$] | |
|---|---|---|---|---|---|---|---|---|
|  | 1/2[a] | | 1/2 | | 1 | 2 | 1/2 | |
| 1-methylimidazole | 203.02 | 258.52 | −1278.20 | −2198.53 | 0 | 0 | −957.46 | −2260.28 |
| Pyridine | 269.20 | 285.24 | −1131.33 | −1990.63 | 0 | 0 | −1243.10 | −2155.60 |
| 4-picoline | 237.40 | 279.20 | −1169.91 | −2004.44 | 0 | 0 | −904.30 | −2184.50 |
| 4-aminopyridine | 237.91 | 271.78 | −1227.46 | −2150.22 | 0 | 0 | −1186.91 | −2325.12 |
| 3-Flouropyridine | 352.96 | 280.75 | −1059.96 | −1851.78 | 0 | 0 | −1157.51 | −2207.28 |
| Piperidine | 226.26 | 269.02 | −1260.70 | −2128.88 | 0 | 0 | −1093.60 | −2141.89 |
| Cyanide anion[b] | 205.75 | * | −1925.47 | * | 0 | 0 | −1744.47 | * |

[a]the notation 1/2 indicates one, or two axial ligands, respectively.
[b]with cyanide anion (CN-), only one axial ligand is bonded.

Qy, Qx, Bx, and, By, in order of increasing energy, are the four observed spectroscopic electronic p-p* transitions for metal Bacteriocholrophylls. The DeltaQ in the table is relative to non axially ligated [Ni]—BChl.

A fifth, optional, function of the axial ligand, AL, as part of the synthetic molecular assembly, SMA, is for serving as a medium of electrical and/or electronic conduction, as a type of molecular conducting wire, for providing an efficient electrical/electronic operative coupling or connection either between two components of the synthetic molecular assembly, SMA, or, between a component of the synthetic molecular assembly, SMA, and at least one element or component, and 14, respectively, wherein the axial ligand, AL, is part of a designated electrical/electronic path of an electronic circuit U, including at least part of the synthetic molecular assembly, SMA, which is electrically/electronically operatively coupled or connected to at least two electrodes, $E_i$, of electronic circuit U, of the respective system.

A sixth, less critical, function of the axial ligand, AL, is for local positioning of the atom, M, in relation to the overall structure of the synthetic molecular assembly, SMA. For example, in some metal porphyrins, or phtalocyanines, when changing the coordination state of the atom, M, between tetra- and penta-, or, between hexa- and penta-, coordinated states, the atom, M, may change its position relative to the complexing group, CG, from an in-plane to an out-of-plane configuration.

In general, the axial ligand, AL, is a chemical compound capable of physicochemically interacting, via at least one chemical bond of varying degree or extent of covalency, coordination, or, ionic strength, with the atom, M, and, has a variable geometrical configuration or form with variable dimensions and flexibility. Additionally, the axial ligand, AL, is a chemical compound capable of chemically interacting with at least one other component, in addition to the complexed atom, M, of the synthetic molecular assembly, SMA, via at least one chemical bond of varying degree or extent of covalency, coordination, or, ionic strength. In general, the axial ligand, AL, is a type of ligand selected from the group consisting of monodentate ligands, bidentate ligands, tridentate ligands, and, multidentate ligands.

Preferably, the axial ligand, AL, is a chemical compound selected from the group consisting of anionic compounds, and, neutral compounds. Preferably, the axial ligand, AL, as a neutral compound, features an electron rich region or group, behaving as a Lewis acid.

In particular, as a neutral compound, the axial ligand, AL, is selected from the group consisting of heterocyclics, bridged heterocyclics, amines, ethers, alcohols, iso-cyanides, polyheterocyclics, amides, thiols, unsaturated compounds, alkylhalides, and, nitro compounds. For example, as a neutral compound, the axial ligand, AL, is selected from the group consisting of a substituted pyridine, a substituted imidazole, 4,4' bipyridine, and, 1,3-diaminopropane.

For example, as an anionic compound, the axial ligand, AL, is selected from the group consisting of cyanides, acids, and, carboxylic acids.

In a particular preferred embodiment of the present invention, the second type of region of physicochemical behavior of the axial ligand, AL, as described above, features spring-type elastic reversible function, structure, and behavior or characteristics, for example, as previously described above with respect to the fifth exemplary preferred embodiment of the synthetic molecular spring device, 80, as illustrated in FIG. 5. In that particular exemplary preferred embodiment, the axial ligand, AL, is an axial bidentate ligand, AL, reversibly physicochemically paired with each of the two atoms M and M', whereby the body 86 of the axial bidentate ligand, AL, is a substantially elastic molecular linker, ML, having body 86, and, having two ends 88 and 90 each chemically bonded to a single end 92 and 94, respectively, of the axial bidentate ligand, AL.

For implementing the present invention, preferably, the rational used for designing the synthetic molecular assembly, SMA, by selecting a particular combination of an atom(s), M, a complexing group(s), CG, and, an axial ligand(s), AL, is based on the particular type of activating mechanism, AM, selected. For example, in the case where it is desired to have chemical control, such as via pH control, over the action of the synthetic molecular assembly, SMA, in general, while avoiding transition from the contracted to the expanded conformational states of the molecular linker, ML, in particular, upon photoexcitation, the synthetic molecular assembly, SMA, may be designed to include the following specific primary components: the atom, M, being Mg(II), the complexing group, CG, being a porphyrin derivative, and, the axial ligand, AL, being an alcohol.

The molecular linker, ML, primarily functions by being substantially elastic, having a body, and, having two ends with at least one end chemically bonded to another component of the synthetic molecular assembly, SMA.

Moreover, the substantially elastic functionality, along with an appropriate structure, of the molecular linker, ML, is critically important for implementing the main aspect of multi-parametric controllable spring-type elastic reversible function, structure, and behavior, of the synthetic molecular spring device of the present invention. Specifically, as previously described above, with reference to the five exemplary preferred embodiments of the synthetic molecular spring device, as illustrated in FIGS. 1-5, following the activating mechanism, AM, sending an activating signal, AS/AS', to at least one predetermined atom-axial ligand pair, for physicochemically modifying the at least one predetermined atom-axial ligand pair, there is activating at least one cycle of spring-type elastic reversible transitions between a contracted linear conformational state (A) and an expanded linear conformational state (B) of the molecular linker, ML.

The molecular linker, ML, is selected according to a desired extent or degree of elasticity needed for the synthetic molecular assembly, SMA, in particular, and, for the synthetic molecular spring device, in general, to exhibit the multi-parametric controllable spring-type elastic reversible function, structure, and behavior, operable in a wide variety of different environments. More specifically, the elasticity of the molecular linker, ML, is selected in order to produce a sufficient mechanical spring-type elastic reversible restoring force, according to use of the activating mechanism, AM, when a particular linear conformational state, expanded or contracted, of the molecular linker, ML, is transformed from one state to the other state.

A second function, related to the primary function, of the molecular linker, ML, is for serving as a physical geometrical linear spacer as part of designing and synthesizing the geometrical configuration or form and dimensions, with respect to the contracted and expanded linear conformational states of the synthetic molecular assembly, SMA. The molecular linker, ML, is the primary component of the synthetic molecular assembly, SMA, which determines the extent or degree of transition from the contracted to the expanded linear conformational state, or, from the expanded to the contracted linear conformational state. As previously described above, this extent or degree of transition is characterized by the parameter, the molecular linker inter-end effective distance change, $D_E-D_C$, or, $D_C-D_E$, respectively, indicating the sign, that is, positive or negative, respectively, and, the magnitude, of the change in the inter-end 'effective' distance, D, between the two ends of a single molecular linker, ML, or, between two arbitrarily selected ends of a plurality of molecular linkers, ML, included in a particular synthetic molecular assembly, SMA, following the respective transition in linear conformational states.

A third function of the molecular linker, ML, is for directing the resulting translational or linear movement during the transition in linear conformational states, according to a defined trajectory along at least one arbitrarily defined axis of the synthetic molecular assembly, SMA.

A fourth, optional, function of the molecular linker, ML, as part of the synthetic molecular assembly, SMA, is for serving as a medium of electrical and/or electronic conduction, as a type of molecular conducting wire, for providing an efficient electrical/electronic operative coupling or connection either between two components of the synthetic molecular assembly, SMA, or, between a component of the synthetic molecular assembly, SMA, and at least one element or component, such as at least one electrode, of an entity external to the synthetic molecular assembly, SMA, such as a selected unit, U, (generally indicated in FIGS. 1-5 as selected unit, U), part of or separate from a more encompassing mechanism, device, or system. Accordingly, at least one of the phenomena of electrical conductance, electronic conductance, and electronic tunneling, occurs either between the two components of the synthetic molecular assembly, SMA, or, between the component of the synthetic molecular assembly, SMA, and the at least one element or component, such as the at least one electrode, of the entity external to the synthetic molecular assembly, SMA, such as the selected unit, U.

When functioning as a type of molecular conducting wire, the particular chemical type, structural geometrical configuration or form, and dimensions, of the molecular linker, ML, are selected for optimizing electrical/electronic charge flow along a designated electrical/electronic path of an electrical/electronic circuit, including at least part of the synthetic molecular assembly, SMA, either between the two components of the synthetic molecular assembly, SMA, or, between the component of the synthetic molecular assembly, SMA, and the at least one element or component, such as the at least one electrode, of the entity external to the synthetic molecular assembly, SMA, such as the selected unit, U.

Exemplary utilization of this fourth, optional, function of the molecular linker, ML, is illustratively described below in several specific exemplary preferred embodiments of implementing the generalized method and the corresponding generalized system thereof, of the present invention. In particular, in embodiments of systems 300, 400, 450, 500, and 600, illustrated in FIGS. 11, 13, 14, 15, and 17, respectively, wherein the molecular linker, ML or ML", is part of a designated electrical/electronic path of an electronic circuit U, including at least part of the synthetic molecular assembly, SMA, which is electrically/electronically operatively coupled or connected to at least two electrodes, $E_i$, of electronic circuit U, of the respective system.

In general, the molecular linker, ML, is a chemical entity which is substantially elastic, having a body, and, having two ends with at least one end chemically bonded, via at least one chemical bond of varying degree or extent of covalency, coordination, or, ionic strength, to another component of the synthetic molecular assembly, SMA, and, has a variable geometrical configuration or form with variable dimensions and flexibility.

In particular, the molecular linker, ML, has at least one end chemically bonded to another component selected from the group consisting of the atom, M, the complexing group, CG, the axial ligand, AL, the optional chemical connector, CC, and, the optional binding site, BS, of the synthetic molecular assembly, SMA. Preferably, the molecular linker, ML, has each of two ends chemically bonded to a different single corresponding complexing group, CG, for example, different single corresponding complexing groups, CG and CG', as previously described with respect to the first and second exemplary preferred embodiments of the synthetic molecular spring device, 10 and 30, illustrated in FIGS. 1 and 2, respectively.

In general, the molecular linker, ML, is a chemical entity selected from the group consisting of an entity of at least two individual atoms, and, an entity of at least two molecules. Preferably, the molecular linker, ML, is a chemical entity featuring at least two atoms capable of physicochemically interacting, via at least one chemical bond of varying degree or extent of covalency, coordination, or, ionic strength, with each other, and, with at least one other component of the synthetic molecular assembly, SMA.

More preferably, the molecular linker, ML, is selected from the group consisting of molecular chains with variable length, branching, and, saturation; cyclic compounds with various mono-, di-, or poly-functional groups; aromatic compounds with various mono-, di-, or poly-functional groups, and, combinations thereof.

In particular, the molecular linker, ML, is a chemical compound selected from the group consisting of alkanes, alkenes, alkynes, substituted phenyls, alcohols, ethers, mono-(aryleneethynylene)s, oligo-(aryleneethynylene)s, poly-(aryleneethynylene)s, and, (phenyleneethynylene)s. A specific example of the molecular linker, ML, is a chemical compound selected from the group consisting of C2 alkynes, C4 alkynes, C6 alkynes, 1,4 substituted phenyls, 1,4-substituted bicyclo [2.2.2]octanes, and, diethers.

The activating mechanism, AM, functions by controllably activating the spring-type elastic reversible function, structure, and behavior, of the synthetic molecular assembly, SMA. Specifically, as previously described above, with reference to the five exemplary preferred embodiments of the synthetic molecular spring device, as illustrated in FIGS. 1-5, the activating mechanism, AM, operatively directed to at least one predetermined atom-axial ligand pair, sends an activating signal, AS/AS', to the at least one predetermined atom-axial ligand pair, for physicochemically modifying the at least one predetermined atom-axial ligand pair, thereby activating at least one cycle of spring-type elastic reversible transitions between a contracted linear conformational state (A) and an expanded linear conformational state (B) of the molecular linker, ML.

In principle, the activating mechanism, AM, is essentially any type of appropriately designed and constructed mechanism which is controllably operated by being operatively directed to at least one predetermined reversibly physicochemically paired, atom-axial ligand pair, for sending an activating signal, AS/AS', to the at least one predetermined atom-axial ligand pair, for example, atom-axial ligand pairs 12 and 14 (FIG. 1), 32, 34, and 36 (FIG. 2), 52 (FIG. 3), 62 and 64 (FIG. 4), and, 82 and 84 (FIG. 5), for physicochemically modifying the at least one predetermined atom-axial ligand pair, thereby activating at least one cycle of spring-type elastic reversible transitions between a contracted linear conformational state (A) and an expanded linear conformational state (B) of the molecular linker, ML. Preferably, the activating mechanism, AM, is operable and performs this function under variable operating conditions and in a variety of different environments.

As previously noted above, with respect to describing the structure and function of the generalized synthetic molecular spring device of the present invention, the activating signal has two controllable general complementary levels, each with defined amplitude and duration, that is, a first general complementary level, AS, and, a second general complementary level, AS'. The first general complementary level, AS, of the activating signal, AS/AS', is sent to the at least one predetermined atom-axial ligand pair for physicochemically modifying the atom-axial ligand pair, via a first direction of a reversible physicochemical mechanism consistent with the basis of operation of the corresponding activating mechanism, AM, whereby there is activating a spring-type elastic reversible transition from a contracted linear conformational state (A) to an expanded linear conformational state (B) of the at least one substantially elastic molecular linker, ML. The second general complementary level, AS', of the activating signal, AS/AS', allows the at least one substantially elastic molecular linker, ML, to return to contracted conformational state (A).

In alternative embodiments of the present invention, the physicochemical relationship between the atom-axial ligand pair and the molecular linker, ML, is opposite to that relationship described above, whereby the first general complementary level, AS, of the activating signal, AS/AS', allows the at least one substantially elastic molecular linker, ML, to return to contracted conformational state (A). The second general complementary level, AS', of the activating signal, AS/AS', is sent to the at least one predetermined atom-axial ligand pair for physicochemically modifying the atom-axial ligand pair, via a second direction of a reversible physicochemical mechanism consistent with the basis of operation of the corresponding activating mechanism, AM, whereby there is activating a spring-type elastic reversible transition from an expanded linear conformational state (B) to a contracted linear conformational state (A) of the at least one substantially elastic molecular linker, ML.

It is noted that, in order not to limit the meaning of the function of the activating signal of the activating mechanism, AM, in practice, with respect to terminology and notation, the two controllable general complementary levels, AS and AS', of the activating signal, AS/AS', are interchangeable, whereby, the activating signal, AS/AS', may be written as the activating signal, AS'/AS. Moreover, as previously noted above, each general complementary level, AS and AS', or, AS' and AS, of the activating signal, AS/AS', or, AS'/AS, respectively, features at least one specific sub-level, preferably, a plurality of specific sub-levels, each having a particular magnitude, intensity, amplitude, or strength.

At any given instant of time, either of the two general complementary levels, AS and AS', of the activating signal, AS/AS', of the activating mechanism, AM, is controllably directed and sent to the at least one predetermined reversibly physicochemically paired, atom-axial ligand pair, in part, according to operating parameters of the activating mechanism, AM. Selected exemplary operating parameters of the activating mechanism, AM, are (1) magnitude, intensity, amplitude, or strength, (2) frequency, (3) time or duration, (4) repeat rate or periodicity, and, (5) switching rate, that is, switching from one, for example, the first, complementary level, AS, to another, for example, the second, complementary level, AS', or, vice versa, of the particular general complementary level of the activating signal directed and sent to the at least one predetermined reversibly physicochemically paired, atom-axial ligand pair.

In general, the activating mechanism, AM, is a mechanism which is operatively directed to a pair of chemical species, for sending an activating signal to the pair of chemical species, for physicochemically modifying the pair of chemical species. In the present invention, as previously described and illustrated above, such a pair of chemical species corresponds to the reversibly physicochemically paired atom-axial ligand pair, of the synthetic molecular assembly, SMA.

Preferably, the activating mechanism, AM, is a type of mechanism selected from the group consisting of electromagnetic mechanisms which send electromagnetic types of activating signals, AS/AS'; electrical/electronic mechanisms which send electrical/electronic types of activating signals, AS/AS'; chemical mechanisms which send chemical types of activating signals, AS/AS'; electrochemical mechanisms which send electrochemical types of activating signals, AS/AS'; magnetic mechanisms which send magnetic types of activating signals, AS/AS'; acoustic mechanisms which send acoustic types of activating signals, AS/AS'; photoacoustic mechanisms which send photoacoustic types of activating signals, AS/AS'; and, combinations thereof which send combination types of activating signals, AS/AS'; whereby each type of the activating signals, AS/AS', is controllably directed and sent to at least one predetermined reversibly physicochemically paired, atom-axial ligand pair, of the synthetic molecular assembly, SMA, according to operating parameters of the corresponding type of activating mechanism, AM.

An exemplary electromagnetic type of activating mechanism is selected from the group consisting of laser beam based activating mechanisms which send laser beam types of activating signals, maser beam based activating mechanisms which send maser beam types of activating signals, and, combinations thereof.

An exemplary electrical/electronic type of activating mechanism is selected from the group consisting of electrical current based activating mechanisms which send electrical current types of activating signals, applied electrical potential based activating mechanisms which send applied electrical potential types of activating signals, and, combinations thereof.

An exemplary chemical type of activating mechanism is selected from the group consisting of protonation-deprotonation based activating mechanisms which send protonation-deprotonation types of activating signals, pH change based activating mechanisms which send pH change types of activating signals, concentration change based activating mechanisms which send concentration change types of activating signals, and, combinations thereof.

An exemplary electrochemical type of activating mechanism is an reduction/oxidation based activating mechanism which generates and sends an reduction/oxidation type of activating signal.

For implementing the synthetic molecular spring device of the present invention, preferably, the specific type of activating mechanism, AM, used is selected, designed, and, operated, according to a specific type of synthetic molecular assembly, SMA, having specific types of interrelating components and characteristics thereof. More specifically, the primary components of the synthetic molecular assembly, SMA, used as a basis for determining the specific type, operating parameters and conditions, of activating mechanism, AM, are the atom, M, the complexing group, CG, and, the axial ligand, AL. Aside from the general function and structure of the molecular linker, ML, in relation to the overall function and structure of the synthetic molecular assembly, SMA, in particular, and, in relation to the overall function and structure of the synthetic molecular spring device, in general, as previously described above, specific types and characteristics of the molecular linker, ML, are of secondary importance with respect to selecting, designing, and, operating, the activating mechanism, AM.

Figure 6:
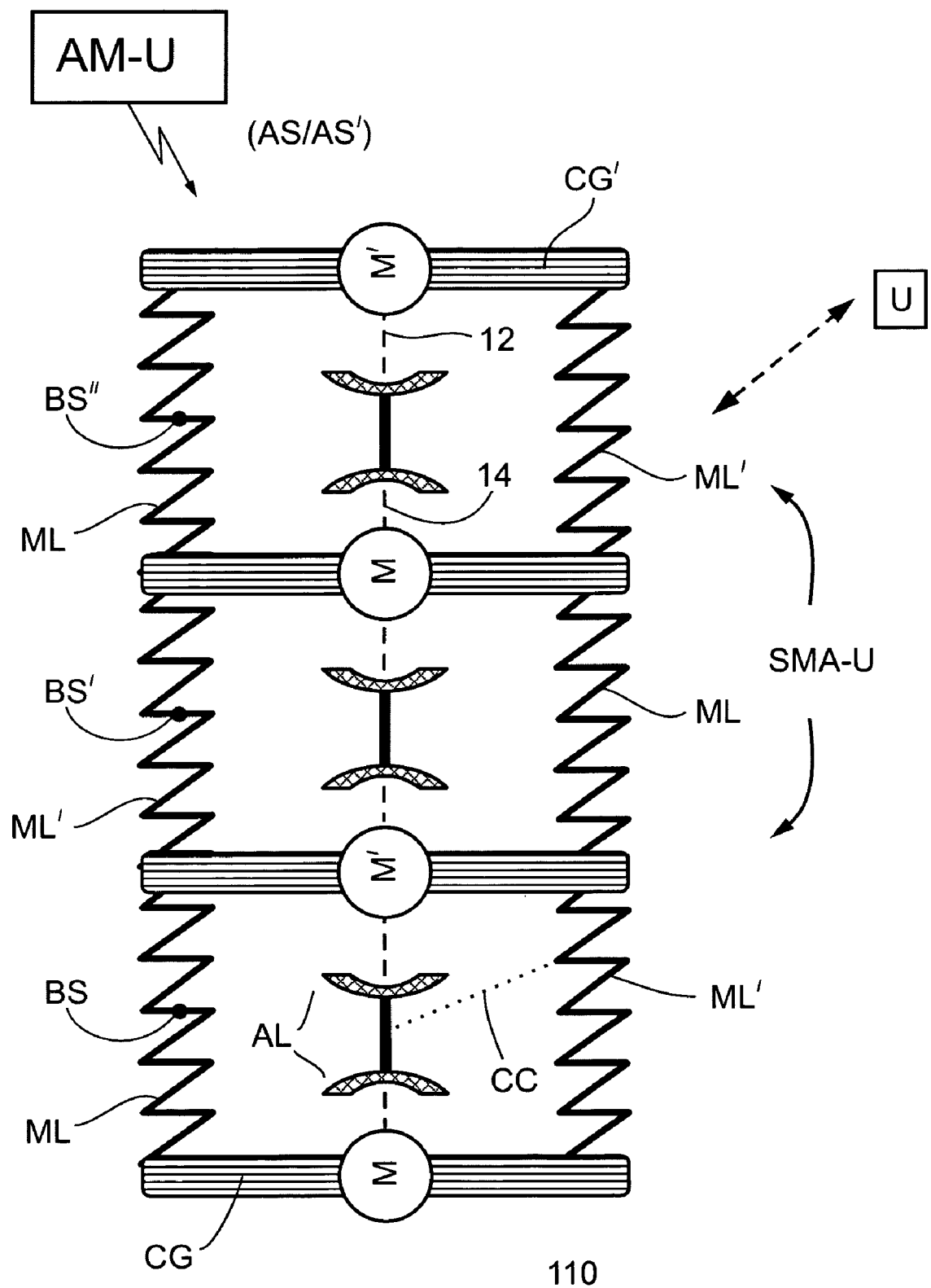
FIG. 6 is a schematic diagram illustrating a side view of a first exemplary preferred embodiment of a scaled-up synthetic molecular spring device, featuring a vertical configuration of a single scaled-up synthetic molecular assembly, SMA-U, as a non-limiting example, and, a scaled-up activating mechanism, AM-U, in accordance with the present invention.
Figure 7:
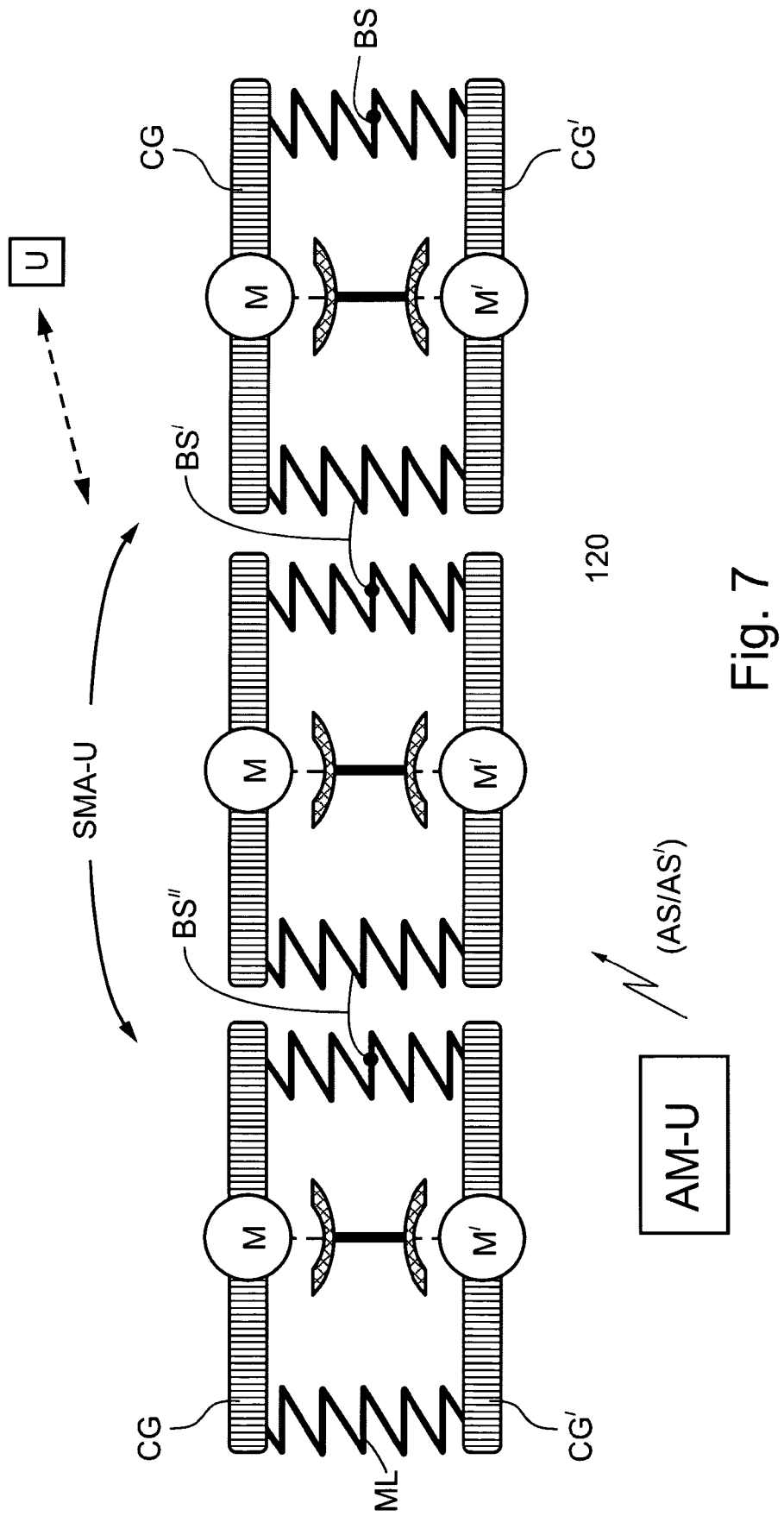
FIG. 7 is a schematic diagram illustrating a side view of a second exemplary preferred embodiment of a scaled-up synthetic molecular spring device, featuring a horizontal configuration of a single scaled-up synthetic molecular assembly, SMA-U, as a non-limiting example, and, a scaled-up activating mechanism, AM-U, in accordance with the present invention.
Figure 8:
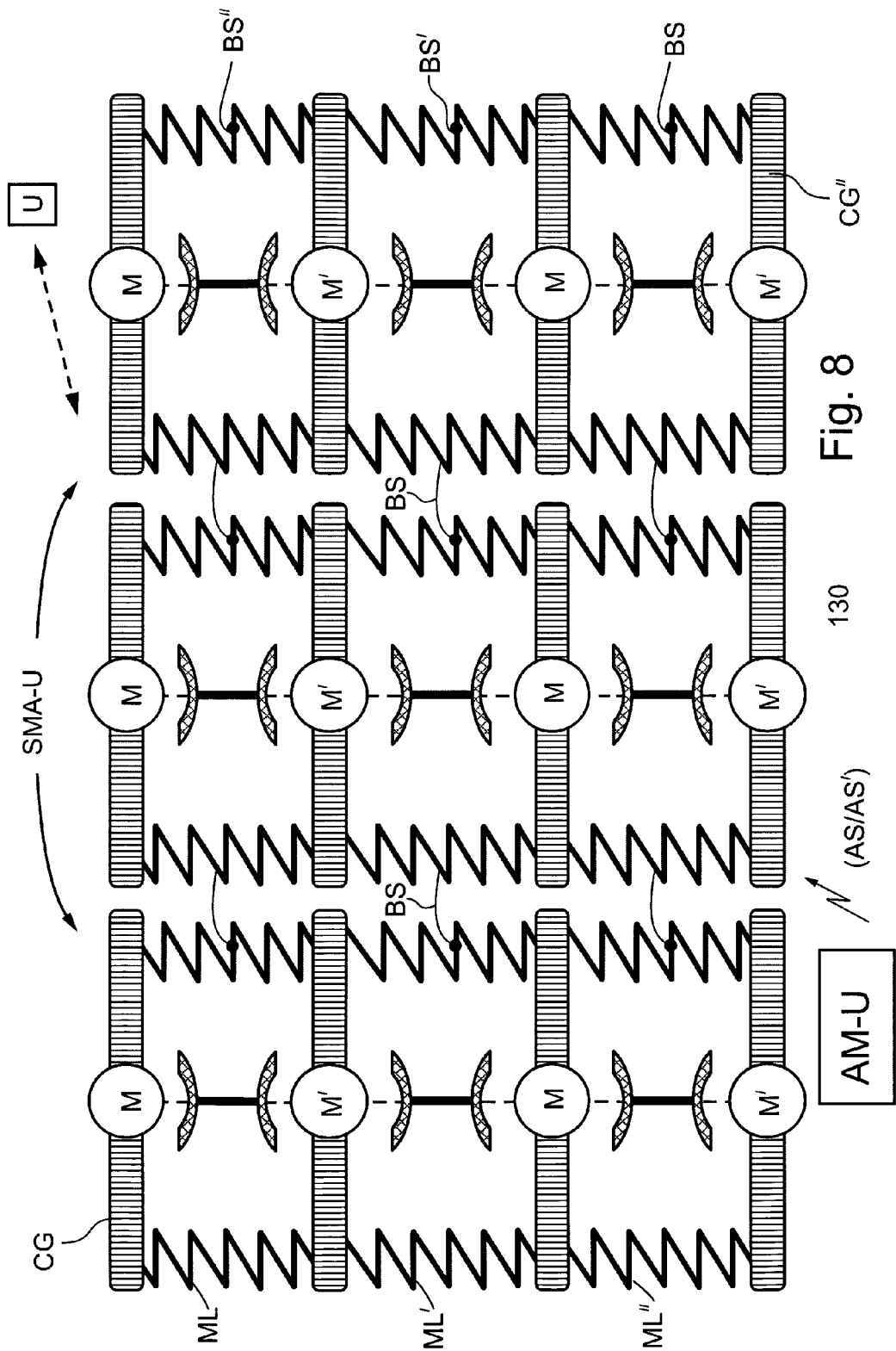
FIG. 8 is a schematic diagram illustrating a side view of a third exemplary preferred embodiment of a scaled-up synthetic molecular spring device, featuring a two-dimensional array configuration of a single scaled-up synthetic molecular assembly, SMA-U, as a non-limiting example, and, a scaled-up activating mechanism, AM-U, in accordance with the present invention.

This secondary importance of the molecular linker, ML, with respect to selecting, designing, and, operating, the activating mechanism, AM, enables using a generally independent modular approach for designing and operating the synthetic molecular assembly, SMA, in particular, and, for designing and operating the synthetic molecular spring device, in general. More specifically, the same specific type of activating mechanism, AM, may be selected, designed, and, operated, for activating a synthetic molecular assembly, SMA, for example, a scaled-up synthetic molecular assembly, SMA-U, as illustrated in FIGS. 6-8 and described below with regard to modularity and scale up of the synthetic molecular spring device of the present invention, featuring a scaled-up plurality of chemical units or modules including different types of the molecular linker, ML, having variable geometrical configuration or form with variable dimensions and flexibility, for example, where the molecular linker, ML, is either long or short, flexible or rigid, in cases where the types and characteristics of the atom, M, the complexing group, CG, and, the axial ligand, AL, are identical or at least similar from module to module in the synthetic molecular assembly, SMA.

Alternatively, the present invention may be implemented whereby different specific types, for example, electromagnetic, electrochemical, and, chemical, types of the activating mechanism, AM, may be selected, designed, and, operated, for activating a synthetic molecular assembly, SMA, featuring the same primary components, that is, the same atom(s), M, complexing group(s), CG, axial ligand(s), AL, and, molecular linker(s), ML, as described herein below.

Selected details for implementing three different specific types of an activating mechanism, AM, included as part of the synthetic molecular spring device of the present invention, follow herein below. In each exemplary case, the synthetic molecular assembly, SMA, includes the atom, M, as a Ni(II) cation, the complexing group, CG, as a meso-substituted porphyrin derivative, the axial ligand, AL, as 4,4' Bipyridine, and, at least one substantially elastic molecular linker, ML, having a body, and, having two ends with at least one end chemically bonded to another component of the synthetic molecular assembly, SMA.

In the first exemplary case, there is implementing a laser beam based activating mechanism as an exemplary electromagnetic type of activating mechanism, AM. Photoinduced cation-axial ligand dissociation in nickel porphyrins usually involves ultrafast photoexcitation energy transfer from the lowest π-π* excited state of the macrocycle complexing group to the central Ni atom, thereby changing the electronic configuration of the complexing group from a high-spin ($^1d_{x^2-y^2}$, $^1d_{z^2}$) triplet state to a low-spin ($^2d_{z^2}$) singlet state.

In this case, the laser light wavelength is ideally selected such that it corresponds to the absorption maxima, typically, in the range of from about 350 nm to about 900 nm, for the complexing group, CG, atom, M, axial ligand, AL, complex, of the synthetic molecular assembly, SMA. More specifically, in the case of metal porphyrins, it is desired to have the laser light wavelength in the region of the Soret absorption band, typically, in the range of from about 380 nm to about 460 nm. This is achieved, for example, for example, a picosecond diode laser, operating at a repetition rate, that is, being turned on and off, in a range of from on the order of Hz to on the order of MHz, and preferably, for fast triggering, operating at a repetition rate of 40 MHz, with an accuracy of plus/minus 3 nm, and, with a wavelength in a range of from about 350 nm to about 570 nm, or, with a wavelength in a range of from about 700 nm to about 800 nm, preferably, in a range of from about 420 nm to about 450 nm.

Operatively directing the laser beam based activating mechanism to the cation-axial ligand pair, with a laser beam pulse functioning as the electromagnetic type of activating signal, AS, sent by the activating mechanism, AM, to the cation-axial ligand pair, physicochemically modifies the cation-axial ligand pair, via cation-axial ligand dissociation, as a result of the strong repulsion between the doubly occupied $d_{z^2}$ orbital and the electron density on the axial ligands. Cation-axial ligand dissociation is accompanied by activation of a spring-type elastic reversible transition from a contracted linear conformational state (A) to an expanded linear conformational state (B) of the molecular linker, ML. Following termination of the laser beam pulse directed at the cation-axial ligand pair, association of the axial ligand and the cation is accompanied by activation of a spring-type elastic reversible transition from the expanded linear conformational state (B) to the contracted linear conformational state (A) of the molecular linker, ML.

In the second exemplary case, there is implementing a reduction/oxidation based activating mechanism as an exemplary electrochemical type of activating mechanism, AM. Electroreduction in nickel porphyrins is usually metal-centered. Similar to the case of using the laser beam based activating mechanism described above, in this case, using an reduction/oxidation based activating mechanism also results in a ($^1d_{x^2-y^2}$, $^2d_{z^2}$) electronic configuration of the complexing group.

In this case, typical reduction potentials for metal porphyrins are in the range of from about −1.0 V to about −2.5 V vs. SCE (Saturated Calomel Reference Electrode). Typical oxidation potentials for metal porphyrins are in the range of from about +0.5 V to about +1.3 V vs. SCE. For electro-reduction/oxidation, an external voltage supply can be used, for example, as part of a standard electrochemical workstation with an appropriate cell configuration, as is well known in the art of electrochemistry. In particular, for example, a standard electrochemical workstation featuring a standard three-electrode setup, wherein the reference electrode may be Ag/Ag+ in an acetonitrile/N,N-dimethylformamide electrolyte solution. The working and counter electrodes can be Pt disks or Pt wires. The electrodes are electrically coupled to the synthetic molecular assembly, SMA, according to the specific mode of operation. It can be for example, the electrolyte solution, or any other medium that is capable of electrically coupling the synthetic molecular assembly, SMA, and the external voltage source.

Operatively directing an activating signal of the reduction/oxidation based activating mechanism to the cation-axial ligand pair, with the functioning as the electrochemical type of activating signal, AS, sent by the activating mechanism, AM, to the cation-axial ligand pair, physicochemically modifies the cation-axial ligand pair, via cation-axial ligand dissociation, as a result of the strong repulsion between the doubly occupied $d_{z^2}$ orbital and the electron density on the axial ligands. Cation-axial ligand dissociation is accompanied by activation of at least one cycle of spring-type elastic reversible transitions between a contracted linear conformational state (A) and an expanded linear conformational state (B) of the molecular linker, ML.

In the third exemplary case, there is implementing a protonation-deprotonation based activating mechanism as an exemplary chemical type of activating mechanism, AM. The bipyridine axial ligand acts as a Lewis base. The synthetic molecular assembly, SMA, is dissolved, or, bound to a surface that is immersed in acetonitrile solvent. An acidic solution of acetonitrile and a dilute aqueous solution of HCl/acidic acetonitrile solution is prepared. The acidic acetonitrile solution, functioning as the chemical type of activating signal, AS, is operatively directed and sent, for example, using a controllable solvent delivery setup, to the cation-axial ligand pair of the synthetic molecular assembly, SMA, located in the acetonitrile solvent environment. The acidic acetonitrile physicochemically modifies the cation-axial ligand pair, via protonation or acidification, whereby the nitrogen atoms of the bipyridine axial ligand, AL, are protonated, thereby loosing the ability to form coordinative bonds between the axial ligand, AL, and the nickel (II) cation, M. Disruption or breakage of the cation-axial ligand coordinative bond is accompanied by activation of a spring-type elastic reversible transition from a contracted linear conformational state (A) to an expanded linear conformational state (B) of the molecular linker, ML.

In order to restore the contracted linear conformational state (A) of the molecular linker, ML, in a similar, but complementary manner, basic solution of acetonitrile and dilute NaOH, functioning as the chemical type of activating signal, AS', is operatively directed and sent, using the controllable solvent delivery setup, to the acidified solution hosting the cation-axial ligand pair of the synthetic molecular assembly, SMA. The basic acetonitrile physicochemically modifies the cation-axial ligand pair, via deprotonation, whereby the protonated nitrogen atoms of the bipyridine axial ligand, AL, are deprotonated, thereby gaining the ability to form coordinative bonds between the axial ligand, AL, and the nickel (II) cation, M. Formation of the cation-axial ligand coordinative bond is accompanied by activation of a spring-type elastic reversible transition from the expanded linear conformational state (B) to the contracted linear conformational state (A) of the molecular linker, ML.

As previously stated above, the synthetic molecular assembly (SMA), optionally, includes additional components: (5) at least one chemical connector (CC) for chemically connecting components of the synthetic molecular assembly (SMA) to each other, and/or, (6) at least one binding site (BS), each located at a predetermined position of another component of the synthetic molecular assembly (SMA), for potentially binding or operatively coupling that position of the synthetic molecular assembly (SMA) to an external entity, such as a selected unit (U), part of or separate from a more encompassing mechanism, device, or system. In the following description of structure/function relationships of these optional, additional components of the synthetic molecular assembly (SMA), of the synthetic molecular spring device, reference is again made to FIGS. 1-8.

The chemical connector, CC, primarily functions by chemically connecting components of the synthetic molecular assembly, SMA, to each other.

A second function of the chemical connector, CC, is for providing additional structural constraint(s) with respect to another component of the synthetic molecular assembly, SMA. For example, in addition to being reversibly physicochemically paired with the atom, M, which is complexed to the complexing group, CG, as described above, and existing as part of the reversibly physicochemically paired atom-axial ligand pair, the axial ligand, AL, can be connected to the synthetic molecular assembly, SMA, via the chemical connector, CC.

In general, the chemical connector, CC, is a chemical entity capable of chemically connecting components of the synthetic molecular assembly, SMA, to each other, via chemical bonds of varying degree or extent of covalency, coordination, or, ionic strength, and, has a variable geometrical configuration or form with variable dimensions and flexibility. In general, the chemical connector, CC, is a chemical entity selected from the group consisting of atoms, and, molecules.

The binding site, BS, primarily functions by binding or operatively coupling at least one component of the synthetic molecular assembly, SMA, to at least one element or component of an external entity, such as a selected unit, U, part of or separate from a more encompassing mechanism, device, or system.

With respect to the method using a synthetic molecular spring device, such as synthetic molecular spring device 10, 30, 50, 60, or 80, illustrated in FIGS. 1-5, respectively, in a system for dynamically controlling a system property, and a corresponding system thereof, according to the present invention, at least one of binding sites, BS, BS', and BS", of a particular synthetic molecular spring device, is for binding or operatively coupling the indicated position or positions of the synthetic molecular assembly, SMA, to an external entity being a selected unit, U, of the system, for example, by using a physical, chemical, or physicochemical, binding or coupling mechanism (as further described below and illustratively exemplified in FIGS. 9-18), wherein the selected unit, U, exhibits the system property which is dynamically controllable by the particular synthetic molecular spring device.

In specific embodiments of the synthetic molecular spring device of the present invention, the function of the binding site, BS, as part of the synthetic molecular assembly, SMA, is for serving as a medium of electrical and/or electronic conduction, as a type of molecular conducting wire, for providing an efficient electrical/electronic operative coupling or connection between a component of the synthetic molecular assembly, SMA, and at least one element or component, such as at least one electrode, of an entity external to the synthetic molecular assembly, SMA, such as a selected unit, U, (generally indicated in FIGS. 1-5 as selected unit, U), part of or separate from a more encompassing mechanism, device, or system. Accordingly, at least one of the phenomena of electrical conductance, electronic conductance, and electronic tunneling, occurs between the component of the synthetic molecular assembly, SMA, and the at least one element or component, such as the at least one electrode, of the entity external to the synthetic molecular assembly, SMA, such as the selected unit, U.

When functioning as a type of molecular conducting wire, the particular chemical type, structural geometrical configuration or form, and dimensions, of the binding site, BS, are selected for optimizing electrical/electronic charge flow along a designated electrical/electronic path of an electrical/electronic circuit, including at least part of the synthetic molecular assembly, SMA, between the component of the synthetic molecular assembly, SMA, and the at least one element or component, such as the at least one electrode, of the entity external to the synthetic molecular assembly, SMA, such as the selected unit, U.

Exemplary utilization of this specific function of the binding site, BS, is illustratively described below in several specific exemplary preferred embodiments of implementing the generalized method and the corresponding generalized system thereof, of the present invention. In particular, in embodiments of systems 400, 450, 500, 550, and 600, illustrated in FIGS. 13, 14, 15, 16, and 17, respectively, wherein binding sites, BS, BS', and BS", are each part of a designated electrical/electronic path of an electronic circuit U, including at least part of the synthetic molecular assembly, SMA, which is electrically/electronically operatively coupled or connected to at least two electrodes, $E_i$, of electronic circuit U, of the respective system.

A second function of the binding site, BS, is for providing connectivity and directed modularity in a scaled-up assembly of a 'poly-molecular' form of synthetic molecular assembly, SMA, featuring a plurality of chemical units or modules chemically connected or bound to each other by a plurality of binding sites, BS. By defining specific threading or linking possibilities, for example, according to a building block type of scaled-up assembly, it is possible to predetermine the type and configuration of connectivity, of a bottom-up self-assembly of large, poly-molecular structures of the synthetic molecular assembly, SMA, featuring a plurality of chemical units or modules, and to use a predetermined number of binding sites, BS, for providing connectivity and directed modularity among the plurality of individual chemical units or modules.

A third function of the binding site, BS, is for providing recognition sites to the synthetic molecular assembly, SMA, in particular, and, to the synthetic molecular spring device, in general. For example, by using a binding site, BS, featuring one or more receptors for being recognized by specific antibodies.

In general, the binding site, BS, is a chemical entity which is chemically bonded, via at least one chemical bond of varying degree or extent of covalency, coordination, or, ionic strength, to at least one other component of the synthetic molecular assembly, SMA, and, has a variable geometrical configuration or form with variable dimensions and flexibility. More specifically, the binding site, BS, is a chemical entity selected from the group consisting of atoms, molecules, intervening spacer arms, bridging groups, carrier molecules, and, combinations thereof.

In specific preferred embodiments of the present invention, at least one binding site, BS, BS', and/or BS", functioning as a molecular conducting wire, is preferably a chemical entity selected from the group consisting of nanotubes, poly-conjugated polymers, DNA templated gold or silver conducting wires, poly-aromatic molecules, substituted poly-aromatic molecules, and, substituted poly-aromatic molecules including at least one thiol functional group.

Modularity and Scale-Up

The synthetic molecular spring device of the present invention is scalable, due to the unitary or modular characteristic of each synthetic molecular assembly, SMA. This is an important characteristic of the present invention with respect to implementing the synthetic molecular spring device in the macroscopic world, for example, as illustratively described in detail below, whereby the synthetic molecular assembly, SMA, in the form of a single synthetic molecular assembly, SMA, or, a plurality of synthetic molecular assemblies, SMAs, or, a scaled-up synthetic molecular assembly, SMA-U, or, a plurality of scaled-up synthetic molecular assemblies, SMA-Us, is operatively coupled to a selected unit (U) of a system including the synthetic molecular spring device, for causing a change in a system property exhibited by the selected unit (U) of the system.

According to the above description of the generalized synthetic molecular spring device of the present invention, each synthetic molecular assembly, SMA, features at least one chemical unit or module including: (1) at least one atom, M, (2) at least one complexing group, CG, complexed to at least one atom, M, (3) at least one axial ligand, AL, reversibly physicochemically paired with at least one atom, M, complexed to a complexing group CG, and, (4) at least one substantially elastic molecular linker, ML, having a body, and, having two ends with at least one end chemically bonded to another component of the synthetic molecular assembly, SMA.

Moreover, each synthetic molecular assembly, SMA, optionally, includes additional components: (5) at least one chemical connector, CC, for chemically connecting components of the synthetic molecular assembly, SMA, to each other, and/or, (6) at least one binding site, BS, each located at a predetermined position of another component of the synthetic molecular assembly, SMA, for potentially binding or operatively coupling that position of the synthetic molecular assembly, SMA, to an external entity, such as a selected unit (U), part of or separate from a more encompassing mechanism, device, or system.

Accordingly, by definition, the synthetic molecular assembly, SMA, is scaled up by appropriately assembling and connecting a plurality of at least two of the above described chemical unit or module, whereby each chemical unit or module includes the above indicated components. Moreover, the synthetic molecular assembly, SMA, is scaled up for forming a variable geometrical configuration or form, for example, selected from the group consisting of a one-dimensional array, a two-dimensional array, a three-dimensional array, and, combinations thereof, of a plurality of the chemical units or modules, and having variable dimensions and flexibility.

In principle, a predetermined part, that is, a given number, of the connected units or modules of a scaled-up synthetic molecular assembly, SMA, herein referred to as SMA-U, functions as part of the scaled-up synthetic molecular assembly, and/or, as a connecting unit or module for connecting at least two other units or modules of the scaled-up synthetic molecular assembly, SMA-U, for example, as illustrated in FIGS. 6-8, and indicated below. When incorporated as part of a one-dimensional, a two-dimensional, or, a three-dimensional, array, of a plurality of the chemical units or modules, each chemical unit or module of the scaled-up synthetic molecular assembly, SMA-U, retains its individual functionality and structure in addition to being functionally and structurally part of the scaled-up synthetic molecular assembly, SMA-U.

As part of the unitary or modular characteristic of the synthetic molecular assembly, SMA, functional and structural characteristics, that is, the multi-parametric controllable spring-type elastic reversible function, structure, and behavior, of the individual chemical units or modules may be either effectively linearly scaleable, or, synergistically scaleable, in accordance with the actual number and geometrical configuration or form of the plurality of the chemical units or modules of the scaled-up synthetic molecular assembly, SMA-U. Moreover, as part of scaling up the synthetic molecular spring device, in general, along with scaling up the synthetic molecular assembly, SMA, the other primary component of the synthetic molecular spring device, that is, the activating mechanism, AM, may also be correspondingly scaled up for forming a scaled-up activating mechanism, herein referred to as AM-U.

For example, a scaled-up synthetic molecular spring device, featuring a scaled-up synthetic molecular assembly, SMA-U, and, a scaled-up activating mechanism, AM-U, may be designed, constructed, and, operated, whereby the previously described parameter, that is, the molecular linker inter-end effective distance change, $D_E$–$D_C$, or, $D_C$–$D_E$, characterizing the extent or degree of the spring-type elastic reversible transition in linear conformational states of one or more arbitrarily selected molecular linkers, ML, may also be scaled up for accounting for a plurality of extents or degrees of spring-type elastic reversible transitions in linear conformational states of a plurality of particular molecular linkers, ML, included in the scaled-up synthetic molecular assembly, SMA-U.

Illustrations of three different exemplary preferred embodiments of a scaled-up synthetic molecular spring device of the present invention, immediately follow herein below. In each illustration, a single scaled-up synthetic molecular assembly, SMA-U, features a plurality of synthetic molecular assemblies, each similar to the synthetic molecular assembly, SMA, of the synthetic molecular spring device 10, illustrated in FIG. 1, and previously described above. It is noted that, although only generally shown in the following illustrations, the primary components, that is, the atoms, M, the complexing groups, CG, the axial ligands, AL, molecular linkers, ML, and, the optional additional components, that is, the chemical connectors, CC, and, the binding sites, BS, of a given synthetic molecular assembly, SMA, may be the same or vary within the same synthetic molecular assembly, SMA, and/or, may be the same or vary from one synthetic molecular assembly, SMA, to another synthetic molecular assembly, SMA, of a particular scaled-up synthetic molecular assembly, SMA-U.

FIG. 6 is a schematic diagram illustrating a side view of a first exemplary preferred embodiment of a scaled-up synthetic molecular spring device 110, featuring a vertical configuration of a single scaled-up synthetic molecular assembly, SMA-U, as a non-limiting example, and, a scaled-up activating mechanism, AM-U.

FIG. 7 is a schematic diagram illustrating a side view of a second exemplary preferred embodiment of a scaled-up synthetic molecular spring device 120, featuring a horizontal configuration of a single scaled-up synthetic molecular assembly, SMA-U, as a non-limiting example, and, a scaled-up activating mechanism, AM-U.

FIG. 8 is a schematic diagram illustrating a side view of a third exemplary preferred embodiment of a scaled-up synthetic molecular spring device 130, featuring a two-dimensional array configuration of a single scaled-up synthetic molecular assembly, SMA-U, as a non-limiting example, and, a scaled-up activating mechanism, AM-U.

As shown in FIGS. 6, 7, and 8, the scaled-up synthetic molecular assembly, SMA-U, of each scaled-up synthetic molecular spring device 110, 120, and 130, respectively, includes the additional component: (6) three binding sites, BS, BS', and BS", each located at a position along the body of a different molecular linker, ML, for providing connectivity and directed modularity in the scaled-up synthetic molecular assembly, SMA, featuring a plurality of chemical units or modules chemically connected or bound to each other by the binding sites, BS. The binding sites, BS, BS', and BS", also function for potentially binding or operatively coupling at least one of these positions of the synthetic molecular assembly, SMA, to at least one element or component of an external entity, such as a selected unit (U), part of or separate from a more encompassing mechanism, device, or system, generally indicated in each of FIGS. 6, 7, and 8 by the dashed arrow between the scaled-up synthetic molecular assembly, SMA-U, and a selected unit, U.

As clearly indicated by the immediately preceding description, functional and structural characteristics, that is, the multi-parametric controllable spring-type elastic reversible function, structure, and behavior, of the individual chemical units or modules of a given synthetic molecular assembly, SMA, are effectively linearly scaleable, in accordance with the actual number and geometrical configuration or form of the plurality of the chemical units or modules of the scaled-up synthetic molecular assembly, SMA-U. Accordingly, the detailed description above, relating to function and structure of each of the primary and optional components of the generalized synthetic molecular spring device, which are fully applicable to each of the previously described five exemplary preferred embodiments of the synthetic molecular spring device, illustrated in FIGS. 1-5, are also fully applicable to the just described scaled-up synthetic molecular spring device of the present invention, illustrated in FIGS. 6-8.

With respect to the method using a synthetic molecular spring device, such as scaled-up synthetic molecular spring device 110, 120, or 130, illustrated in FIGS. 6, 7, and 8, respectively, in a system for dynamically controlling a system property, and a corresponding system thereof, according to the present invention, at least one of binding sites, BS, BS', and BS", of any exemplary scaled-up synthetic molecular spring device 110, 120, or 130, is for binding or operatively coupling the indicated position or positions of the respective scaled-up synthetic molecular assembly, SMA-U, to at least one element or component of an external entity being a selected unit, U, of the system, for example, by using a physical, chemical, or physicochemical, binding or coupling mechanism (as further described below and illustratively exemplified in FIGS. 9-18), wherein the selected unit, U, exhibits the system property which is dynamically controllable by each respective scaled-up synthetic molecular spring device 110, 120, or 130. Moreover, the parameter, molecular linker inter-end effective distance change, $D_E$–$D_C$, or, $D_C$–$D_E$, as applicable to each respective scaled-up synthetic molecular assembly, SMA-U, is directly associated with and correlated to the extent by which the system property is dynamically controllable by each respective scaled-up synthetic molecular spring device 110, 120, or 130.

As indicated above, in each of FIGS. 6, 7, and 8, each scaled-up synthetic molecular spring device 110, 120, and 130, respectively, is illustrated as featuring a 'single' scaled-up synthetic molecular assembly, SMA-U, as a non-limiting example, whereby, with respect to typical commercial application of the method and corresponding system thereof, of the present invention, scaled-up synthetic molecular spring device 110, 120, or 130, features a plurality of scaled-up synthetic molecular assemblies, SMA-Us, whereby each scaled-up synthetic molecular assembly, SMA-U, of the plurality of scaled-up synthetic molecular assemblies, SMA-Us, is characterized and used according to the above described and illustrated structure/function relationships and behavior of a single scaled-up synthetic molecular assembly, SMA-U.

The preceding described and illustrated structure/function relationships and behavior of the synthetic molecular spring device, of the present invention, is applicable to the synthetic molecular spring device functioning either on its own, or functioning as part of an operatively coupled unit in a system including the synthetic molecular spring device.

As previously stated above, the generalized method using a synthetic molecular spring device in a system for dynamically controlling a system property features the following main steps: (a) providing the synthetic molecular spring device, having components whose structure/function relationships and behavior are described above and illustrated in FIGS. 1-8, featuring (i) at least one synthetic molecular assembly, SMA, and (ii) an activating mechanism, AM; (b) selecting a unit, U, of the system, the selected unit, U, exhibits the system property which is dynamically controllable by the synthetic molecular spring device; (c) operatively coupling each synthetic molecular assembly, SMA, of the synthetic molecular spring device to the selected unit, U, for forming a coupled unit, CU; and (d) sending an activating signal, AS/AS', from the activating mechanism, AM, to at least one predetermined atom-axial ligand pair of at least one synthetic molecular assembly, SMA, of the coupled unit, CU, for physicochemically modifying the at least one predetermined atom-axial ligand pair, for activating at least one cycle of spring-type elastic reversible transitions between contracted and expanded linear conformational states, or, between expanded and contracted linear conformational states, of at least one substantially elastic molecular linker, ML, of the at least one synthetic molecular assembly, SMA, of the coupled unit, CU, thereby causing a dynamically controllable change in the system property exhibited by the selected unit, U.

As previously stated above, the corresponding generalized system including a synthetic molecular spring device for dynamically controlling a system property features the following main components: (a) the synthetic molecular spring device, having components whose structure/function relationships and behavior are described above and illustrated in FIGS. 1-8, featuring (i) at least one synthetic molecular assembly, SMA, and (ii) an activating mechanism, AM; and (b) a selected unit, U, of the system, the selected unit, U, exhibits the system property which is dynamically controllable by the synthetic molecular spring device. Each synthetic molecular assembly, SMA, is operatively coupled to the selected unit, U, for forming a coupled unit, CU, whereby following the activating mechanism, AM, sending an activating signal, AS/AS', to at least one predetermined atom-axial ligand pair of at least one synthetic molecular assembly, SMA, of the coupled unit, CU, for physicochemically modifying the at least one predetermined atom-axial ligand pair, there is activating at least one cycle of spring-type elastic reversible transitions between contracted and expanded linear conformational states, or, between expanded and contracted linear conformational states, of at least one substantially elastic molecular linker, ML, of the at least one synthetic molecular assembly, SMA, of the coupled unit, CU, thereby causing a dynamically controllable change in the system property exhibited by the selected unit, U.

The selected unit, U, of the system, in the generalized method and corresponding generalized system of the present invention, is characterized by, and features, structure and function for exhibiting the system property which is dynamically controllable by the synthetic molecular spring device used and implemented as disclosed herein.

Exemplary system properties used for describing and illustrating implementation of the present invention are momentum, topography, and electronic behavior. Nine different specific exemplary preferred embodiments, each relating to a different particular aspect of a given system property, of implementing the generalized method and corresponding generalized system thereof, are illustratively described in detail below. For each different particular aspect of a given system property, there is a corresponding selected unit, U, of the system.

Enabling the 'dynamically controllable' aspect of the present invention is accomplished by operatively coupling each synthetic molecular assembly, SMA, of a given synthetic molecular spring device to the selected unit, U. In a non-limiting manner, a commonly used specific example of this operative coupling is illustratively described above with respect to binding sites, BS, BS', and BS'', structured and functioning as part of exemplary synthetic molecular spring devices 10, 30, 50, 60, and 80, illustrated in FIGS. 1-5, respectively, and, structured and functioning as part of exemplary scaled-up synthetic molecular spring devices 110, 120, and 130, illustrated in FIGS. 6-8, respectively, in relation to the selected unit, U, generally indicated in each of FIGS. 1-8.

In the method and corresponding system of the present invention, the step of operatively coupling each synthetic molecular assembly, SMA, to the selected unit, U, for forming a coupled unit, CU, is generally performed by coupling at least one component of each synthetic molecular assembly, SMA, of a given synthetic molecular spring device, to at least one element or component of the selected unit, U, of the system including the synthetic molecular spring device, thereby forming the coupled unit, CU, of the system.

Specifically, the step of operatively coupling is performed by using a coupling mechanism selected from the group consisting of physical coupling mechanisms, chemical coupling mechanisms, physicochemical coupling mechanisms, combinations thereof, and, integrations thereof. Preferred physical coupling mechanisms are selected from the group consisting of physical adsorption, physical absorption, non-bonding physical interaction, mechanical coupling, simple juxtaposition, electrical coupling, electronic coupling, magnetic coupling, electromagnetic coupling, electromechanical coupling, magneto-mechanical coupling, combinations thereof, and, integrations thereof. Preferred chemical coupling mechanisms are selected from the group consisting of covalent types of chemical bonding, coordinative types of chemical bonding, ionic types of chemical bonding, hydrogen types of chemical bonding, Van der Waals types of chemical bonding, combinations thereof, and, integrations thereof.

In principle, the step of operatively coupling can be performed by using essentially any combination of at least one of the preceding preferred physical coupling mechanisms and at least one of the preceding preferred chemical coupling mechanisms. A few specific examples of such combination types of coupling mechanisms are electrical and/or electronic types of physical coupling mechanisms combined or integrated with at least one of the preceding preferred chemical coupling mechanisms, whereby the phenomena of electrical conductance, electronic conductance, and/or electronic tunneling, occurs between the at least one component of each synthetic molecular assembly, SMA, of a given synthetic molecular spring device, and the operatively coupled at least one element or component of the selected unit, U, of the system.

Preferably, the step of operatively coupling is performed via one or more optional binding sites, BS, and/or via at least one complexing group, CG, complexed to the at least one atom, M, and/or via at least one axial ligand, AL, and/or via at least one other component, of each synthetic molecular assembly, SMA, of a given synthetic molecular spring device, to at least one element or component of the selected unit, U, of the system including the synthetic molecular spring device, for forming the coupled unit, CU.

Several specific examples of the above listed ways of performing the step of operatively coupling each synthetic molecular assembly, SMA, to the selected unit, U, for forming a coupled unit, CU, of the system, are illustratively described in detail below, in the descriptions of nine different specific exemplary preferred embodiments of implementing the generalized method and corresponding generalized system thereof.

Following is illustrative description of nine different specific exemplary preferred embodiments of implementing the method and corresponding system thereof, according to the present invention. Therein, exemplary system properties used for describing and illustrating implementation of the present invention are momentum, topography, and electronic behavior. Each specific exemplary preferred embodiment of the generalized system is implemented according to the described method, whereby the corresponding system property is dynamically controllable using the synthetic molecular spring device of the present invention.

Throughout the following illustrative description, it is to be clearly understood that the nine different systems 200, 250, 300, 350, 400, 450, 500, 550, and 600, illustrated in FIGS. 9-17, respectively, correspond to nine different specific exemplary preferred embodiments of implementing the 'same' generalized method and the 'same' corresponding generalized system thereof, according to the present invention, and do not correspond to nine different, unrelated and/or independent methods and corresponding systems thereof.

Dynamically Controlling System Property of Momentum

Figure 9:
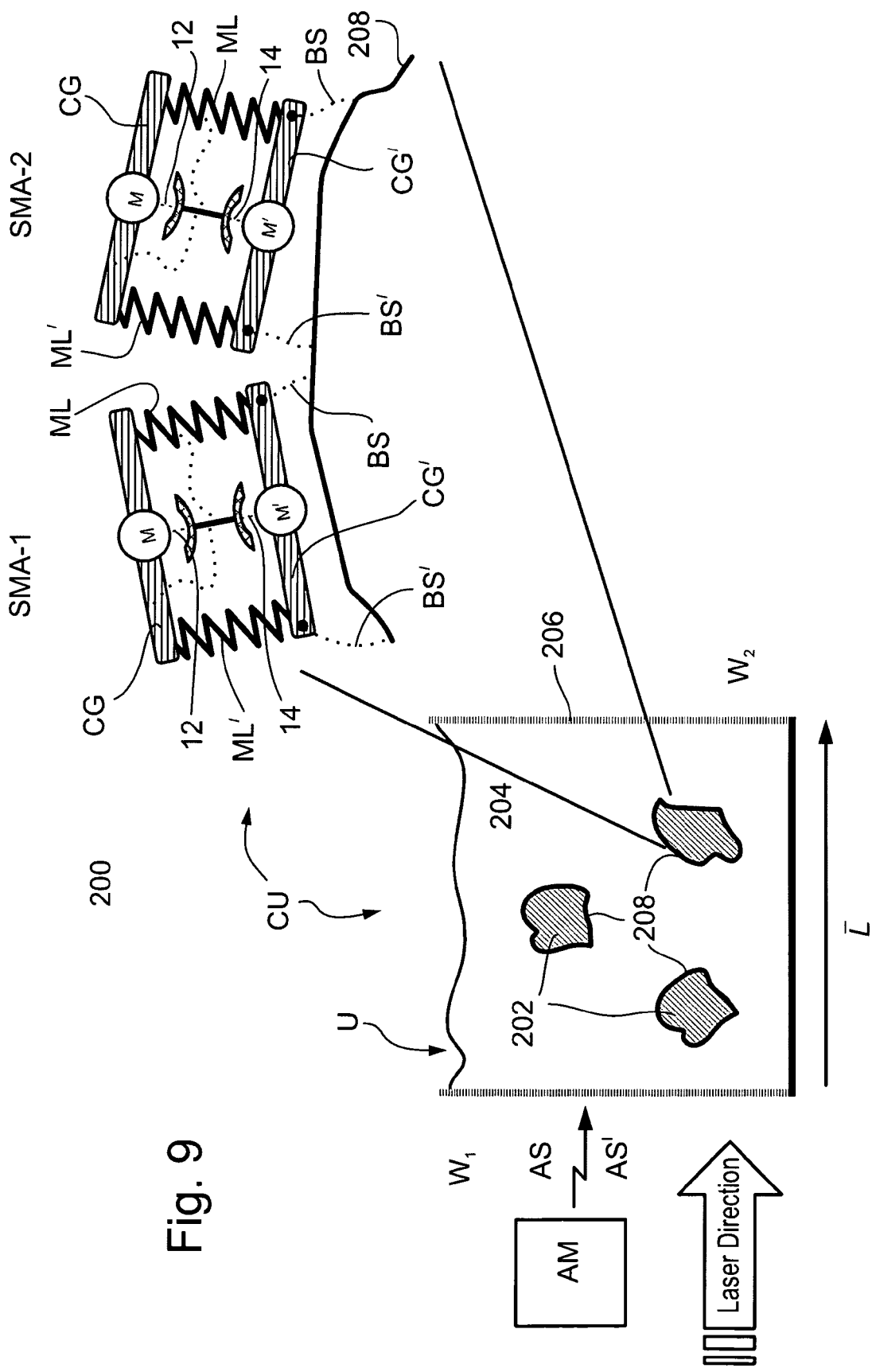
FIG. 9 is a schematic diagram illustrating a side view of a first exemplary preferred embodiment of the system including the synthetic molecular spring device used for dynamically controlling the system property of momentum, as relating to particle motion, in accordance with the present invention.
Figure 10:
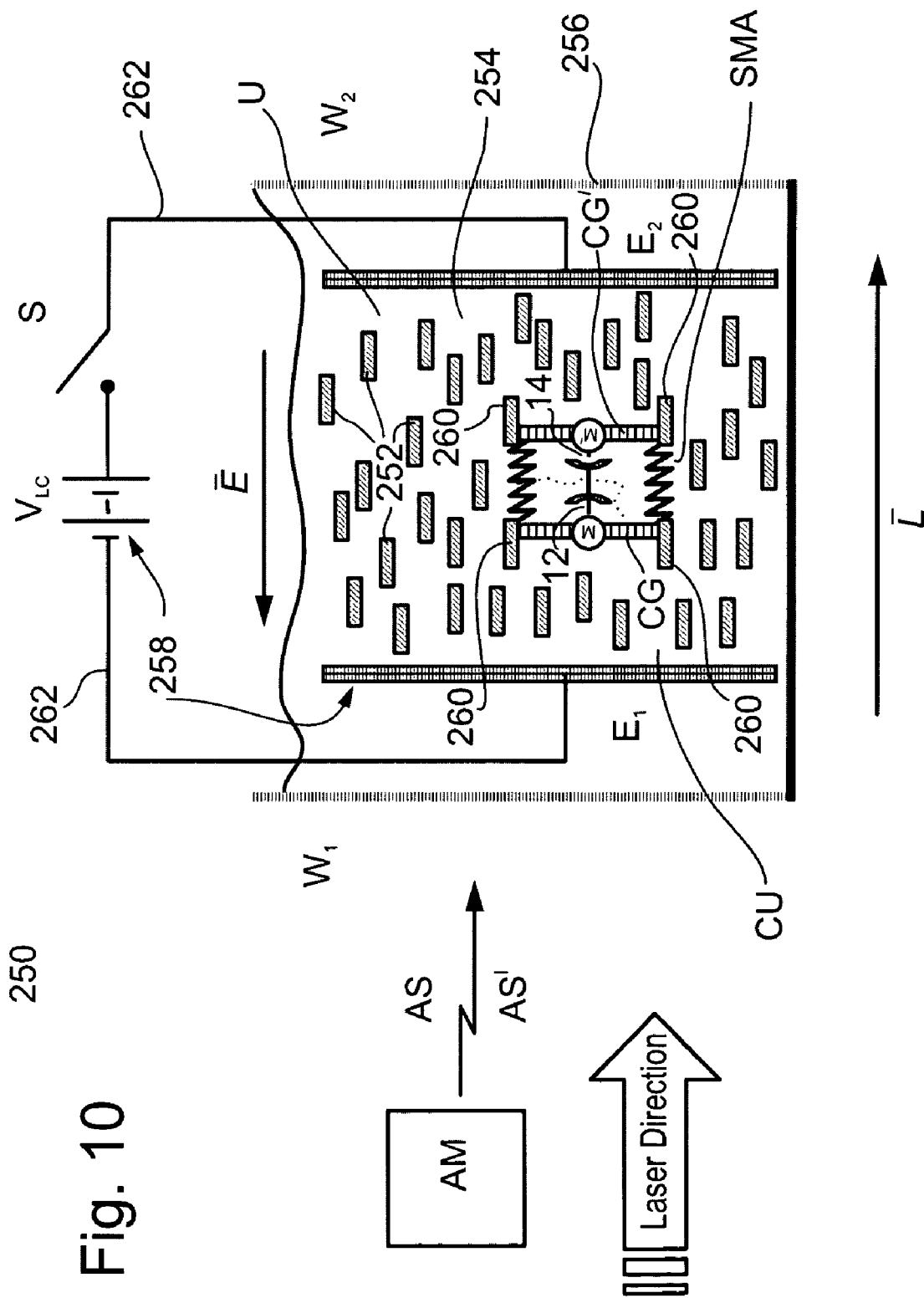
FIG. 10 is a schematic diagram illustrating a side view of a second exemplary preferred embodiment of the system including the synthetic molecular spring device used for dynamically controlling the system property of momentum, as relating to direction oriented molecular motion, in accordance with the present invention.

The following two specific exemplary preferred embodiments, illustrated in FIGS. 9 and 10, of implementing the method and corresponding system thereof, using a synthetic molecular spring device in the system for dynamically controlling the system property of momentum, as relating to particle motion and direction oriented molecular motion, respectively, demonstrate application of the synthetic molecular assembly, SMA, as a photo-active, electro-active, or chemical-active, molecular component in a medium.

In general, in the exemplary embodiments illustrated in FIGS. 9 and 10, the synthetic molecular spring device features a plurality of synthetic molecular assemblies, SMAs, which are in exemplary forms of monomer, oligomer, and/or polymer assemblies, as described above and illustrated in FIGS. 1-8. More specifically, in each of these embodiments, an exemplary synthetic molecular assembly, SMA, of a plurality of synthetic molecular assemblies, SMAs, corresponds to a slight modification of the type of synthetic molecular assembly, SMA, previously described above and illustrated in FIG. 1.

In general, selected unit, U, of each system 200 and 250, includes an entity selected from the group consisting of particles, crystals, vesicles, proteins, molecules, and, cells, which are suspended, solubilized, dissolved, mixed, or dispersed, in a host medium such as a liquid, gas, or solid. Specific examples of entities included in selected unit, U, of each system, are selected from the group consisting of nanoparticles, directionally orientable particles, liquid crystals, directionally orientable molecules, and, liquid crystal molecules, which are suspended, solubilized, dissolved, mixed, or dispersed, in a host medium such as a liquid, gas, or solid. Most preferably, selected unit, U, of each system 200 and 250, includes particles suspended or solubilized in a solvent contained in a vessel, and, includes directionally orientable molecules, such as liquid crystal molecules, solubilized in a liquid, respectively, (where in each embodiment of system 200 and 250, selected unit, U, is absent of any synthetic molecular assembly, SMA), wherein each system, selected unit, U, exhibits the system property of momentum which is dynamically controllable by the synthetic molecular spring device.

In system 200, the synthetic molecular assemblies, SMAs, are operatively coupled to at least one element or component of the selected unit, U, via the at least one binding site, BS, by the coupling mechanism being chemical adsorption, for forming coupled unit, CU. In system 250, the synthetic molecular assemblies, SMAs, are operatively coupled to at least one element or component of the selected unit, U, via the at least one complexing group, CG, by the coupling mechanism being non-bonding physical interaction, for forming coupled unit, CU. As part of coupled unit, CU, the synthetic molecular assemblies, SMAs, are in a phase or state of matter selected from the group consisting of the solid state, the liquid state, the gas state, interfaces thereof, and, combinations thereof.

In systems 200 and 250, activating mechanism, AM, sends an activating signal, AS/AS', to at least one predetermined atom-axial ligand pair of at least one synthetic molecular assembly, SMA, as part of coupled unit, CU, for changing the system property of momentum exhibited by selected unit, U, that is, momentum exhibited by the particles suspended or solubilized in a solvent, or momentum exhibited by the liquid crystal molecules solubilized in a liquid, respectively, by way of exchanging momentum of selected unit, U, with the surrounding medium. Activating signal, AS/AS', is, for example, a laser light electromagnetic signal, an electrical signal, an electronic signal, or a chemical signal, directed at the coupled unit, CU.

FIG. 9 is a schematic diagram illustrating a side view of a first exemplary preferred embodiment of the system, generally referred to as system 200, including the synthetic molecular spring device used for dynamically controlling the system property of momentum, as relating to particle motion.

In FIG. 9, system 200 including a synthetic molecular spring device for dynamically controlling the system property of momentum, relating to particle motion, features the following main components: (a) the synthetic molecular spring device, having components whose structure/function relationships and behavior are described above and illustrated in FIGS. 1-8, featuring (i) at least one synthetic molecular assembly, SMA, where, in FIG. 9, for illustrative purpose only, in a non-limiting way, only two synthetic molecular assemblies, SMA-1 and SMA-2, of a plurality of synthetic molecular assemblies, SMAs, are shown, and (ii) an activating mechanism, AM; and (b) a selected unit, U, of system 200, generally being particles 202 suspended or solubilized in a solvent 204 contained in a vessel 206 (where selected unit, U, is absent of any synthetic molecular assembly, SMA), wherein selected unit, U, exhibits the system property of momentum, relating to particle motion, which is dynamically controllable by the synthetic molecular spring device.

As shown in FIG. 9, in system 200, each of the plurality of the synthetic molecular assemblies, SMAs, for example, SMA-1 and SMA-2, is operatively coupled to selected unit, U, that is, particles 202 suspended or solubilized in solvent 204 contained in vessel 206, for forming coupled unit, CU, whereby following activating mechanism, AM, sending an activating signal, AS/AS', to at least one predetermined atom-axial ligand pair of at least one synthetic molecular assembly, SMA, for example, to at least one of the two atom-axial ligand pairs 12 and 14 of synthetic molecular assembly, SMA-1, and/or, to at least one of the two atom-axial ligand pairs 12 and 14 of synthetic molecular assembly, SMA-2, of coupled unit, CU, for physicochemically modifying the at least one predetermined atom-axial ligand pair, there is activating at least one cycle of spring-type elastic reversible transitions between contracted and expanded linear conformational states, (A) and (B), respectively, or, between expanded and contracted linear conformational states, (B) and (A), respectively, as described above and illustrated in FIGS. 1-8, of at least one molecular linker, ML, of the at least one synthetic molecular assembly, SMA, for example, of at least one of the two molecular linkers, ML and ML', of synthetic molecular assembly, SMA-1, and/or, of at least one of the two molecular linkers ML and ML', of synthetic molecular assembly, SMA-2, of coupled unit, CU, thereby causing a dynamically controllable change in the system property of momentum, relating to particle motion, exhibited by selected unit, U, that is, particles 202 suspended or solubilized in solvent 204 contained in vessel 206, of system 200.

In FIG. 9, each synthetic molecular assembly, SMA-1 and SMA-2, corresponds to a slight modification of the type of synthetic molecular assembly, SMA, previously described above and illustrated in FIG. 1. Specifically, in each synthetic molecular assembly, SMA-1 and SMA-2, the lower complexing group, CG', includes at least two binding sites, BS and BS', functioning for binding or operatively coupling each respective synthetic molecular assembly, SMA-1 and SMA-2, to particles 202 of selected unit, U, of system 200. This enables operative coupling in the form of well defined attachment of each respective synthetic molecular assembly, SMA-1 and SMA-2, to the exposed outer surface 208 of particles 202, and in a well defined spatial orientation with respect to the particle surface 208. Preferably, each of binding sites, BS and BS', is of appropriate geometrical configuration or form and dimensions, and is attached to the lower complexing group, CG', for inducing the resulting conformation of each synthetic molecular assembly, SMA, whereby molecular linkers, ML and ML', of each synthetic molecular assembly, SMA, acquire an orientation substantially perpendicular to particle surface 208, as shown in FIG. 9. In alternative embodiments of system 200, the plurality of the synthetic molecular assemblies, SMAs, includes a predetermined number of oligomer or polymer scaled-up synthetic molecular assemblies, SMA-Us, such as scaled-up synthetic molecular assemblies, SMA-U, previously described above and illustrated in FIGS. 6-8.

Particles 202 of selected unit, U, function as a mobile substrate in the binding or operative coupling, for example, by adsorption, of the synthetic molecular assemblies, SMAs. Particles 202 are preferably of a substance which is chemically compatible with, and allows efficient adsorption to, the synthetic molecular assemblies, SMAs. For example, when having thiol-groups in binding sites, BS and BS', of the synthetic molecular assemblies, SMAs, it is preferable that at least the outer layer 208 of particles 202 include, or entirely be, a noble metal such as gold, platinum, or silver. Particles 202 coated with a thin metal outer layer are highly effective for minimizing light reflection.

In general, particles 202 are of various geometrical configurations, forms, or shapes, with variable sizes or dimensions, masses, and volumes. For example, particles 202 may be spherical, elliptical, disc-like, cylindrical or rod-like, polygonal, or with no particular defined shape or geometry, that is, amorphous, as particularly shown in FIG. 9. Particles 202 have sizes or dimensions of the order in the range of between centimeters and angstroms, and preferably, in the range of between millimeters to nanometers. Structural factors relating to particle mass and shape determine the self-rotation of particles 202 according to well known physical laws. These factors are exploitable for optimizing operation of system 200.

In a specific embodiment of system 200, selected unit, U, is a suspension of gold particles 202 in a solvent 204, whereby the synthetic molecular assemblies, SMAs, are operatively coupled, by adsorption, to surface 208 of gold particles 202, for forming coupled unit, CU, corresponding to relatively small sized gold particles 202 covered with a film 208 (indicated in FIG. 9 by the dark line forming the perimeter of each particle 202) of the synthetic molecular assemblies, SMAs, and suspended or solubilized in a solvent 204. Moreover, preferably, conformation of the synthetic molecular assemblies, SMAs, is such that molecular linkers, ML and ML', of each synthetic molecular assembly, SMA, acquire an orientation substantially perpendicular or normal to particle surface 208, as shown in FIG. 9, whereby the spring-type elastic reversible transitions between contracted and expanded linear conformational states, (A) and (B), respectively, or, between expanded and contracted linear conformational states, (B) and (A), occur in the direction perpendicular or normal to particle surface 208.

Vessel 206 of selected unit, U, of system 200, is an open or closed container, membrane, vesicle, or similar type of structure, utilized for containing or confining particles 202 suspended or solubilized in solvent 204. In this particular embodiment, vessel 206 is also utilized for containing or confining coupled unit, CU, that is, particles 202 coated with the synthetic molecular assemblies, SMAs, and suspended or solubilized in solvent 204. In this embodiment, where activating mechanism, AM, is external to vessel 206, at least a part of vessel 206 is permeable to activating signal, AS/AS', sent by activating mechanism, AM, and directed to a predetermined number of the synthetic molecular assemblies, SMAs. In exemplary system 200 shown in FIG. 9, wherein activating mechanism, AM, is a laser light source sending a laser light, L, form of activating signal, AS/AS', in a linear direction (indicated by the arrow labeled L) to vessel 206, preferably, left and right vessel walls, $W_1$ and $W_2$, are each sufficiently transparent to a predetermined spectral range, in order to allow laser light, L, sent by the laser light source to effectively activate the synthetic molecular assemblies, SMAs, coated on particles 202.

In general, in system 200, activating mechanism, AM, is any type of activating mechanism, AM, previously listed above in the description of structure/function of the generalized synthetic molecular spring device of the present invention, sending the activating signal, AS/AS', being for example, a laser light electromagnetic signal, an electrical signal, an electronic signal, a chemical signal, or an electrochemical signal, directed at the coupled unit, CU. In system 200, activating mechanism, AM, is preferably a laser light source with high repetition pulse rate. For example, a picosecond diode laser, operating at a repetition rate, that is, being turned on and off, in a range of between on the order of Hz to on the order of MHz, and preferably, for fast triggering, operating at a repetition rate of 40 MHz, with an accuracy of plus/minus 3 nm, and, with a wavelength in a range of between about 350 nm to about 570 nm, or, with a wavelength in a range of between about 700 nm to about 800 nm, preferably, in a range of between about 420 nm to about 450 nm.

During operation, following activating mechanism, AM, that is, the laser light source, sending an activating signal, AS/AS', that is, electromagnetic radiation, L, to at least one predetermined atom-axial ligand pair of at least one synthetic molecular assembly, SMA, for example, to at least one of the two atom-axial ligand pairs 12 and 14 of synthetic molecular assembly, SMA-1, and/or, to at least one of the two atom-axial ligand pairs 12 and 14 of synthetic molecular assembly, SMA-2, of coupled unit, CU, only that portion of coupled unit, CU, that is, only those particles operatively coupled with synthetic molecular assemblies, SMAs, having atom-axial ligand pairs 12 and 14 facing the direction (left side in FIG. 9) of activating signal, AS/AS', that is, laser light, L, controllably move in a sudden or abrupt 'jumping' or 'swimming' like manner, in response to the spring-type elastic reversible linear conformational transitions of at least one molecular linker, ML and ML', whereas those synthetic molecular assemblies, SMAs, having atom-axial ligand pairs facing the direction (right side in FIG. 9) of the dark side are unaffected by the activating signal, AS/AS', sent by the activating mechanism, AM, and therefore, do not undergo the spring-type elastic reversible transitions.

Accordingly, in principle, by implementing such an embodiment of the present invention, the spring-type elastic reversible transitions of the synthetic molecular assemblies, SMAs, enable particles 202 to controllably move, for example, by rotation and/or translation, in a sudden or abrupt 'jumping' or 'swimming' like manner, due to the dynamically controllable change in the system property of momentum, relating to particle motion, exhibited by selected unit, U, that is, particles 202 suspended or solubilized in solvent 204. Implementation of system 200 according to the present invention, is commercially applicable to a wide variety of different applications, as previously stated above when describing the additional advantages and benefits of the present invention.

FIG. 10 is a schematic diagram illustrating a side view of a second exemplary preferred embodiment of the system, generally referred to as system 250, including the synthetic molecular spring device used for dynamically controlling the system property of momentum, as relating to direction oriented molecular motion.

In FIG. 10, system 250 including a synthetic molecular spring device for dynamically controlling the system property of momentum, relating to direction oriented molecular motion, features the following main components: (a) the synthetic molecular spring device, having components whose structure/function relationships and behavior are described above and illustrated in FIGS. 1-8, featuring (i) at least one synthetic molecular assembly, SMA, where, in FIG. 10, for illustrative purpose only, in a non-limiting way, a single synthetic molecular assembly, SMA, is shown, and (ii) an activating mechanism, AM; and (b) a selected unit, U, of system 250, generally being directionally orientable molecules 252 solubilized or mixed in a liquid 254 contained in a vessel 256 and subjected to the influence of a molecule orientation director mechanism 258 (where selected unit, U, is absent of any synthetic molecular assembly, SMA), wherein selected unit, U, exhibits the system property of momentum, relating to direction oriented molecular motion, which is dynamically controllable by the synthetic molecular spring device.

As shown in FIG. 10, in system 250, each synthetic molecular assembly, SMA, for example, SMA, is operatively coupled to selected unit, U, that is, directionally orientable molecules 252 solubilized or mixed in liquid 254 contained in a vessel 256 and subjected to the influence of molecule orientation director mechanism 258, for forming coupled unit, CU, whereby following activating mechanism, AM, sending an activating signal, AS/AS', to at least one predetermined atom-axial ligand pair of at least one synthetic molecular assembly, SMA, for example, to at least one of the two atom-axial ligand pairs 12 and 14 of synthetic molecular assembly, SMA, of coupled unit, CU, for physicochemically modifying the at least one predetermined atom-axial ligand pair, there is activating at least one cycle of spring-type elastic reversible transitions between contracted and expanded linear conformational states, (A) and (B), respectively, or, between expanded and contracted linear conformational states, (B) and (A), respectively, as described above and illustrated in FIGS. 1-8, of at least one molecular linker, ML, of the at least one synthetic molecular assembly, SMA, for example, of at least one of the two molecular linkers, ML and ML', of synthetic molecular assembly, SMA, of coupled unit, CU, thereby causing a dynamically controllable change in the system property of momentum, relating to direction oriented molecular motion, exhibited by selected unit, U, that is, directionally orientable molecules 252 solubilized or mixed in liquid 254 contained in vessel 256 and subjected to the influence of molecule orientation director mechanism 258, of system 250.

In this particular exemplary preferred embodiment of the system of the present invention, preferably, as a non-limiting example, directionally orientable molecules 252 are liquid crystal molecules 252, and correspondingly, molecule orientation director mechanism 258 is a liquid crystal director mechanism 258. Accordingly, selected unit, U, of system 250, features liquid crystal molecules 252 solubilized or mixed in liquid 254 contained in vessel 256 and subjected to the influence of liquid crystal director mechanism 258. Henceforth, in a non-limiting manner, these preferred exemplary components of selected unit, U, of system 250, are referred to in the following illustrative description of implementing this particular exemplary preferred embodiment of the system of the present invention.

In this particular exemplary preferred embodiment of the present invention, exemplary synthetic molecular assembly, SMA, corresponds to a slight modification of the type of synthetic molecular assembly, SMA, previously described above and illustrated in FIG. 1. Specifically, in synthetic molecular assembly, SMA, each complexing group, CG and CG', has attached chemical groups 260 (indicated in FIG. 10 by rectangles 260), functioning for operatively coupling, in particular, by physical interaction, of each synthetic molecular assembly, SMA, to liquid crystal molecules 252 of selected unit, U, while liquid crystal molecules 252 are solubilized or mixed in liquid 254 contained in vessel 256 and subjected to the influence of liquid crystal director mechanism 258.

In the embodiment illustrated by FIG. 10, the synthetic molecular assemblies, SMAs, are not operatively coupled via physical or chemical 'attachment' to liquid crystal molecules 252 of selected unit, U, in a way similar to the previously described exemplary preferred embodiment of the system, system 200, illustrated in FIG. 9, whereby the operative coupling is in the form of well defined connection or attachment of each respective synthetic molecular assembly, SMA-1 and SMA-2, to the exposed outer surface 208 of particles 202. Instead, in the embodiment of system 250, the synthetic molecular assemblies, SMAs, including attached chemical groups 260, feature structure capable of 'physically interacting' with, and affecting, in a predetermined manner, the system property of momentum of the surrounding environment, that is, selected unit, U, being liquid crystal molecules 252 solubilized or mixed in liquid 254 contained in vessel 256 and subjected to the influence of liquid crystal director mechanism 258. In a specific embodiment of system 250, a predetermined number of chemical groups 260 attached to complexing groups, CG and CG', are liquid crystal molecules 252.

In general, liquid crystal molecules 252 are of various geometrical configurations, forms, or shapes, with variable sizes or dimensions, masses, and volumes. For example, liquid crystal molecules 252 may be cylindrical or rod-like, spherical, elliptical, disc-like, or polygonal. Liquid crystal molecules 252 are preferably of cylindrical or rod-like geometrical configuration, form, or shape, as particularly shown in FIG. 10.

In system 250, each liquid crystal molecule 252 generally features a rod-like molecular structure, having a long rigid molecular axis, and strong dipoles, and/or easily polarizable substituents. It is well known in the art and technology of liquid crystals and devices featuring thereof, that the distinguishing characteristic of liquid crystalline states is the tendency of liquid crystal molecules to point along a common axis, commonly known as the 'director'. This is in contrast to molecules in the liquid phase exhibiting no intrinsic order. The tendency of the liquid crystal molecules to point along the director leads to a condition known as anisotropy, meaning that the properties of the liquid crystal medium depend upon the direction in which they are measured.

In the absence of an appropriate external force or influence, the director of a liquid crystal molecule is free to point in any direction. Subjecting liquid crystal molecules to an appropriate force or influence, such as an applied electric or magnetic field, can cause significant changes, that is, direction oriented changes, in macroscopic properties of a liquid crystal molecular system. Surface treatments can be used in liquid crystal devices to force specific directional orientations of the director. For example, when a thin polymer coating, usually a thin polyimide coating, is spread on a glass substrate and rubbed in a single direction with a cloth, it is observed that liquid crystal molecules in contact with that surface align with the direction of rubbing.

As particularly shown in FIG. 10, liquid crystal molecules 252 are subjected to the appropriate force or influence being an applied electric field, E, generated by liquid crystal director mechanism 258 of selected unit, U, and applied in a parallel, but opposite, direction (indicated by the arrow labeled E) relative to the direction (indicated by the arrow labeled L) of laser light, L, sent by activating mechanism, AM. Liquid crystal director mechanism 258 features (i) a voltage source, $V_{LC}$, (ii) a switch, S, (iii) electrodes $E_1$ and $E_2$, and (iv) electrical wiring 262. Electrodes $E_1$ and $E_2$ are preferably made of, for example, the well known transparent conductive material, indium tin oxide (ITO). When liquid crystal director mechanism 258 is activated, liquid crystal molecules 252 solubilized or mixed in liquid 254 become directionally oriented and aligned in the direction of a common axis, that is, the director, in the same direction of the applied electric field, E. As illustrated in FIG. 10, chemical groups 260 attached to complexing groups, CG and CG', which physically interact with liquid crystal molecules 252, induce preferred directional orientation and alignment of the axis of the synthetic molecular assembly, SMA, in substantially the same direction as the director of liquid crystal molecules 252.

Vessel 256 of selected unit, U, of system 250, is an open or closed container, membrane, vesicle, or similar type of structure, utilized for containing or confining liquid crystal molecules 252 solubilized or mixed in liquid 254 and subjected to the influence of liquid crystal director mechanism 258. In this particular embodiment, vessel 256 is also utilized for containing or confining coupled unit, CU, that is, liquid crystal molecules 252 solubilized or mixed in liquid 254 and subjected to the influence of liquid crystal director mechanism 258, and physically interacting with the synthetic molecular assemblies, SMAs. In this embodiment, where activating mechanism, AM, is external to vessel 256, at least a part of vessel 256 is permeable to activating signal, AS/AS', sent by activating mechanism, AM, and directed to a predetermined number of the synthetic molecular assemblies, SMAs. In exemplary system 250 shown in FIG. 10, wherein activating mechanism, AM, is a laser light source sending a laser light, L, form of activating signal, AS/AS', in the linear direction (indicated by the arrow labeled L) towards vessel 256, preferably, left and right vessel walls, $W_1$ and $W_2$, as well as electrodes $E_1$ and $E_2$ of liquid crystal director mechanism 258, are each sufficiently transparent to a predetermined spectral range, in order to allow laser light, L, sent by the laser light source to effectively activate the synthetic molecular assemblies, SMAs, which physically interact with liquid crystal molecules 252.

In general, in system 250, activating mechanism, AM, is any type of activating mechanism, AM, previously listed above in the description of structure/function of the generalized synthetic molecular spring device of the present invention, sending the activating signal, AS/AS', being for example, a laser light electromagnetic signal, an electrical signal, an electronic signal, a chemical signal, or an electrochemical signal, directed at the coupled unit, CU. In system 250, activating mechanism, AM, is preferably a laser light source with high repetition pulse rate. For example, a picosecond diode laser, operating at a repetition rate, that is, being turned on and off, in a range of between on the order of Hz to on the order of MHz, and preferably, for fast triggering, operating at a repetition rate of 40 MHz, with an accuracy of plus/minus 3 nm, and, with a wavelength in a range of between about 350 nm to about 570 nm, or, with a wavelength in a range of between about 700 nm to about 800 nm, preferably, in a range of between about 420 nm to about 450 nm.

During operation, following activating mechanism, AM, that is, the laser light source, sending an activating signal, AS/AS', that is, electromagnetic radiation, L, to at least one predetermined atom-axial ligand pair of at least one synthetic molecular assembly, SMA, for example, to at least one of the two atom-axial ligand pairs 12 and 14 of synthetic molecular assembly, SMA, of coupled unit, CU, the liquid crystal molecules 252 operatively coupled, that is, physically interacting, with the at least one synthetic molecular assembly, SMA, controllably move in a sudden or abrupt 'jumping' like manner, along substantially the same direction as the director of liquid crystal molecules 252, corresponding to directional oriented molecular motion, in response to the spring-type elastic reversible linear conformational transitions of at least one molecular linker, ML and ML'.

Accordingly, in principle, by implementing such an embodiment of the present invention, the spring-type elastic reversible transitions of the synthetic molecular assemblies, SMAs, enable liquid crystal molecules 252, to controllably move in a sudden or abrupt 'jumping' like manner, along substantially the same direction as the director of liquid crystal molecules 252, due to the dynamically controllable change in the system property of momentum, relating to direction oriented molecular motion, exhibited by selected unit, U, that is, liquid crystal molecules 252 solubilized or mixed in liquid 254 contained in a vessel 256 and subjected to the influence of liquid crystal director mechanism 258.

For implementation of system 250 according to the present invention, the comparison or difference between the direction of the activating signal, AS/AS', being laser light, L, sent by activating mechanism, AM, being a laser light source, in a direction towards vessel 256, and the direction of the force or influence being applied electric field, E, generated by liquid crystal director mechanism 258 of selected unit, U, is variable. Moreover, this comparison or difference in directions is used, in part, for 'tuning' the dynamically controllable change in the system property of momentum, relating to direction oriented molecular motion, exhibited by selected unit, U, that is, liquid crystal molecules 252 solubilized or mixed in liquid 254 contained in vessel 256 and subjected to the influence of liquid crystal director mechanism 258.

Implementation of system 250 according to the present invention, is commercially applicable to a wide variety of different applications, as previously stated above when describing the additional advantages and benefits of the present invention. Specifically notable examples of implementing system 250 according to the present invention, are in the areas of display devices, such as two or three dimensional display devices, hydraulics, electro-active materials, photoactive materials, and chemical-active materials.

Dynamically Controlling System Property of Topography

Figure 11:
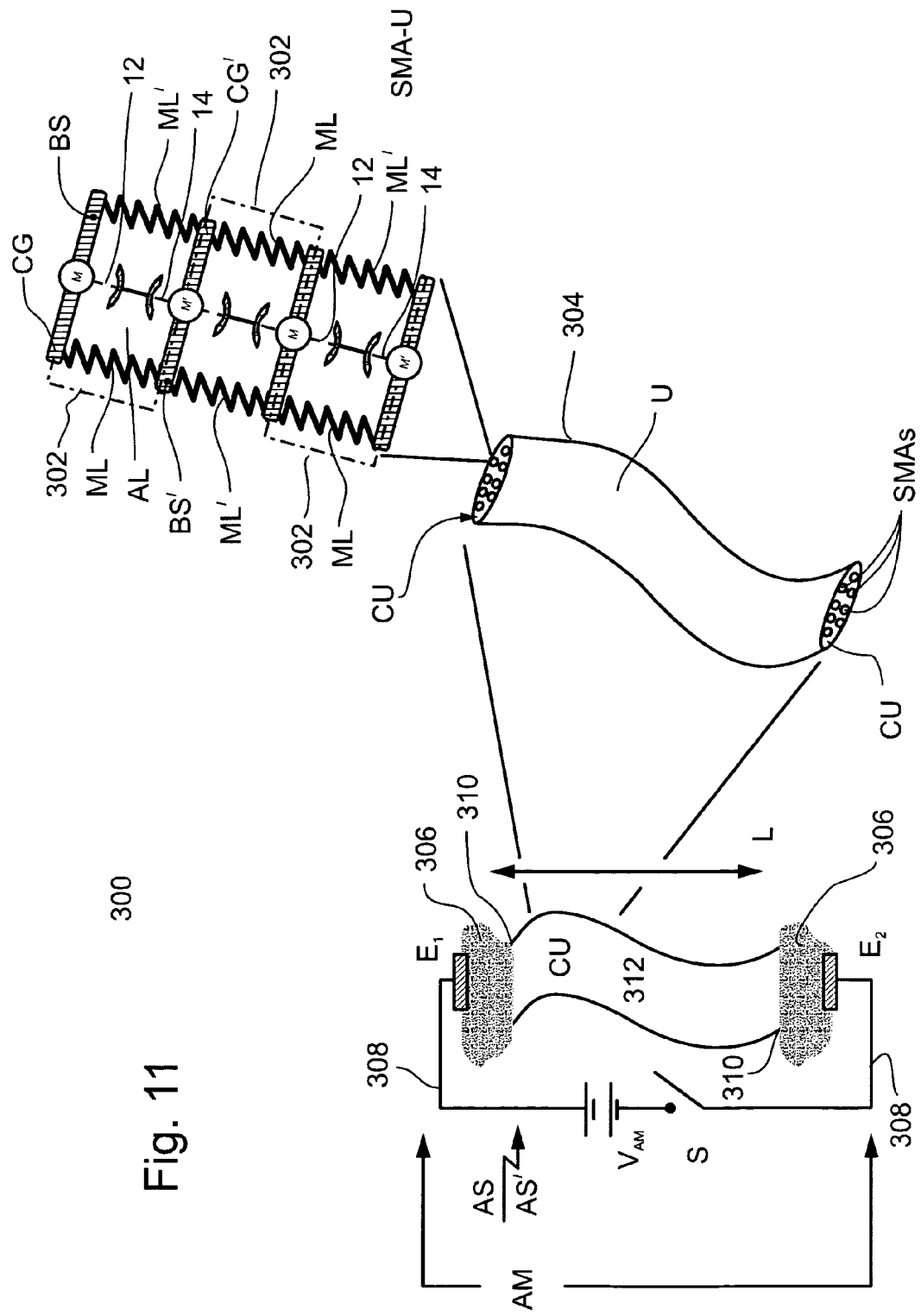
FIG. 11 is a schematic diagram illustrating a side view of a first exemplary preferred embodiment of the system including the synthetic molecular spring device used for dynamically controlling the system property of topography, as relating to changing dimension, such as length, in accordance with the present invention.

FIG. 11 is a schematic diagram illustrating a side view of a first exemplary preferred embodiment of the system, generally referred to as system 300, including the synthetic molecular spring device used for dynamically controlling the system property of topography, as relating to changing dimension, such as length.

In FIG. 11, system 300 including a synthetic molecular spring device for dynamically controlling the system property of topography, relating to changing dimension, such as length, features the following main components: (a) the synthetic molecular spring device, having components whose structure/function relationships and behavior are described above and illustrated in FIGS. 1-8, featuring (i) at least one synthetic molecular assembly, SMA, where, in FIG. 11, for illustrative purpose only, in a non-limiting way, a plurality of scaled-up synthetic molecular assemblies, SMA-Us, along with a close-up of part of an exemplary single scaled-up synthetic molecular assembly, SMA-U, are shown, and (ii) an activating mechanism, AM; and (b) a selected unit, U, of system 300, generally being a hollow fibrous structure 304 (where selected unit, U, is absent of any synthetic molecular assembly, SMA), wherein selected unit, U, exhibits the system property of topography, relating to changing dimension, such as length, which is dynamically controllable by the synthetic molecular spring device.

As shown in FIG. 11, in system 300, each synthetic molecular assembly, SMA, for example, SMA-U, is operatively coupled to selected unit, U, that is, hollow fibrous structure 304, for forming coupled unit, CU, whereby following activating mechanism, AM, sending an activating signal, AS/AS', to at least one predetermined atom-axial ligand pair of at least one synthetic molecular assembly, SMA, for example, to at least one of the atom-axial ligand pairs 12 and 14, of scaled-up synthetic molecular assembly, SMA-U, of coupled unit, CU, for physicochemically modifying the at least one predetermined atom-axial ligand pair, there is activating at least one cycle of spring-type elastic reversible transitions between contracted and expanded linear conformational states, (A) and (B), respectively, or, between expanded and contracted linear conformational states, (B) and (A), respectively, as described above and illustrated in FIGS. 1-8, of at least one molecular linker, ML of the at least one synthetic molecular assembly, SMA, for example, of at least one of the molecular linkers, ML and ML', of scaled-up synthetic molecular assembly, SMA-U, of coupled unit, CU, thereby causing a dynamically controllable change in the system property of topography, relating to changing dimension, such as length, exhibited by selected unit, U, that is, hollow fibrous structure 304, of system 300.

In general, in system 300 shown in FIG. 11, the synthetic molecular spring device features a plurality of synthetic molecular assemblies, SMAs, which are in exemplary forms of oligomer and/or polymer assemblies, as described above and illustrated in FIGS. 6-8. The specific exemplary preferred embodiment of implementing the method and corresponding system thereof, of the present invention, illustrated in FIG. 11, demonstrates application of the synthetic molecular assembly, SMA, as a fiber-like electro-active material.

Specifically, in system 300, exemplary synthetic molecular assembly, SMA, corresponds to a slight modification of the type of scaled-up synthetic molecular assembly, SMA-U, previously described above and illustrated in FIG. 6, wherein the molecular linkers, ML and ML', are selected such that molecular linker, ML, is a relatively good electrical conductor, whereas molecular linker, ML', is a relatively good electrical insulator. Accordingly, each of the synthetic molecular assemblies, SMAs, features structure exhibiting alternating electrical conductivity. Such specific selection of the molecular linkers, ML and ML', having essentially opposite electrical conduction properties is made in order to preferably direct a flow of charge along the pathway (indicated in FIG. 11 by the dashed line path 302) defined by the complexing groups, CG and CG', each complexed to a corresponding atom, M and M', respectively, and the electrically conductive molecular linkers, ML, instead of only along the pathway defined by the molecular linkers, ML. This configuration of the synthetic molecular assemblies, SMAs, ensures that the charge flowing through the synthetic molecular assemblies, SMAs, effectively reduces (debonds or bonds) or oxidizes (bonds or debonds), at least one of the components, that is, the axial ligand, AL, and/or the atom, M, of each predetermined atom-axial ligand pair, and/or at least one of the complexing groups, CG and CG', consequently resulting in the activating of the at least one cycle of spring-type elastic reversible transitions between contracted and expanded linear conformational states, (A) and (B), respectively, of the at least one molecular linker, ML of the at least one synthetic molecular assembly, SMA.

Hollow fibrous structure 304 of selected unit, U, functions as a substrate for the operative coupling of the synthetic molecular assemblies, SMAs, wherein, for example, the synthetic molecular assemblies, SMA-Us, are arranged and ordered according to the geometrical configuration or form of hollow fibrous structure 304, for forming coupled unit, CU, of system 300. Hollow fibrous structure 304 is preferably made of at least one material which is physicochemically compatible, and allows efficient coupling, with the synthetic molecular assemblies, SMAs, according to at least one of the previously described physical, chemical, and/or physicochemical, coupling mechanisms.

In alternative embodiments of system 300, hollow fibrous structure 304 is at least partly filled with at least one type of substance selected from the group consisting of polymeric types of substances, gel types of substances, and, porous types of substances, for providing hollow fibrous structure 304 with specific physicochemical properties, such as specific structural, mechanical, electrical, physical, and/or chemical, properties. Accordingly, in such alternative embodiments of system 300, the synthetic molecular assemblies, SMAs, for example, SMA-U, is operatively coupled to selected unit, U, that is, hollow fibrous structure 304 at least partly filled with at least one of the above listed types of substances, according to at least one of the previously described physical, chemical, and/or physicochemical, coupling mechanisms, for forming coupled unit, CU.

In general, in system 300, activating mechanism, AM, is any type of activating mechanism, AM, previously listed above in the description of structure/function of the generalized synthetic molecular spring device of the present invention, sending the activating signal, AS/AS', being for example, a laser light electromagnetic signal, an electrical signal, an electronic signal, a chemical signal, or an electrochemical signal, directed at the coupled unit, CU. For activating mechanism, AM, being a non-electrical or non-electronic type of activating mechanism, for example, an electromagnetic type of activating mechanism, such as a laser beam based activating mechanism, or a chemical type of activating mechanism, such as a protonation-deprotonation based activating mechanism, a pH change based activating mechanism, or a concentration change based activating mechanism, the specially selected alternating electrical conducting configuration of ML and ML' in exemplary synthetic molecular assembly, SMA-U, as described above is not needed.

Preferably, in system 300, activating mechanism, AM, is an electrical type of activating mechanism selected from the group consisting of electrical current based activating mechanisms which send electrical current types of activating signals, AS/AS', and, applied electrical potential based activating mechanisms which send applied electrical potential types of activating signals, AS/AS'. In the particular embodiment shown in FIG. 11, activating mechanism, AM, features (i) a voltage source, $V_{AM}$, (ii) a switch, S, (iii) electrodes $E_1$ and $E_2$, (iv) a conducting medium 306, and (v) electrical wiring 308.

Conducting medium 306 features structure and function specifically for electrically connecting electrodes $E_1$ and $E_2$ of activating mechanism, AM, to the synthetic molecular assemblies, SMAs, of coupled unit, CU, according to at least one of the physical, chemical, and/or physicochemical, coupling mechanisms previously described with respect to performing the step of operatively coupling each synthetic molecular assembly, SMA, to the selected unit, U, for forming a coupled unit, CU. More specifically, electrically connecting electrodes $E_1$ and $E_2$ via conducting medium of activating mechanism, AM, to the synthetic molecular assemblies, SMAs, of coupled unit, CU, is performed by using at least one physical coupling mechanism selected from the group consisting of physical adsorption, physical absorption, non-bonding physical interaction, mechanical coupling, simple juxtaposition, electrical coupling, and electronic coupling, and/or, by at least one chemical coupling mechanism selected from the group consisting of covalent types of chemical bonding, coordinative types of chemical bonding, ionic types of chemical bonding, hydrogen types of chemical bonding, and, Van der Waals types of chemical bonding.

Preferably, the electrically connecting electrodes $E_1$ and $E_2$ via conducting medium 306 of activating mechanism, AM, to the synthetic molecular assemblies, SMAs, of coupled unit, CU, is performed via at least one component of each synthetic molecular assembly, SMA, for example, whereby the at least one component is structured and functioning as a molecular conducting wire as previously described above, such as at least one binding site, BS, and/or at least one complexing group, CG, complexed to the at least one atom, M, and/or at least one axial ligand, AL, whereby at least one of the phenomena of electrical conductance, electronic conductance, and electronic tunneling, efficiently occurs between electrodes $E_1$ and $E_2$ of activating mechanism, AM, and each synthetic molecular assembly, SMA, of coupled unit, CU.

As shown by example in FIG. 11, electrodes $E_1$ and $E_2$ via conducting medium 306 of activating mechanism, AM, are electrically connected to the synthetic molecular assemblies, SMAs, of coupled unit, CU, via at least one component of each synthetic molecular assembly, SMA, at the end regions or extremities 310 of hollow fibrous structure 304 of coupled unit, CU. In alternative embodiments of system 300, electrodes $E_1$ and $E_2$ via conducting medium 306 of activating mechanism, AM, are electrically connected to the synthetic molecular assemblies, SMAs, of coupled unit, CU, via at least one component of each synthetic molecular assembly, SMA, at other regions, such as in a middle region 312, of hollow fibrous structure 304 of coupled unit, CU, as long as at least one of the phenomena of electrical conductance, electronic conductance, and electronic tunneling, efficiently occurs between electrodes $E_1$ and $E_2$ of activating mechanism, AM, and each synthetic molecular assembly, SMA, of coupled unit, CU.

Implementation of system 300, activating mechanism, AM, is operated by closing switch, S, whereby an electrical potential generated by voltage source, $V_{AM}$, is sent via wiring 308 to, and established across, electrodes $E_1$ and $E_2$, which in turn transmit the electrical potential via conducting medium 306 to each synthetic molecular assembly, SMA, of coupled unit, CU. Following activating mechanism, AM, sending an activating signal, AS/AS', that is, the electrical potential, to at least one predetermined atom-axial ligand pair of at least one synthetic molecular assembly, SMA, for example, to at least one of the atom-axial ligand pairs 12 and 14, of scaled-up synthetic molecular assembly, SMA-U, of coupled unit, CU, the length, L, of hollow fibrous structure 304 operatively coupled with the at least one synthetic molecular assembly, SMA, as described above, controllably expands and contracts in a spring-type elastic reversible manner, in response to the spring-type elastic reversible linear conformational transitions of the at least one molecular linker, ML and ML'.

Accordingly, in principle, by implementing such an embodiment of the present invention, the spring-type elastic reversible transitions of the synthetic molecular assemblies, SMAs, enables the length, L, of hollow fibrous structure 304 to controllably expand and contract in a spring-type elastic reversible manner, due to the dynamically controllable change in the system property of topography, relating to changing dimension, such as length, exhibited by selected unit, U, that is, hollow fibrous structure 304, of system 300.

Implementation of system 300 according to the present invention, is commercially applicable to a wide variety of different applications, as previously stated above when describing the additional advantages and benefits of the present invention. A specifically notable example of implementing system 300 according to the present invention, is whereby the synthetic molecular assemblies, SMAs, are incorporated into a supporting polymer in order to provide structural support or other mechanical properties to the polymer material. In such an embodiment, the polymer support may also be used as an electrical insulator, insulating different polymer units operatively coupled to the synthetic molecular assemblies, SMAs, in the polymer material.

Figure 12:
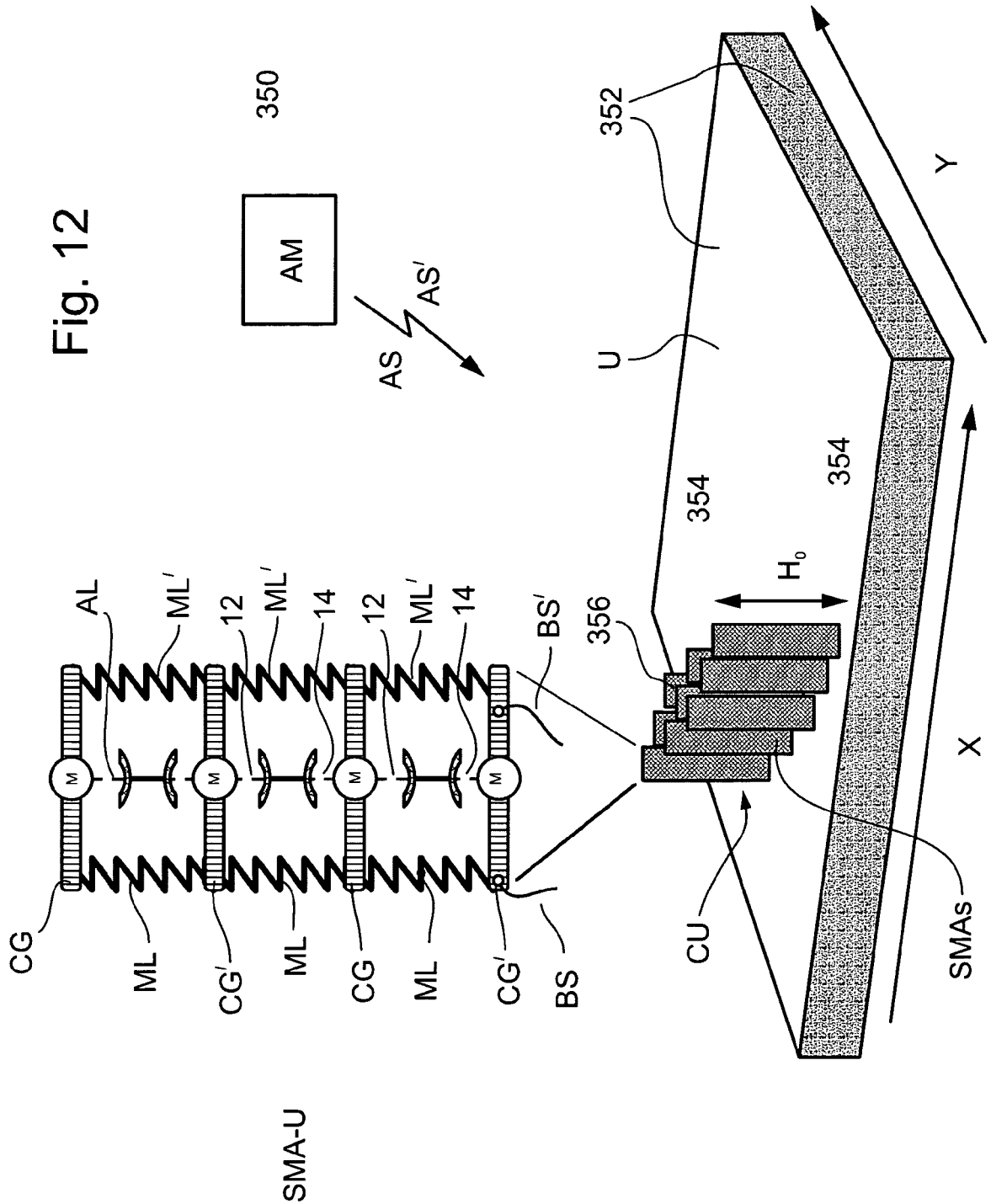
FIG. 12 is a schematic diagram illustrating a side/perspective view of a second exemplary preferred embodiment of the system including the synthetic molecular spring device used for dynamically controlling the system property of topography, as relating to changing dimension, such as height, in accordance with the present invention.

FIG. 12 is a schematic diagram illustrating a side/perspective view of a second exemplary preferred embodiment of the system, generally referred to as system 350, including the synthetic molecular spring device used for dynamically controlling the system property of topography, as relating to changing dimension, such as height.

In FIG. 12, system 350 including a synthetic molecular spring device for dynamically controlling the system property of topography, relating to changing dimension, such as height, features the following main components: (a) the synthetic molecular spring device, having components whose structure/function relationships and behavior are described above and illustrated in FIGS. 1-8, featuring (i) at least one synthetic molecular assembly, SMA, where, in FIG. 12, for illustrative purpose only, in a non-limiting way, a plurality of scaled-up synthetic molecular assemblies, SMA-Us, along with a close-up of part of an exemplary single scaled-up synthetic molecular assembly, SMA-U, are shown, and (ii) an activating mechanism, AM; and (b) a selected unit, U, of system 300, generally being a surface structure 352 (where selected unit, U, is absent of any synthetic molecular assembly, SMA), wherein selected unit, U, exhibits the system property of topography, relating to changing dimension, such as height, which is dynamically controllable by the synthetic molecular spring device.

As shown in FIG. 12, in system 350, each synthetic molecular assembly, SMA, for example, SMA-U, is operatively coupled to selected unit, U, that is, surface structure 352, for forming coupled unit, CU, whereby following activating mechanism, AM, sending an activating signal, AS/AS', to at least one predetermined atom-axial ligand pair of at least one synthetic molecular assembly, SMA, for example, to at least one of the atom-axial ligand pairs 12 and 14, of scaled-up synthetic molecular assembly, SMA-U, of coupled unit, CU, for physicochemically modifying the at least one predetermined atom-axial ligand pair, there is activating at least one cycle of spring-type elastic reversible transitions between contracted and expanded linear conformational states, (A) and (B), respectively, or, between expanded and contracted linear conformational states, (B) and (A), respectively, as described above and illustrated in FIGS. 1-8, of at least one molecular linker, ML, of the at least one synthetic molecular assembly, SMA, for example, of at least one of the molecular linkers, ML and ML', of scaled-up synthetic molecular assembly, SMA-U, of coupled unit, CU, thereby causing a dynamically controllable change in the system property of topography, relating to changing dimension, such as height, exhibited by selected unit, U, that is, surface structure 352, of system 350.

In general, in system 350 shown in FIG. 12, the synthetic molecular spring device features a plurality of synthetic molecular assemblies, SMAs, which are in exemplary forms of oligomer and/or polymer assemblies, as described above and illustrated in FIGS. 6-8. The specific exemplary preferred embodiment of implementing the method and corresponding system thereof, of the present invention, illustrated in FIG. 12, demonstrates application of the synthetic molecular assembly, SMA, as a photo-active, electro-active, or chemical-active, component of a surface structure.

Specifically, in system 350, exemplary synthetic molecular assembly, SMA, corresponds to a slight modification of the type of scaled-up synthetic molecular assembly, SMA-U, previously described above and illustrated in FIG. 6, wherein the lower complexing group, CG', includes at least two binding sites, BS and BS', functioning for binding or operatively coupling each synthetic molecular assembly, SMA-U, to selected unit, U, being surface structure 352, of system 350. This enables well defined attachment of each synthetic molecular assembly, SMA-U, to the exposed upper surface 354 of surface structure 352, and in a well defined spatial orientation with respect to exposed upper surface 354 of surface structure 352.

Preferably, each of binding sites, BS and BS', is of appropriate geometrical configuration or form and dimensions, and is attached to complexing group, CG', for inducing the resulting conformation of each synthetic molecular assembly, SMA, whereby molecular linkers, ML and ML', of each synthetic molecular assembly, SMA, acquire an orientation substantially perpendicular to exposed upper surface 354 of surface structure 2352, as shown in FIG. 12. In alternative embodiments of system 350, the plurality of the synthetic molecular assemblies, SMAs, includes a predetermined number of single or monomer synthetic molecular assemblies, SMAs, such as synthetic molecular assembly, SMA, previously described above and illustrated in FIGS. 1-5.

Exposed upper surface of surface 354 of surface structure 352, of selected unit, U, functions as a substrate in the binding or operative coupling, for example, by adsorption, of the synthetic molecular assemblies, SMAs. Exposed upper surface 354 of surface structure 352 is preferably of a substance which is chemically compatible with, and allows efficient adsorption to, the synthetic molecular assemblies, SMAs. For example, when having thiol-groups in binding sites, BS and BS', of the synthetic molecular assemblies, SMAs, it is preferable that exposed upper surface 354 of surface structure 352 includes, or entirely be, a noble metal such as gold, platinum, or silver. Exposed upper surface 354 coated with a thin metal outer layer is highly effective for minimizing light reflection.

In general, surface structure 352 is of various geometrical configuration, form, or shape, with variable size or dimensions, mass, and volume. For example, surface structure 352 is polygonal, such as rectangular or square, as particularly shown in FIG. 12, spherical, elliptical, disc-like, cylindrical or rod-like, or with no particular defined shape or geometry, that is, amorphous. Surface structure 352 has size or dimensions of the order in the range of between centimeters and angstroms, and preferably, in the range of between millimeters to nanometers.

In a specific embodiment of system 350, selected unit, U, is a surface structure 352 having exposed upper surface 354 including, or entirely being, gold, whereby the synthetic molecular assemblies, SMAs, are operatively coupled, by adsorption, to exposed upper surface 354 of surface structure 352, for forming coupled unit, CU, corresponding to gold surface structure 352 covered with a matrix shaped film or layer 356 (indicated in FIG. 12 by the group of upright positioned synthetic molecular assemblies, SMAs) of the synthetic molecular assemblies, SMAs, having an average height on top of exposed upper surface 354 of $H_0$. Moreover, preferably, conformation of the synthetic molecular assemblies, SMAs, is such that molecular linkers, ML and ML', of each synthetic molecular assembly, SMA, acquire an orientation substantially perpendicular or normal to gold surface 354, as shown in FIG. 12, whereby the spring-type elastic reversible transitions between contracted and expanded linear conformational states, (A) and (B), respectively, or, between expanded and contracted linear conformational states, (B) and (A), occur in the direction perpendicular or normal to gold surface 354.

In general, in system 350, activating mechanism, AM, is any type of activating mechanism, AM, previously listed above in the description of structure/function of the generalized synthetic molecular spring device of the present invention, sending the activating signal, AS/AS', being for example, a laser light electromagnetic signal, an electrical signal, an electronic signal, a chemical signal, or an electrochemical signal, directed at coupled unit, CU. For example, in system 350, activating mechanism, AM, is a laser light source with high repetition pulse rate. For example, a picosecond diode laser, operating at a repetition rate, that is, being turned on and off, in a range of from on the order of Hz to on the order of MHz, and preferably, for fast triggering, operating at a repetition rate of 40 MHz, with an accuracy of plus/minus 3 nm, and, with a wavelength in a range of from about 350 nm to about 570 nm, or, with a wavelength in a range of from about 700 nm to about 800 nm, preferably, in a range of from about 420 nm to about 450 nm.

During operation, following activating mechanism, AM, for example, a laser light source, sending an activating signal, AS/AS', for example, electromagnetic radiation, to at least one predetermined atom-axial ligand pair of at least one synthetic molecular assembly, SMA, for example, to at least one of the atom-axial ligand pairs 12 and 14, of scaled-up synthetic molecular assembly, SMA-U, of coupled unit, CU, the height of surface structure 352 operatively coupled with the at least one synthetic molecular assembly, SMA, as described above, controllably expands and contracts in a spring-type elastic reversible manner, in response to the spring-type elastic reversible linear conformational transitions of the at least one molecular linker, ML and ML'.

Accordingly, in principle, by implementing such an embodiment of the present invention, the spring-type elastic reversible transitions of the synthetic molecular assemblies, SMAs, enables the height of at least a part of surface structure 352 to controllably expand and contract in a spring-type elastic reversible manner, due to the dynamically controllable change in the system property of topography, relating to changing dimension, such as height, exhibited by selected unit, U, that is, surface structure 352, of system 350.

System 350 can particularly be implemented for dynamically controlling the topography, such as relating to the height of a specific location, having coordinates (X,Y) in the X-Y plane (as indicated in FIG. 12), of surface structure 352. Instead of generally directing activating mechanism, AM, for example, the laser light source, for sending the activating signal, AS/AS', for example, electromagnetic radiation, to a general area, region, or location, having a set of coordinates {X,Y}, in the X-Y plane of surface structure 352 encompassing a general or non-specified number of the at least one predetermined atom-axial ligand pair of at least one synthetic molecular assembly, SMA, of scaled-up synthetic molecular assembly, SMA-U, of coupled unit, CU, there is specifically directing activating mechanism, AM, for example, the laser light source, for sending the activating signal, AS/AS', for example, electromagnetic radiation, to a specific area, region, or location, having single coordinates (X,Y), in the X-Y plane of surface structure 352 encompassing a specific number of the at least one predetermined atom-axial ligand pair of at least one synthetic molecular assembly, SMA, of scaled-up synthetic molecular assembly, SMA-U, of coupled unit, CU.

Implementation of system 350 according to the present invention, is commercially applicable to a wide variety of different applications, as previously stated above when describing the additional advantages and benefits of the present invention. Specifically notable examples of implementing system 350 according to the present invention, are for fabricating nano scale components and devices, such as a mold, as a complementary method for lithography, as a molecular memory array, and, as opto-acoustic and electro-acoustic components and devices, such as membranes.

Dynamically Controlling System Property of Electronic Behavior

The following five specific exemplary preferred embodiments, illustrated in FIGS. 13, 14, 15, 16, and 17, of implementing the method and corresponding system thereof, using a synthetic molecular spring device in the system for dynamically controlling the system property of electronic behavior, as relating to molecular conductivity, demonstrate application of the synthetic molecular assembly, SMA, to the field of molecular electronics, in general, and as a photo-active, electro-active, or chemical-active, molecular electronic component in an electronic circuit, in particular.

The previously described and illustrated fundamental dynamic structure/function relationships and behavior of the synthetic molecular assembly, SMA, of the synthetic molecular spring device, are ideally applied for designing, constructing, and implementing molecular electronic components, devices, mechanisms, and systems. In each embodiment of the present invention, the system property is dynamically controllable as a direct consequent of the spring-type elastic reversible transitions between contracted and expanded, or, between expanded and contracted, linear conformational states of the at least one substantially elastic molecular linker, ML, included in a particular synthetic molecular assembly, SMA, of the synthetic molecular spring device, as described above and illustrated in FIGS. 1-8.

In FIGS. 13, 14, 15, 16, and 17, each system 400, 450, 500, 550, and 600, respectively, including a synthetic molecular spring device for dynamically controlling the system property of electronic behavior, features the following main components: (a) the synthetic molecular spring device, having components whose structure/function relationships and behavior are described above and illustrated in FIGS. 1-8, featuring (i) at least one synthetic molecular assembly, SMA, where, in each of FIGS. 13, 14, 15, 16, and 17, for illustrative purpose only, in a non-limiting way, a single synthetic molecular assembly, SMA, is shown, and (ii) an activating mechanism, AM; and (b) a selected unit, U, of each system 400, 450, 500, 550, and 600, respectively, generally being an electronic circuit, herein, referred to as electronic circuit U, including (i) a voltage source, V, (ii) a switch, S, (iii) a load or resistance, R, (iv) at least two electrodes, $E_i$, for i=2 to N electrodes, and (v) electronic wiring 802 (where in each system, selected unit, U, is absent of any synthetic molecular assembly, SMA), wherein selected unit, U, exhibits the system property of electronic behavior which is dynamically controllable by the respective synthetic molecular spring device.

As shown in FIGS. 13, 14, 15, 16, and 17, in each system 400, 450, 500, 550, and 600, respectively, each synthetic molecular assembly, SMA, for example, SMA, is operatively coupled to selected unit, U, that is, electronic circuit U, for forming coupled unit, CU, whereby following activating mechanism, AM, sending an activating signal, AS/AS', to at least one predetermined atom-axial ligand pair of at least one synthetic molecular assembly, SMA, for example, to at least one of the two atom-axial ligand pairs of synthetic molecular assembly, SMA, of coupled unit, CU, for physicochemically modifying the at least one predetermined atom-axial ligand pair, there is activating at least one cycle of spring-type elastic reversible transitions between contracted and expanded linear conformational states, (A) and (B), respectively, or, between expanded and contracted linear conformational states, (B) and (A), respectively, as described above and illustrated in FIGS. 1-8, of at least one molecular linker, ML, of the at least one synthetic molecular assembly, SMA, for example, of at least one of the two molecular linkers, ML and ML', of synthetic molecular assembly, SMA, of coupled unit, CU, thereby causing a dynamically controllable change in the system property of electronic behavior exhibited by selected unit, U, that is, electronic circuit U, of each respective system 400, 450, 500, 550, and 600.

Figure 13:
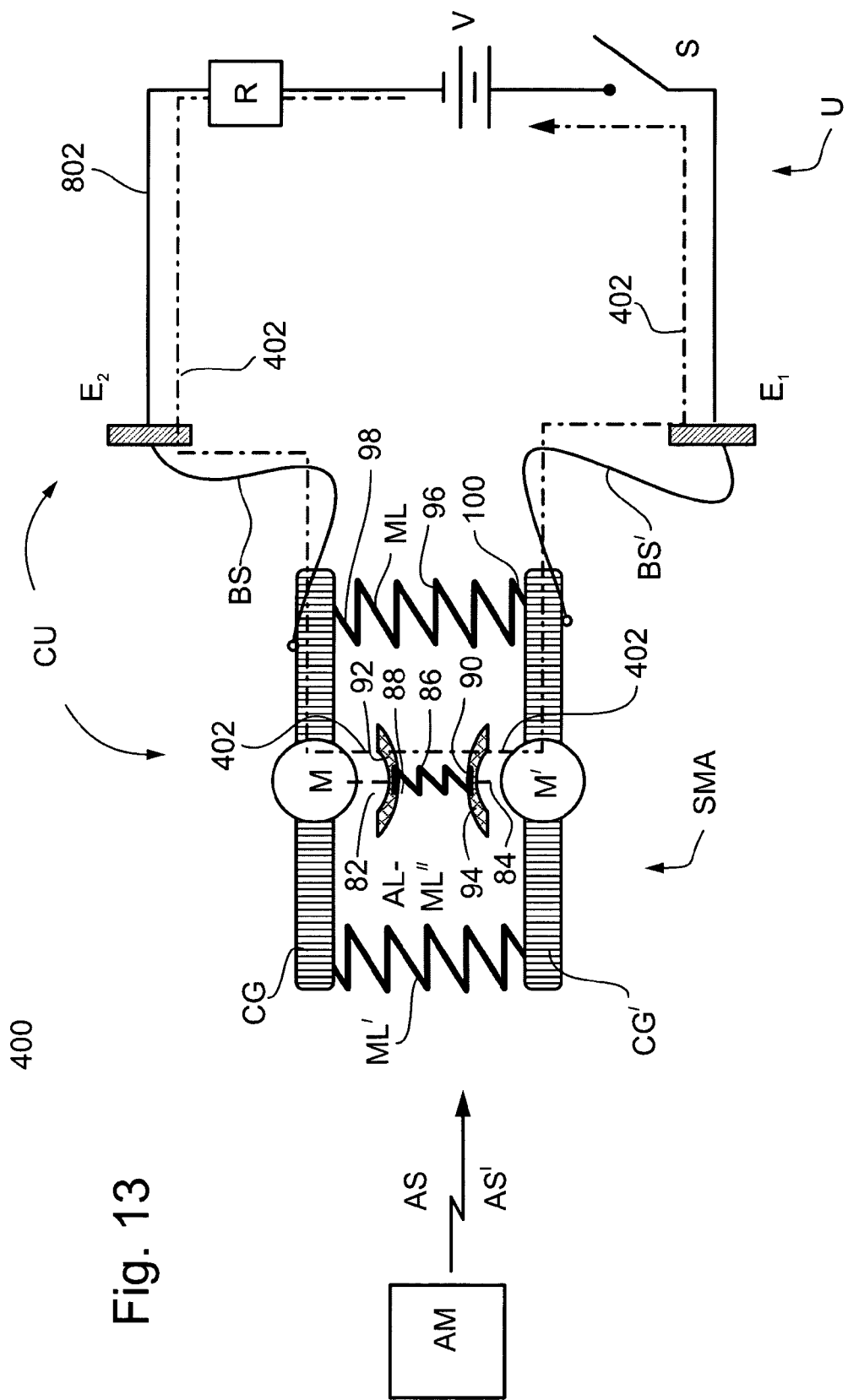
FIG. 13 is a schematic diagram illustrating a side view of a first exemplary preferred embodiment of the system including the synthetic molecular spring device used for dynamically controlling the system property of electronic behavior, as relating to molecular conductivity, in accordance with the present invention.
Figure 14:
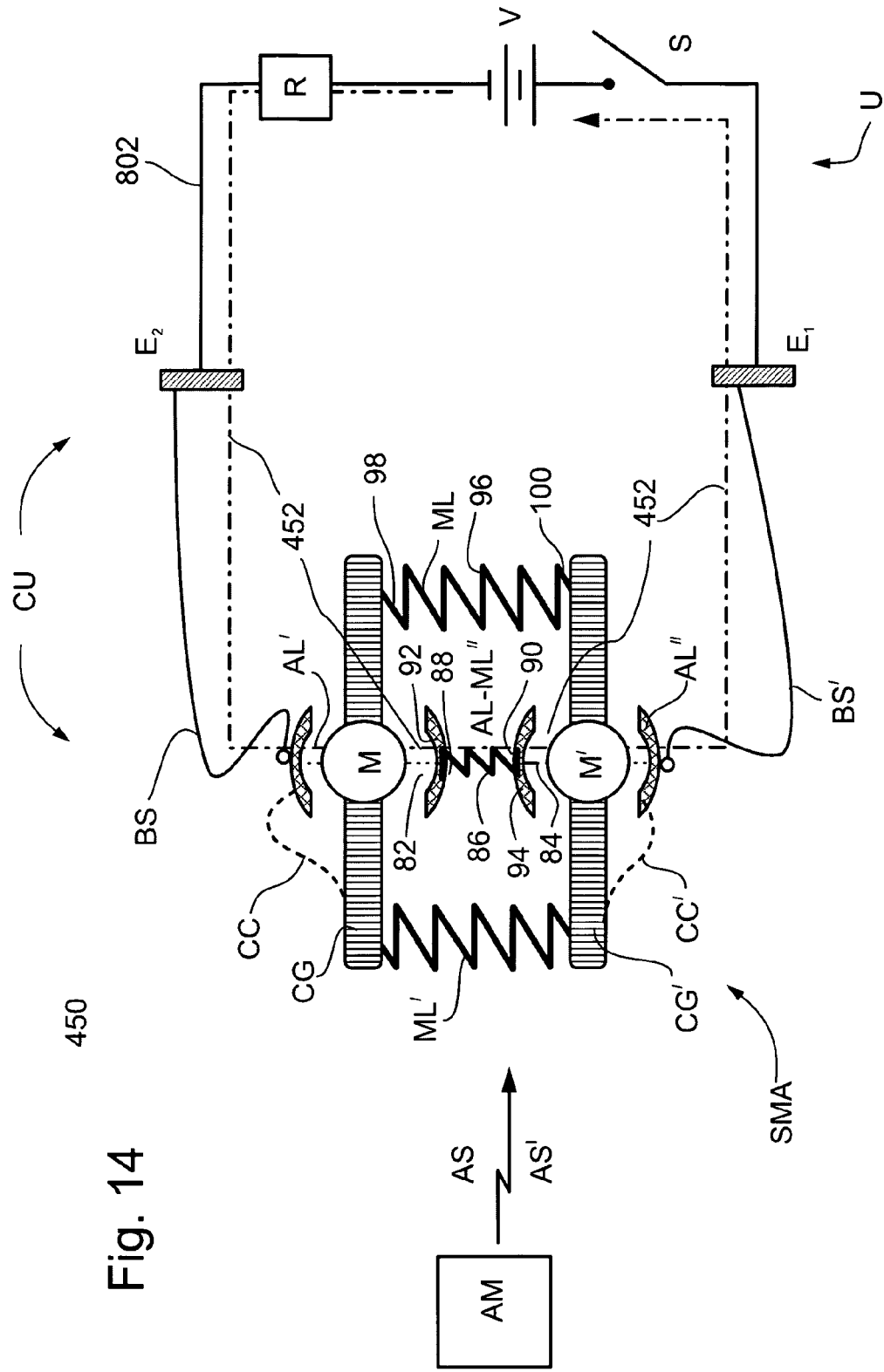
FIG. 14 is a schematic diagram illustrating a side view of a second exemplary preferred embodiment of the system including the synthetic molecular spring device used for dynamically controlling the system property of electronic behavior, as relating to molecular conductivity, in accordance with the present invention.

The following two specific exemplary preferred embodiments, illustrated in FIGS. 13 and 14, of implementing the method and corresponding system thereof, using a synthetic molecular spring device in the system for dynamically controlling the system property of electronic behavior, as relating to molecular (electrical/electronic) conductivity, demonstrate application of the synthetic molecular assembly, SMA, to the field of molecular electronics, in general, and as an electro-mechanical molecular relay in an electronic circuit, in particular.

FIGS. 13 and 14 are schematic diagrams illustrating a side view of a first and second exemplary preferred embodiment of the system, respectively, generally referred to as system 400 and system 450, respectively, including the synthetic molecular spring device used for dynamically controlling the system property of electronic behavior, as relating to molecular conductivity.

In each of these embodiments of the present invention, activation of the synthetic molecular assembly, SMA, by activating mechanism, AM, results in a dynamically controllable change in the system property of electronic behavior, as relating to molecular conductivity, exhibited by selected unit, U, that is, electronic circuit U, of system 400 and 450, illustrated in FIGS. 13 and 14, respectively. Specifically, the dynamically controllable change in molecular conductivity takes place along a designated electrical/electronic path (indicated in FIGS. 13 and 14 by the dashed/dotted line path 402 and 452, respectively) in each respective coupled unit, CU, being electronic circuit U operatively (electronically) coupled to each exemplary synthetic molecular assembly, SMA. More specifically, along designated electrical/electronic path 402 and 452 in each respective coupled unit, CU, the spring-type elastic reversible transitions between contracted and expanded, or, between expanded and contracted, linear conformational states of an at least one substantially elastic molecular linker, ML", included in each exemplary synthetic molecular assembly, SMA, operatively (electronically) coupled to selected unit, U, are exploited for dynamically controlling changes in molecular conductivity in each respective electronic circuit U.

In each system 400 and 450, illustrated in FIGS. 13 and 14, respectively, the synthetic molecular assembly, SMA, corresponds to a slight modification of the type of synthetic molecular assembly, SMA, previously described above and illustrated in FIG. 5, wherein the body 86 of the axial bidentate ligand, AL, is a substantially elastic molecular linker, ML", having body 86, and, having two ends 88 and 90 each chemically bonded to a single end 92 and 94, respectively, of the axial bidentate ligand, AL, and, a first substantially rigid molecular linker, ML, having a body 96, and, having two ends 98 and 100 each chemically bonded to a single corresponding complexing group, CG and CG', respectively, and, a second substantially rigid molecular linker, ML', having a body 102, and, having two ends 104 and 106 each chemically bonded to a single corresponding complexing group, CG and CG', respectively.

In selected unit, U, that is, in electronic circuit U, of each system 400 and 450, illustrated in FIGS. 13 and 14, respectively, voltage source, V, generates either a DC or AC applied potential, having an amplitude in the range of from about −10 V to about +10 V, and, preferably, in a range of from about −2 V to about +2 V. First and second electrodes, $E_1$ and $E_2$, in each electronic circuit U, each has a conducting surface area in a range of on the order of from $nm^2$ to $cm^2$.

In each system 400 and 450, operatively coupling or binding each respective synthetic molecular assembly, SMA, via binding sites, BS and BS', each preferably structured and functioning as a type of molecular conducting wire previously described above, to second and first electrodes, $E_2$ and $E_1$, respectively, of selected unit, U, that is, electronic circuit U, for forming coupled unit, CU, is performed by using at least one of the previously described preferred physical coupling mechanisms and/or at least one of the previously described preferred chemical coupling mechanisms. A few specific examples of such types of coupling mechanisms are electrical and/or electronic types of physical coupling mechanisms combined or integrated with at least one chemical coupling mechanism selected from the group consisting of covalent types of chemical bonding, coordinative types of chemical bonding, ionic types of chemical bonding, hydrogen types of chemical bonding, and, Van der Waals types of chemical bonding.

Accordingly, binding sites, BS and BS', each structured and functioning as a type of molecular conducting wire, provide efficient electrical/electronic operative coupling or connection between components, such as complexing groups, CG and CG', or, axial ligands, AL' and AL", of the synthetic molecular assembly, SMA, and, second and first electrodes, $E_2$ and $E_1$, respectively, of selected unit, U, that is, electronic circuit U, of systems 400 and 450, as illustrated in FIGS. 13 and 14, respectively, whereby at least one of the phenomena of electrical conductance, electronic conductance, and electronic tunneling, occurs between the binding sites, BS and BS', and electrodes, $E_2$ and $E_1$, respectively, of selected unit, U.

In an alternative embodiment of each system 400 and 450, selected unit, U, that is, electronic circuit U, includes a third electrode, $E_3$ (not shown in FIGS. 13 and 14), which is operatively coupled, via at least one component, for example, via an additional binding site, BS" (not shown in FIGS. 13 and 14), preferably structured and functioning as a type of molecular conducting wire previously described above, to a designated synthetic molecular assembly, SMA. In such an alternative embodiment, the third electrode, $E_3$, features structure and function for being electrically connected to an electrical/electronic or electrochemical type of activating mechanism, AM, of the synthetic molecular spring device.

In each system 400 and 450, each binding site, BS, BS', and optional BS", structured and functioning as a type of molecular conducting wire, is preferably a chemical entity selected from the group consisting of nanotubes, poly-conjugated polymers, DNA templated gold or silver conducting wires, poly-aromatic molecules, substituted poly-aromatic molecules, and, substituted poly-aromatic molecules including at least one thiol functional group.

In the embodiment of system 400, shown in FIG. 13, in coupled unit, CU, being electronic circuit U operatively (electronically) coupled to exemplary synthetic molecular assembly, SMA, the designated electrical/electronic path (dashed/dotted line path 402), along which the dynamically controllable change in molecular conductivity takes place, features the binding site, BS, the complexing group, CG, the atom, M, the axial bidentate ligand, AL, whose body 86 is the substantially elastic molecular linker, ML", the atom, M', the complexing group, CG', and, the binding site, BS'. The configuration or arrangement of these components is preferably structured and functions as a molecular conducting medium. First and second substantially rigid molecular linkers, ML and ML', are each selected to be electrically/electronically insulating and highly rigid compared to the substantially elastic molecular linker, ML". The complexing groups, CG and CG', the atoms, M, and M', the axial bidentate ligand, AL, and, the binding sites, BS and BS', are each selected for optimizing electrical/electronic charge flow along designated electrical/electronic path 402 in coupled unit, CU.

In the embodiment of system 450, shown in FIG. 14, the synthetic molecular assembly, SMA, additionally includes two chemical connectors, CC and CC', each chemically connecting a single corresponding complexing group, CG and CG', respectively, to an additionally included corresponding axial monodentate ligand, AL' and AL", respectively, which in turn are each chemically connected to a corresponding binding site, BS and BS', respectively, and to a corresponding atom, M and M', respectively. The chemical connectors, CC and CC', are structured and function for constraining the atom-axial ligand pairs, M-AL' and M'-AL", respectively, for example, from undesired dissociation. These additionally included and chemically connected components of the synthetic molecular assembly, SMA, are structured and function for operatively coupling or binding each respective synthetic molecular assembly, SMA, to electrodes, $E_2$ and $E_1$, respectively, of selected unit, U, that is, electronic circuit U, according to at least one of the previously described physical, chemical, and/or physicochemical, coupling mechanisms, for forming coupled unit, CU.

In the embodiment of system 450, shown in FIG. 14, in coupled unit, CU, being electronic circuit U operatively (electronically) coupled to exemplary synthetic molecular assembly, SMA, the designated electrical/electronic path (dashed/dotted line path 452), along which the dynamically controllable change in molecular conductivity takes place, features the binding site, BS, the axial monodentate ligand, AL', the atom, M, the axial bidentate ligand, AL, whose body 86 is the substantially elastic molecular linker, ML", the atom, M', the axial monodentate ligand, AL", and, the binding site, BS'. The configuration or arrangement of these components is preferably structured and functions as a molecular conducting medium. First and second substantially rigid molecular linkers, ML and ML', are each selected to be electrically/electronically insulating and highly rigid compared to the substantially elastic molecular linker, ML". The complexing groups, CG, and CG', the atoms, M, and M', the axial bidentate ligand, AL, the axial monodentate ligands, AL' and AL", and, the binding sites, BS and BS', are each selected for optimizing electrical/electronic charge flow along designated electrical/electronic path 452 in coupled unit, CU.

In general, in each system 400 and 450, illustrated in FIGS. 13 and 14, respectively, activating mechanism, AM, is any type of activating mechanism, AM, previously listed above in the description of structure/function of the generalized synthetic molecular spring device of the present invention, sending the activating signal, AS/AS', being for example, a laser light electromagnetic signal, an electrical signal, an electronic signal, a chemical signal, or an electro-chemical signal, directed at coupled unit, CU. In each system 400 and 450, activating mechanism, AM, is preferably a laser light source with high repetition pulse rate. For example, a picosecond diode laser, operating at a repetition rate, that is, being turned on and off, in a range of from on the order of Hz to on the order of MHz, and preferably, for fast triggering, operating at a repetition rate of 40 MHz, with an accuracy of plus/minus 3 nm, and, with a wavelength in a range of from about 350 nm to about 570 nm, or, with a wavelength in a range of from about 700 nm to about 800 nm, preferably, in a range of from about 420 nm to about 450 nm.

With reference to the synthetic molecular assembly, SMA, previously described above and illustrated in FIG. 5, in each system 400 and 450, illustrated in FIGS. 13 and 14, respectively, during operation, following activating mechanism, AM, for example, a laser light source, sending an activating signal, AS/AS', that is, electromagnetic radiation, to at least one predetermined atom-axial ligand pair 82 and 84 of synthetic molecular assembly, SMA, of coupled unit, CU, for physicochemically modifying the at least one predetermined atom-axial ligand pair 82 and 84, there is activating at least one cycle of spring-type elastic reversible transitions between expanded and contracted linear conformational states, (B) and (A), respectively, of the substantially elastic molecular linker, ML", of the synthetic molecular assembly, SMA, of coupled unit, CU, thereby causing a dynamically controllable change in the system property of electronic behavior, relating to molecular conductivity, exhibited by selected unit, U, that is, electronic circuit U, of each respective system 400 and 450.

In each system 400 and 450, illustrated in FIGS. 13 and 14, respectively, again with reference to FIG. 5, in the initial, expanded linear conformational state (B), the substantially elastic molecular linker, ML", being the body 86 of the axial bidentate ligand, AL, of the synthetic molecular assembly, SMA, is expanded or stretched, due to the atom-axial ligand pair 82, M-AL, bonding interaction, and the atom-axial ligand pair 84, M'-AL, bonding interaction. When activating mechanism, AM, is set on, for sending activating signal, AS/AS', to at least one predetermined atom-axial ligand pair 82 and 84 of synthetic molecular assembly, SMA, at least one of the M-AL and M'-AL bonds is broken, leading to the contracted state (A) of the ML". This causes the molecular conductivity along each designated electrical/electronic path 402 and 452, in each respective coupled unit, CU, to be temporarily modified, that is, dynamically changed in a controllable manner.

Implementation of systems 400 and 450, according to the present invention, are commercially applicable to a wide variety of different applications, as previously stated above when describing the additional advantages and benefits of the present invention. A few specifically notable examples of implementing systems 400 and 450, according to the present invention, are whereby the synthetic molecular assemblies, SMAs, are incorporated into integrated circuits, semiconductor chips, electronic sensors, and molecular electronic components, mechanisms, devices, and systems.

Figure 15:
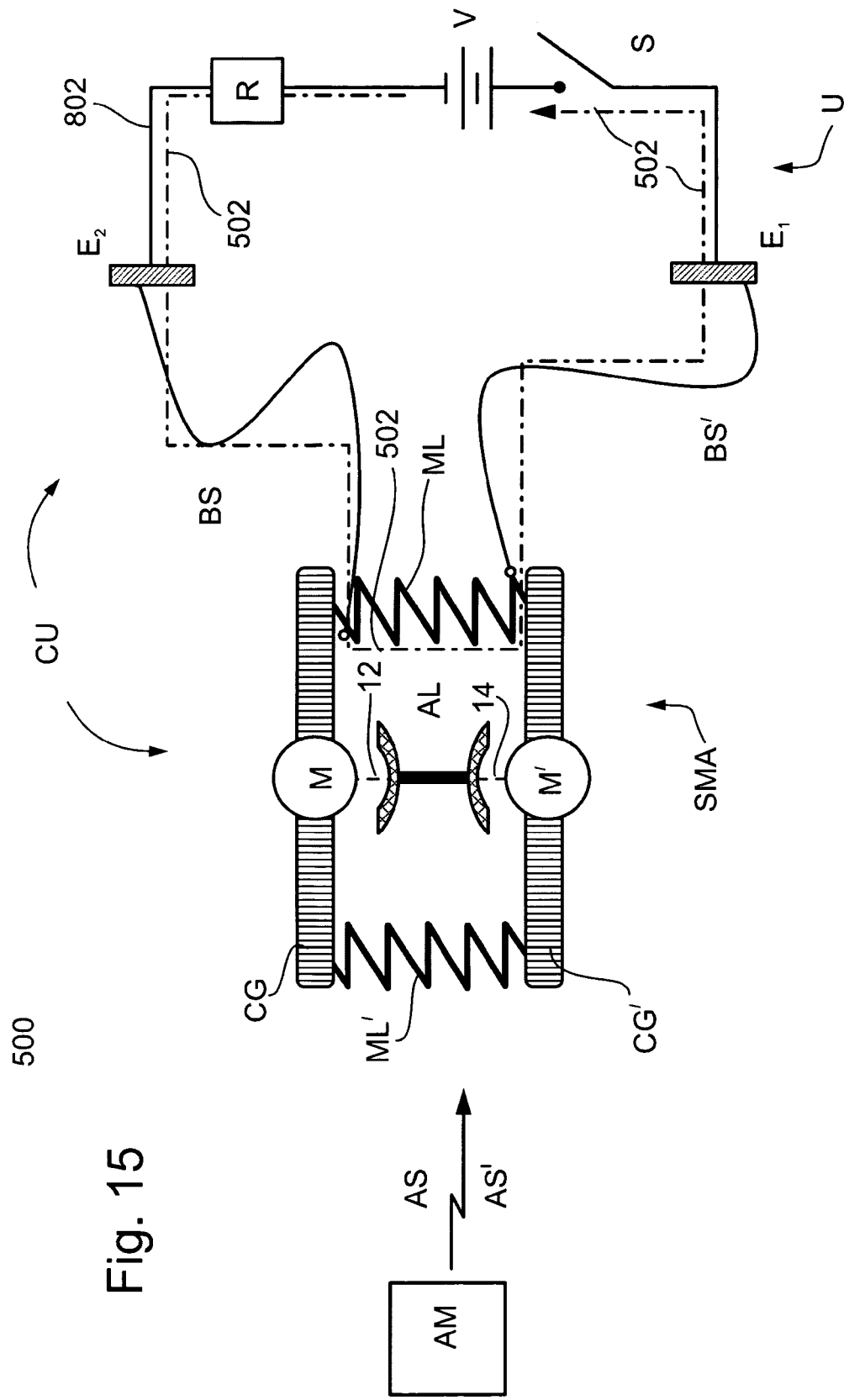
FIG. 15 is a schematic diagram illustrating a side view of a third exemplary preferred embodiment of the system including the synthetic molecular spring device used for dynamically controlling the system property of electronic behavior, as relating to molecular conductivity, in accordance with the present invention.
Figure 16:
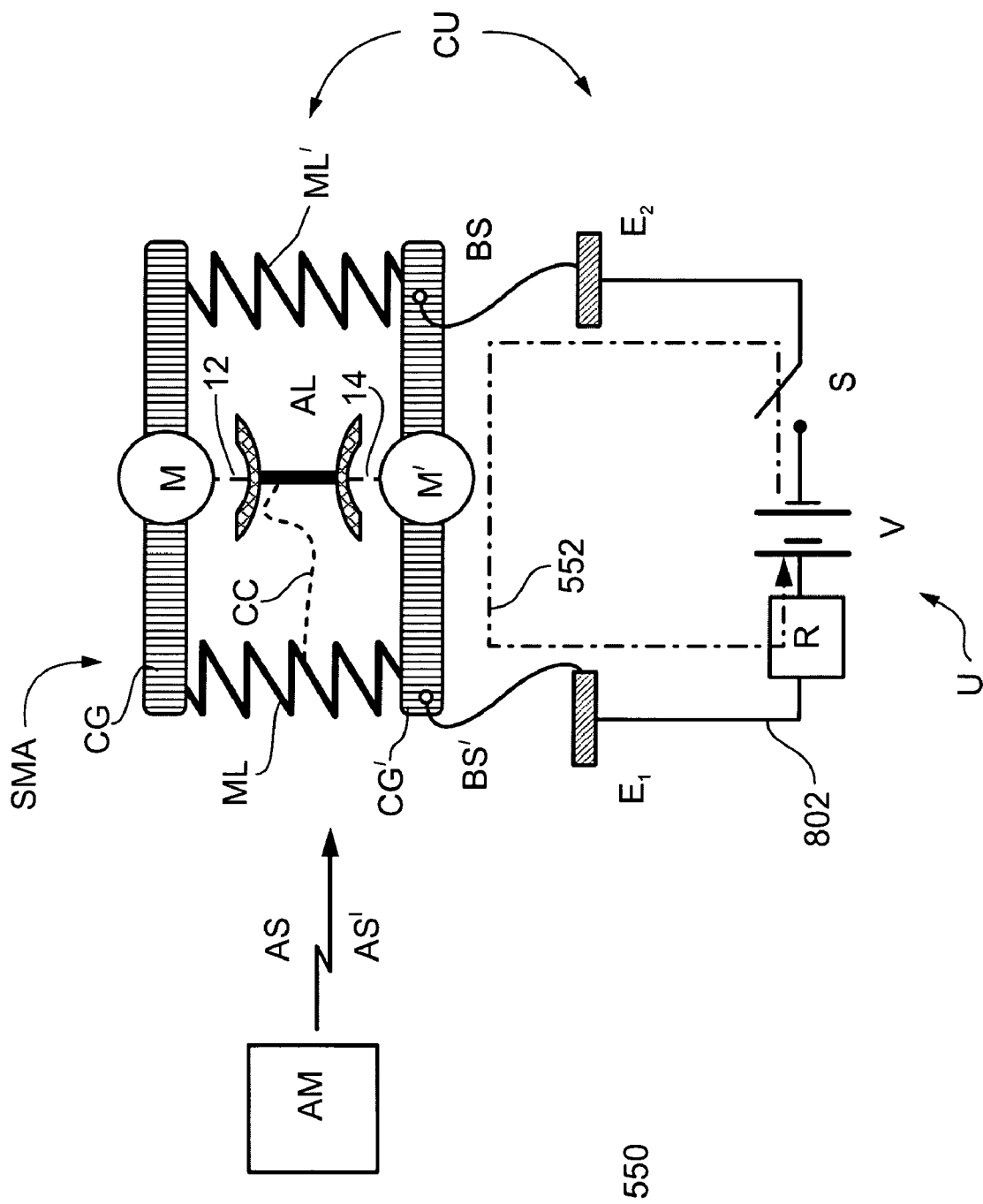
FIG. 16 is a schematic diagram illustrating a side view of a fourth exemplary preferred embodiment of the system including the synthetic molecular spring device used for dynamically controlling the system property of electronic behavior, as relating to molecular conductivity, in accordance with the present invention.

The following two specific exemplary preferred embodiments, illustrated in FIGS. 15 and 16, of implementing the method and corresponding system thereof, using a synthetic molecular spring device in the system for dynamically controlling the system property of electronic behavior, as relating to molecular conductivity, demonstrate application of the synthetic molecular assembly, SMA, to the field of molecular electronics, in general, and as an electromechanical molecular modulator, such as a molecular actuator, a molecular amplifier, or, a molecular attenuator, in an electronic circuit, in particular.

FIGS. 15 and 16 are schematic diagrams illustrating a side view of a third and fourth exemplary preferred embodiment of the system, generally referred to as system 500 and 550, respectively, including the synthetic molecular spring device used for dynamically controlling the system property of electronic behavior, as relating to molecular conductivity.

In each of these embodiments of the present invention, activation of the synthetic molecular assembly, SMA, by activating mechanism, AM, results in a dynamically controllable change in the system property of electronic behavior, as relating to molecular conductivity, exhibited by selected unit, U, that is, electronic circuit U, of system 500 and 550, illustrated in FIGS. 15 and 16, respectively. Specifically, the dynamically controllable change in molecular conductivity takes place along a designated electrical/electronic path (indicated in FIGS. 15 and 16 by the dashed/dotted line path 502 and 552, respectively) in each respective coupled unit, CU, being electronic circuit U operatively (electronically) coupled to each exemplary synthetic molecular assembly, SMA. More specifically, along designated electrical/electronic path 502 and 552 in each respective coupled unit, CU, the spring-type elastic reversible transitions between contracted and expanded, or, between expanded and contracted, linear conformational states of at least one of the two molecular linkers, ML and ML', included in each exemplary synthetic molecular assembly, SMA, operatively (electronically) coupled to selected unit, U, are exploited for dynamically controlling changes in molecular conductivity in each respective electronic circuit U.

In each system 500 and 550, illustrated in FIGS. 15 and 16, respectively, the synthetic molecular assembly, SMA, corresponds to a slight modification of the type of synthetic molecular assembly, SMA, previously described above and illustrated in FIG. 1.

In selected unit, U, that is, in electronic circuit U, of each system 400 and 450, illustrated in FIGS. 13 and 14, respectively, voltage source, V, generates either a DC or AC applied potential, having an amplitude in the range of from about −10 V to about +10 V, and, preferably, in a range of from about −2 V to about +2 V. First and second electrodes, $E_1$ and $E_2$, in each electronic circuit U, each has a conducting surface area in a range of on the order of from $nm^2$ to $cm^2$.

In each system 500 and 550, operatively coupling or binding each respective synthetic molecular assembly, SMA, via binding sites, BS and BS', each preferably structured and functioning as a type of molecular conducting wire previously described above, to second and first electrodes, $E_2$ and $E_1$, respectively, of selected unit, U, that is, electronic circuit U, for forming coupled unit, CU, is performed by using at least one of the previously described preferred physical coupling mechanisms and/or at least one of the previously described preferred chemical coupling mechanisms. A few specific examples of such types of coupling mechanisms are electrical and/or electronic types of physical coupling mechanisms combined or integrated with at least one chemical coupling mechanism selected from the group consisting of covalent types of chemical bonding, coordinative types of chemical bonding, ionic types of chemical bonding, hydrogen types of chemical bonding, and, Van der Waals types of chemical bonding.

Accordingly, binding sites, BS and BS', each structured and functioning as a type of molecular conducting wire, provide efficient electrical/electronic operative coupling or connection between components, such as molecular linker, ML, or, complexing group, CG', of the synthetic molecular assembly, SMA, and, second and first electrodes, $E_2$ and $E_1$, respectively, of selected unit, U, that is, electronic circuit U, of systems 500 and 550, as illustrated in FIGS. 15 and 16, respectively, whereby at least one of the phenomena of electrical conductance, electronic conductance, and electronic tunneling, occurs between the binding sites, BS and BS', and electrodes, $E_2$ and $E_1$, respectively, of selected unit, U.

In an alternative embodiment of each system 500 and 550, selected unit, U, that is, electronic circuit U, includes a third electrode, $E_3$ (not shown in FIGS. 15 and 16), which is operatively coupled, via at least one component, for example, via a an additional binding site, BS" (not shown in FIGS. 15 and 16), preferably structured and functioning as a type of molecular conducting wire previously described above, of a designated synthetic molecular assembly, SMA, to the designated synthetic molecular assembly, SMA. In such an alternative embodiment, the third electrode, $E_3$, features structure and function for being electrically connected to an electrical/electronic or electrochemical type of activating mechanism, AM, of the synthetic molecular spring device.

In each system 500 and 550, each binding site, BS, BS', and optional BS", structured and functioning as a type of molecular conducting wire, is preferably a chemical entity selected from the group consisting of nanotubes, poly-conjugated polymers, DNA templated gold or silver conducting wires, poly-aromatic molecules, substituted poly-aromatic molecules, and, substituted poly-aromatic molecules including at least one thiol functional group.

In the embodiment of system 500, shown in FIG. 15, in coupled unit, CU, being electronic circuit U operatively (electronically) coupled to exemplary synthetic molecular assembly, SMA, the designated electrical/electronic path (dashed/dotted line path 502), along which the dynamically controllable change in molecular conductivity takes place, features the binding site, BS, the substantially elastic molecular linker, ML, and, the binding site, BS'. Each of these components is structured and functions as a molecular conductor, preferably, as a type of molecular conducting wire previously described above, and selected for optimizing electrical/electronic charge flow along designated electrical/electronic path 502 in coupled unit, CU.

In the embodiment of system 550, shown in FIG. 16, in coupled unit, CU, being electronic circuit U operatively (electronically) coupled to exemplary synthetic molecular assembly, SMA, the designated electrical/electronic path (dashed/dotted line path 552), along which the dynamically controllable change in molecular conductivity takes place, features the binding site, BS, the complexing group, CG', the atom, M', and, the binding site, BS'. Each of these components is structured and functions as a molecular conductor, preferably, as a type of molecular conducting wire previously described above, and selected for optimizing electrical/electronic charge flow along designated electrical/electronic path 552 in coupled unit, CU.

In general, in each system 500 and 550, illustrated in FIGS. 15 and 16, respectively, activating mechanism, AM, is any type of activating mechanism, AM, previously listed above in the description of structure/function of the generalized synthetic molecular spring device of the present invention, sending the activating signal, AS/AS', being for example, a laser light electromagnetic signal, an electrical signal, an electronic signal, a chemical signal, or an electro-chemical signal, directed at coupled unit, CU. In each system 500 and 550, activating mechanism, AM, is preferably a laser light source with high repetition pulse rate. For example, a picosecond diode laser, operating at a repetition rate, that is, being turned on and off, in a range of from on the order of Hz to on the order of MHz, and preferably, for fast triggering, operating at a repetition rate of 40 MHz, with an accuracy of plus/minus 3 nm, and, with a wavelength in a range of from about 350 nm to about 570 nm, or, with a wavelength in a range of from about 700 nm to about 800 nm, preferably, in a range of from about 420 nm to about 450 nm.

With reference to the synthetic molecular assembly, SMA, previously described above and illustrated in FIG. 1, in each system 500 and 550, illustrated in FIGS. 15 and 16, respectively, during operation, following activating mechanism, AM, for example, a laser light source, sending an activating signal, AS/AS', that is, electromagnetic radiation, to at least one predetermined atom-axial ligand pair 12 and 14 of synthetic molecular assembly, SMA, of coupled unit, CU, for physicochemically modifying the at least one predetermined atom-axial ligand pair 12 and 14, there is activating at least one cycle of spring-type elastic reversible transitions between contracted and expanded linear conformational states, (A) and (B), respectively, of at least one of the two molecular linkers, ML and ML', of the synthetic molecular assembly, SMA, of coupled unit, CU, thereby causing a dynamically controllable change in the system property of electronic behavior, relating to molecular conductivity, exhibited by selected unit, U, that is, electronic circuit U, of each respective system 500 and 550.

In each system 500 and 550, illustrated in FIGS. 15 and 16, respectively, again with reference to FIG. 1, initially, the two molecular linkers, ML and ML', of the synthetic molecular assembly, SMA, are in a contracted linear conformational state (A), due to the atom-axial ligand pair 12, M-AL, bonding interaction, and the atom-axial ligand pair 14, M'-AL, bonding interaction. When activating mechanism, AM, is set on, for sending activating signal, AS/AS', to at least one predetermined atom-axial ligand pair 12 and 14 of synthetic molecular assembly, SMA, at least one of the M-AL and M'-AL bonds is broken, leading to an expanded linear conformational state (B) of at least one of the two molecular linkers, ML and ML'. This causes the molecular conductivity along each designated electrical/electronic path 502 and 552, in each respective coupled unit, CU, to be temporarily modified, that is, dynamically changed in a controllable manner.

Implementation of systems 500 and 550, according to the present invention, are commercially applicable to a wide variety of different applications, as previously stated above when describing the additional advantages and benefits of the present invention. A few specifically notable examples of implementing systems 500 and 550, according to the present invention, are whereby the synthetic molecular assemblies, SMAs, are incorporated into integrated circuits, semiconductor chips, electronic sensors, and molecular electronic components, mechanisms, devices, and systems.

The previously described two specific exemplary preferred embodiments, illustrated in FIGS. 15 and 16, of implementing the method and corresponding system thereof, according to the present invention, using a synthetic molecular spring device in the system for dynamically controlling the system property of electronic behavior, as relating to molecular conductivity, demonstrate application of the synthetic molecular assembly, SMA, to the field of molecular electronics, in general, and as an electromechanical molecular modulator, such as a molecular actuator, a molecular amplifier, or, a molecular attenuator, in an electronic circuit, in particular.

The concept of an electromechanical molecular amplifier is described by Joachim et al., "An Electromechanical Amplifier Using A Single Molecule", Chemical Physics Letters, 265, 353-357, 1997. As disclosed by Joachim et al., a fullerene molecule is used as a quantum dot (QD), and a metallic STM (scanning tunneling microscope) tip is used in order to apply mechanical forces on the fullerene molecule, thereby causing structural deformation and changing the energy gap of the fullerene molecule, and therefore, of the quantum dot.

In the art, a quantum dot (QD) is commonly referred to as a collection of free electrons confined to a small volume of semiconductor-like material. A QD can be, for example, a molecule with π-electrons, whereby the cloud of π-electrons is confined to the molecular π electronic system. Aside from fullerene and fullerene type molecules, exemplary quantum dots are porphyrin macrocycle molecules, or π conjugated aromatic molecules. Such molecules usually have a HOMO-LUMO energy gap, or a SOMO-LUMO energy gap, where the terms HOMO, LUMO, and SOMO, are the well known acronyms for highest occupied molecular orbital, lowest unoccupied molecular orbital, and semi-occupied molecular orbital, respectively.

Attempts, aside from that disclosed by Joachim et al., for providing an electro-mechanical molecular amplifier are known in the prior art, however, they are impracticable for implementing in commercial applications, primarily, because they lack inherently simple dynamic control of the desired system property or parameter at the molecular level.

Exemplary implementation of previously described embodiments of systems 500 and 550, according to the present invention, is whereby the synthetic molecular spring device is used as a molecular level modulator or actuator that utilizes the multi-parametric controllable spring-type elastic reversible function, structure, and behavior, of the synthetic molecular assembly, SMA, in order to modulate electronic configuration and properties of a quantum dot (QD).

In the embodiment of system 500, shown in FIG. 15, in coupled unit, CU, being electronic circuit U operatively (electronically) coupled to exemplary synthetic molecular assembly, SMA, electronic configuration and properties of the substantially elastic molecular linker, ML, functioning as an exemplary quantum dot (QD), included in designated electrical/electronic path 502, and therefore, electronic configuration and properties exhibited by selected unit, U, that is, electronic circuit U, are modulated by operation of the synthetic molecular assembly, in particular, and, by operation of the synthetic molecular spring device, in general.

Specifically, following activating mechanism, AM, for example, a laser light source, sending an activating signal, AS/AS', that is, electromagnetic radiation, to at least one predetermined atom-axial ligand pair 12 and 14 of synthetic molecular assembly, SMA, of coupled unit, CU, for physicochemically modifying the at least one predetermined atom-axial ligand pair 12 and 14, there is activating at least one cycle of spring-type elastic reversible transitions between contracted and expanded linear conformational states, (A) and (B), respectively, of the molecular linker, ML, of the synthetic molecular assembly, SMA, of coupled unit, CU. This process causes a dynamically controllable change in the electronic structure and properties of the substantially elastic molecular linker, ML, functioning as an exemplary quantum dot (QD), included in designated electrical/electronic path 502, and therefore, causes a dynamically controllable change in the system property of electronic behavior, relating to molecular conductivity, exhibited by selected unit, U, that is, electronic circuit U in system 500.

The dynamically controllable change in the electronic structure and properties of the substantially elastic molecular linker, ML, functioning as an exemplary quantum dot (QD), is primarily in terms of molecular orbital degeneracy lifting, and/or, modulation of the configuration and amplitude of the HOMO-LUMO electronic gap of the substantially elastic molecular linker, ML, which are driven by the spring-type elastic reversible transitions between contracted and expanded linear conformational states, (A) and (B), respectively, of the molecular linker, ML.

In related alternative embodiments of the present invention, there is modulating the configuration and amplitude of the HOMO-LUMO electronic gap of at least one complexing group-atom, CG-M, complex, of the synthetic molecular assembly, SMA, which is part of an operatively (electronically) coupled unit, CU, according to interaction of the atom, M, with the axial ligand, AL, as part of a predetermined atom-axial ligand pair of the synthetic molecular assembly, SMA, by inducing molecular level structural deformation, ligand-field effects, or related effects, in the synthetic molecular assembly, SMA, of the synthetic molecular spring device.

For example, in the embodiment of system 550, shown in FIG. 16, in coupled unit, CU, being electronic circuit U operatively (electronically) coupled to exemplary synthetic molecular assembly, SMA, electronic configuration and properties of the complexing group-atom, CG'-M', complex, functioning as an exemplary quantum dot (QD), included in designated electrical/electronic path 552, and therefore, electronic configuration and properties exhibited by selected unit, U, that is, electronic circuit U, are dynamically changed or modulated by operation of the synthetic molecular assembly, in particular, and, by operation of the synthetic molecular spring device, in general.

Specifically, following activating mechanism, AM, for example, a laser light source, sending an activating signal, AS/AS', that is, electromagnetic radiation, to the predetermined atom-axial ligand pair 14 of synthetic molecular assembly, SMA, of coupled unit, CU, for physicochemically modifying the predetermined atom-axial ligand pair 14, there is activating at least one cycle of spring-type elastic reversible transitions between contracted and expanded linear conformational states, (A) and (B), respectively, of at least one of the two molecular linkers, ML and ML', of the synthetic molecular assembly, SMA, of coupled unit, CU. This process causes a dynamically controllable change in the electronic configuration and properties of the complexing group-atom, CG'-M', complex, functioning as an exemplary quantum dot (QD), included in designated electrical/electronic path 552, and therefore, causes a dynamically controllable change in the system property of electronic behavior, relating to molecular conductivity, exhibited by selected unit, U, that is, electronic circuit U in system 550.

The dynamically controllable change in the electronic structure and properties of the complexing group-atom, CG'-M', complex, functioning as an exemplary quantum dot (QD), is primarily in terms of molecular orbital degeneracy lifting, and/or, modulation of the configuration and amplitude of the HOMO-LUMO electronic gap of the complexing group-atom, CG'-M', complex, which are driven by the spring-type elastic reversible transitions between contracted and expanded linear conformational states, (A) and (B), respectively, of the at least one of the two molecular linkers, ML and ML'.

More specifically, in the embodiment of system 550, the spring-type elastic reversible transitions between contracted and expanded linear conformational states, (A) and (B), respectively, of the at least one of the two molecular linkers, ML and ML', modulates the interaction of the axial ligand, AL, with the atom, M', of the complexing group-atom, CG'-M', complex, with a well defined temporal and spatial resolution, according to the particular characteristics of activating signal, AS/AS', sent by activating mechanism, AM, of the synthetic molecular spring device. In particular, dynamically changing or modulating the interaction of the axial ligand, AL, with the atom, M', of the complexing group-atom, CG'-M', complex, in a controllable manner is effected by using the previously indicated selected exemplary operating parameters of the activating mechanism, AM, of (1) magnitude, intensity, amplitude, or strength, (2) frequency, (3) time or duration, (4) repeat rate or periodicity, and, (5) switching rate, that is, switching from one, for example, the first, complementary level, AS, to another, for example, the second, complementary level, AS', or, vice versa, of the particular general complementary level of the activating signal directed and sent to the predetermined reversibly physicochemically paired, atom-axial ligand pair 14.

In the embodiment of system 550, the dynamically controllable change in the electronic structure and properties of the complexing group-atom, CG'-M', complex, functioning as an exemplary quantum dot (QD), in terms of molecular orbital degeneracy lifting, and/or, modulation of the configuration and amplitude of the HOMO-LUMO electronic gap of the complexing group-atom, CG'-M', complex, is due to structural and electronic effects being different for the contracted and expanded linear conformational states, (A) and (B), of the synthetic molecular assembly, SMA. The complexing group-atom, CG'-M', complex, whose atom, M', interacts with the axial ligand, AL, as part of the predetermined atom-axial ligand pair 14, exhibits different structural and electronic properties in the contracted linear conformational state, (A), relative to the structural and electronic properties exhibited by the complexing group-atom, CG'-M', complex, in the expanded linear conformational state, (B).

Particularly applicable to the embodiment of system 550, is that the applied electrical potential needed to induce charge flow between the electrodes, $E_2$ and $E_1$, depends upon the nature of the physicochemical interaction of the axial ligand, AL, with the atom, M', of the complexing group-atom, CG'-M', complex, with respect to structural and electronic effects of these components of the synthetic molecular assembly, SMA.

Moreover, the particular chemical type, structural geometrical configuration or form, and dimensions, of the complexing group, CG', the atom, M', and the axial ligand, AL, are selected whereby the dissociation/association interaction between the axial ligand, AL, and the atom, M', which is triggered or activated by activating signal, AS/AS', sent by activating mechanism, AM, of the synthetic molecular spring device, dynamically changes or modulates, in a controllable manner, the electronic structure and properties of the complexing group-atom, CG'-M', complex, functioning as an exemplary quantum dot (QD), in terms of molecular orbital degeneracy lifting, and/or, modulation of the configuration and amplitude of the HOMO-LUMO electronic gap of the complexing group-atom, CG'-M', complex.

This controllable dynamical change or modulation of the electronic configuration and properties of the complexing group-atom, CG'-M', complex, is achieved by the fact that breaking the atom-axial ligand pair 12, M-AL, bonding interaction allows the axial ligand, AL, to temporarily bind with higher affinity to the atom, M', as a result of mechanical stress relief. More specifically, in the initial contracted linear conformational state, (A), of the synthetic molecular assembly, SMA, the axial ligand, AL, is bound at two ends by the atoms, M and M', during which the two molecular linkers, ML and ML', are contracted, due to the atom-axial ligand pair 12, M-AL, bonding interaction, and the atom-axial ligand pair 14, M'-AL, bonding interaction, as shown in FIG. 16.

When activating mechanism, AM, is set on, for directing and sending activating signal, AS/AS', specifically to the predetermined atom-axial ligand pair 12 of the synthetic molecular assembly, SMA, the atom-axial ligand pair 12, M-AL, bond is broken, during which the spring-type elastic reversible expansion of at least one of the two molecular linkers, ML and ML', enables the axial ligand, AL, to move closer towards the atom, M', resulting in a stronger bonding interaction to the atom, M', as a result of mechanical stress relief from the initial contracted linear conformational state, (A), thereby leading to the expanded linear conformational state, (B), of the synthetic molecular assembly, SMA.

Actual extents of time that the atom-axial ligand pair 12, M-AL, bond remains intact and remains broken, depend upon particular operation of the synthetic molecular spring device, in general, and upon particular usage of the previously indicated selected exemplary operating parameters of the activating mechanism, AM, of (1) magnitude, intensity, amplitude, or strength, (2) frequency, (3) time or duration, (4) repeat rate or periodicity, and, (5) switching rate, that is, switching from one, for example, the first, complementary level, AS, to another, for example, the second, complementary level, AS', or, vice versa, of the particular general complementary level of the activating signal directed and sent to the predetermined reversibly physicochemically paired, atom-axial ligand pair 14, and, depend upon the particular chemical type, structural geometrical configuration or form, dimensions, and elasticity, of the molecular linkers, ML and ML', in part, determining the strength of the physicochemical interaction of the axial ligand, AL, with the atom, M', of the complexing group-atom, CG'-M', complex.

During operation of the embodiment of system 550, dynamically controllable change in molecular conductivity, in terms of dynamically controlling or modulating the current or flow of charge along designated electrical/electronic path 552, between the electrodes, $E_2$ and $E_1$, in coupled unit, CU, being electronic circuit U operatively (electronically) coupled to the exemplary synthetic molecular assembly, SMA, can be considered a way of amplifying the activating signal, AS/AS', sent by activating mechanism, AM, of the synthetic molecular spring device.

In a non-limiting manner, a specific exemplary embodiment of system 550, for achieving the type of physicochemical interaction of the axial ligand, AL, with the atom, M', of the complexing group-atom, CG'-M', complex, thereby, dynamically changing or modulating, in a controllable manner, the electronic structure and properties of the complexing group-atom, CG'-M', complex, functioning as an exemplary quantum dot (QD), in terms of molecular orbital degeneracy lifting, and/or, modulation of the configuration and amplitude of the HOMO-LUMO electronic gap of the complexing group-atom, CG'-M', complex, according to the present invention, as just described, is wherein the synthetic molecular assembly, SMA, includes the atoms, M' and M', each being a metal atom selected from the group consisting of Co (II), Ni(II), and, Mg (II); the complexing groups, CG' and CG, each being a chemically modified bacteriochlorophyll; and the axial ligand, AL, is selected from the group consisting of mono- or bi-substituted 4,4' bi-pyridine axial ligands, mono- or bi-substituted pyrazine axial ligands, and derivatives thereof.

Moreover, for this specific exemplary embodiment of system 550, activating mechanism, AM, is any type of activating mechanism, AM, previously listed above in the description of structure/function of the generalized synthetic molecular spring device of the present invention, sending the activating signal, AS/AS', being for example, a laser light electromagnetic signal, an electrical signal, an electronic signal, a chemical signal, or an electro-chemical signal.

Figure 17A:
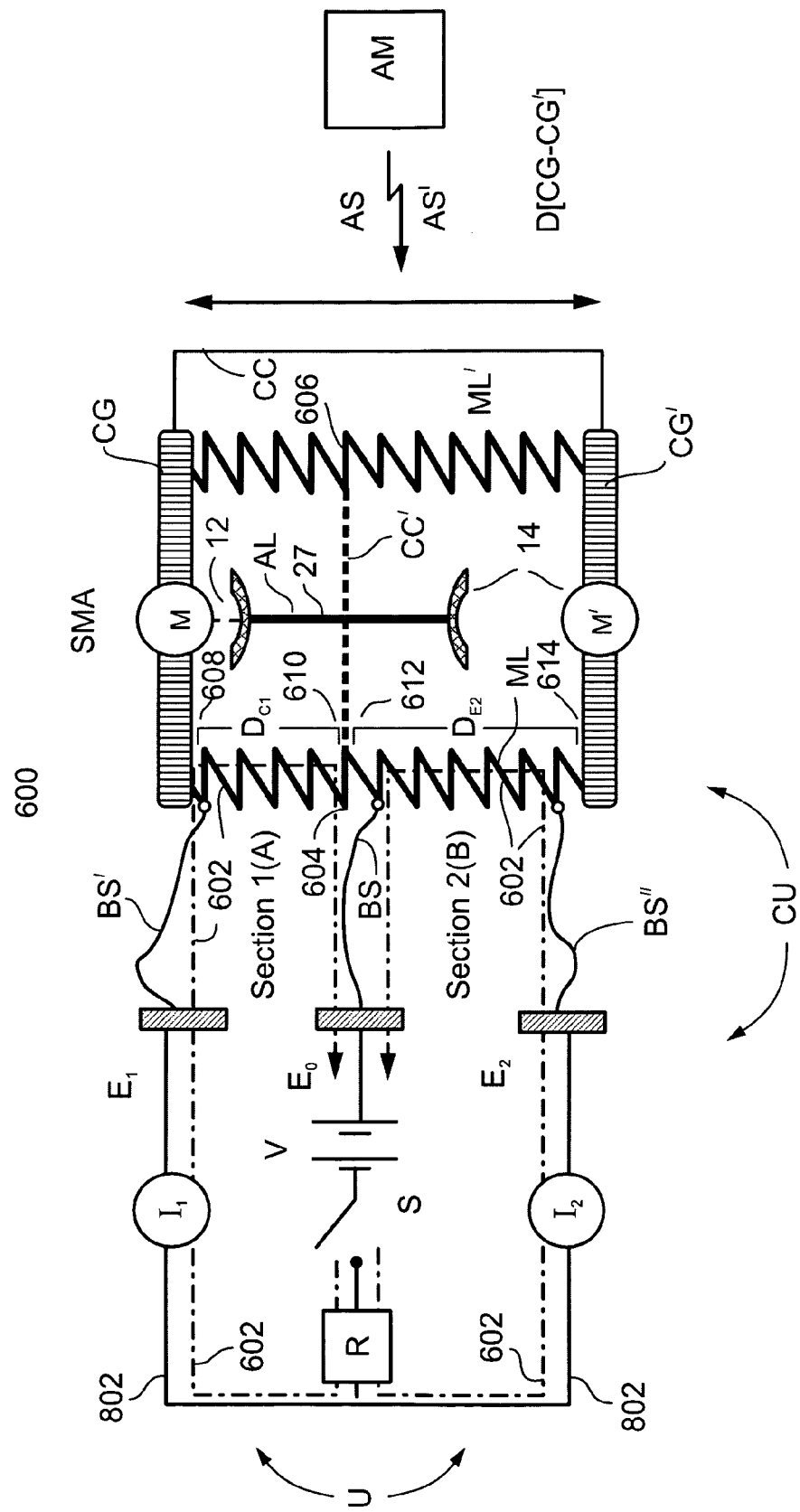
FIGS. 17A and 17B are schematic diagrams each illustrating a side view of a fifth exemplary preferred embodiment of the system including the synthetic molecular spring device used for dynamically controlling the system property of electronic behavior, as relating to electrical/electronic toggling or coupled switching, in accordance with the present invention.
Figure 17B:
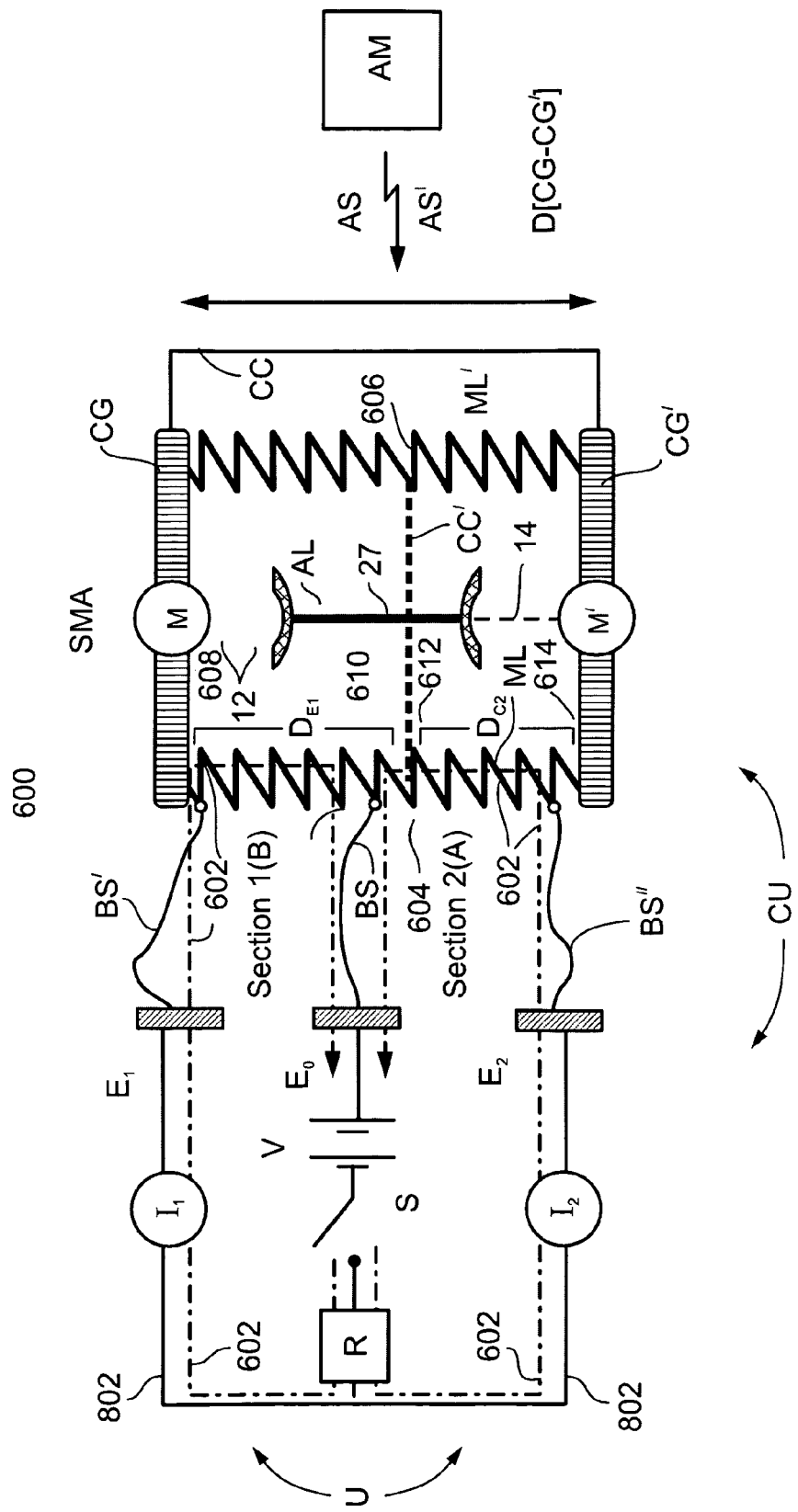

The following specific exemplary preferred embodiment, illustrated in FIGS. 17A and 17B, of implementing the method and corresponding system thereof, using a synthetic molecular spring device in the system for dynamically controlling the system property of electronic behavior, as relating to molecular conductivity, in terms of electrical/electronic toggling or coupled switching, demonstrates application of the synthetic molecular assembly, SMA, to the field of molecular electronics, in general, and as an electromechanical molecular electrical/electronic toggle or coupled switch, in an electronic circuit, in particular.

FIGS. 17A and 17B are schematic diagrams each illustrating a side view of a fifth exemplary preferred embodiment of the system, generally referred to as system 600, including the synthetic molecular spring device used for dynamically controlling the system property of electronic behavior, as relating to electrical/electronic toggling or coupled switching.

In this embodiment of the present invention, activation of the synthetic molecular assembly, SMA, by activating mechanism, AM, results in a dynamically controllable change in the system property of electronic behavior, as relating to electrical/electronic toggling or coupled switching, exhibited by selected unit, U, that is, electronic circuit U, of system 600, illustrated in FIGS. 17A and 17B. Specifically, the dynamically controllable electrical/electronic toggling or coupled switching takes place along a designated electrical/electronic path (indicated in FIGS. 17A and 17B by the dashed/dotted line path 602) in coupled unit, CU, being electronic circuit U operatively (electronically) coupled to the exemplary synthetic molecular assembly, SMA. More specifically, along designated electrical/electronic path 602 in coupled unit, CU, the spring-type elastic reversible transitions between contracted and expanded, or, between expanded and contracted, linear conformational states of sections of the molecular linker, ML, included in the exemplary synthetic molecular assembly, SMA, operatively (electronically) coupled to selected unit, U, are exploited for dynamically controlling electrical/electronic toggling or coupled switching in electronic circuit U.

In system 600, illustrated in FIGS. 17A and 17B, the synthetic molecular assembly, SMA, corresponds to a slight modification of the type of synthetic molecular assembly, SMA, previously described above and illustrated in FIG. 1, wherein the synthetic molecular assembly, SMA, the axial bidentate ligand, AL, is reversibly physicochemically paired with only one atom, M, in the form of an atom-axial ligand pair 12, instead of both atoms M and M', at a given instant of time. The axial bidentate ligand, AL, is capable of being reversibly physicochemically paired with only the second atom, M', in the form of an atom-axial ligand pair 14, at a different instant of time. The synthetic molecular assembly, SMA, additionally includes two chemical connectors, CC and CC', herein, referred to as first chemical connector, CC, and second chemical connector, CC'.

First chemical connector, CC, is structured and functions for chemically connecting the complexing group, CG, to the complexing group, CG', for substantially constraining, thereby substantially maintaining constant, the total distance extending between the complexing groups, CG and CG', herein, referred to as the inter-complexing group distance, D[CG-CG'], of the synthetic molecular assembly, SMA, as indicated in FIGS. 17A and 17B.

Second chemical connector, CC', is structured and functions for chemically connecting each of the two molecular linkers, ML and ML', to the body 27 of the axial ligand, AL, whereby each of the two molecular linkers, ML and ML', is divided into two not necessarily equal sections, section 1 and section 2, at the respective point of attachment 604 and 606 to second chemical connector, CC', as indicated in FIGS. 17A and 17B.

In the above described specific configuration of the embodiment of system 600, as illustrated in FIG. 17A, the synthetic molecular assembly, SMA, features the axial bidentate ligand, AL, reversibly physicochemically paired with the first atom, M, in the form of the atom-axial ligand pair 12, whereby section 1 of each of the two molecular linkers, ML and ML', is in a contracted linear conformational state (A), while section 2 of each of the two molecular linkers, ML and ML', is in an expanded linear conformational state (B). During operation of system 600, further described below, section 1 of each of the two molecular linkers, ML and ML', changes into an expanded linear conformational state (B), while section 2 of each of the two molecular linkers, ML and ML', changes into a contracted linear conformational state (A), whereby the synthetic molecular assembly, SMA, then features the axial bidentate ligand, AL, reversibly physicochemically paired with the second atom, M', in the form of the atom-axial ligand pair 14, as illustrated in FIG. 17B.

In the embodiment of system 600, shown in FIGS. 17A and 17B, the synthetic molecular assembly, SMA, includes binding sites, BS', BS", and, BS, each preferably structured and functioning as a type of molecular conducting wire previously described above, are for providing an efficient electrical/electronic operative coupling or connection between at least one component, for example, in a non-limiting way, as shown in FIGS. 17A and 17B, the substantially elastic molecular linker, ML, of the synthetic molecular assembly, SMA, and, first, second, and third electrodes, $E_1$, $E_2$, and $E_0$, respectively, of selected unit, U, that is, electronic circuit U. Accordingly, at least one of the phenomena of electrical conductance, electronic conductance, and electronic tunneling, occurs between the at least one component, for example, the substantially elastic molecular linker, ML, of the synthetic molecular assembly, SMA, and first, second, and third electrodes, $E_1$, $E_2$, and $E_0$, respectively, of selected unit, U, that is, electronic circuit U, In selected unit, U, that is, in electronic circuit U, of system 600, illustrated in FIGS. 17A and 17B, voltage source, V, generates either a DC or AC applied potential, having an amplitude in the range of from about −10 V to about +10 V, and, preferably, in a range of from about −2 V to about +2 V. First, second, and third electrodes, $E_1$, $E_2$, and $E_0$, in electronic circuit U, each has a conducting surface area in a range of on the order of from $nm^2$ to $cm^2$.

In system 600, operatively coupling or binding the synthetic molecular assembly, SMA, via binding sites, BS', BS", and, BS, each preferably structured and functioning as a type of molecular conducting wire previously described above, to first, second, and third electrodes, $E_1$, $E_2$, and $E_0$, respectively, of selected unit, U, that is, electronic circuit U, for forming coupled unit, CU, is performed by using at least one of the previously described preferred physical coupling mechanisms and/or at least one of the previously described preferred chemical coupling mechanisms. A few specific examples of such types of coupling mechanisms are electrical and/or electronic types of physical coupling mechanisms combined or integrated with at least one chemical coupling mechanism selected from the group consisting of covalent types of chemical bonding, coordinative types of chemical bonding, ionic types of chemical bonding, hydrogen types of chemical bonding, and, Van der Waals types of chemical bonding.

Accordingly, binding sites, BS', BS", and, BS, each structured and functioning as a type of molecular conducting wire, provide efficient electrical/electronic operative coupling or connection between components, such as molecular linker, ML, or, complexing groups, CG and CG', of the synthetic molecular assembly, SMA, and first, second, and third electrodes, $E_1$, $E_2$, and $E_0$, respectively, of selected unit, U, that is, electronic circuit U, of systems 600, as illustrated in FIGS. 17A and 17B, whereby at least one of the phenomena of electrical conductance, electronic conductance, and electronic tunneling, occurs between the binding sites, BS', BS", and, BS, and electrodes, $E_1$, $E_2$, and $E_0$, respectively, of selected unit, U.

In an alternative embodiment of system 600, selected unit, U, that is, electronic circuit U, includes a fourth electrode, $E_3$ (not shown in FIG. 17A or 17B), which is operatively coupled, via at least one component, for example, via an additional binding site, BS''' (not shown in FIGS. 17A and 17B), preferably structured and functioning as a type of molecular conducting wire previously described above, of a designated synthetic molecular assembly, SMA, to the designated synthetic molecular assembly, SMA. In such an alternative embodiment, the fourth electrode, $E_3$, features structure and function for being electrically connected to an electrical/electronic or electrochemical type of activating mechanism, AM, of the synthetic molecular spring device.

In system 600, each binding site, BS', BS", BS, and optional BS''', structured and functioning as a type of molecular conducting wire, is preferably a chemical entity selected from the group consisting of nanotubes, poly-conjugated polymers, DNA templated gold or silver conducting wires, poly-aromatic molecules, substituted poly-aromatic molecules, and, substituted poly-aromatic molecules including at least one thiol functional group.

In the embodiment of system 600, shown in FIGS. 17A and 17B, in coupled unit, CU, being electronic circuit U operatively (electronically) coupled to exemplary synthetic molecular assembly, SMA, designated electrical/electronic path 602, along which the dynamically controllable electrical/electronic toggling or coupled switching takes place, features the binding site, BS', section 1 of the substantially elastic molecular linker, ML, the binding site, BS, section 2 of the substantially elastic molecular linker, ML, and, the binding site, BS". Each of these components is structured and functions as a molecular conductor, preferably, as a type of molecular conducting wire previously described above, and selected for optimizing electrical/electronic charge flow, indicated by $I_1$ and $I_2$ in FIGS. 17A and 17B, along designated electrical/electronic path 602 in coupled unit, CU.

In an alternative embodiment of system 600, in electronic circuit U, designated electrical/electronic path 602, along which the dynamically controllable electrical/electronic toggling or coupled switching takes place, includes at least one of the complexing groups, CG and CG', whereby the corresponding at least one of the binding sites, BS' and BS", provides efficient electrical/electronic operative coupling or connection between the corresponding complexing groups, CG and CG', respectively, instead of between the substantially elastic molecular linker, ML, (as shown in FIG. 17), of the synthetic molecular assembly, SMA, and first and second electrodes, $E_1$ and $E_2$, respectively, of electronic circuit U. Accordingly, for such an alternative embodiment of system 600, each of the at least one of the complexing groups, CG and CG', is structured and functions as a molecular conductor, preferably, as a type of molecular conducting wire previously described above, and selected for optimizing electrical/electronic charge flow, $I_1$ and $I_2$, along designated electrical/electronic path 602 in coupled unit, CU.

In general, in system 600, illustrated in FIGS. 17A and 17B, activating mechanism, AM, is any type of activating mechanism, AM, previously listed above in the description of structure/function of the generalized synthetic molecular spring device of the present invention, sending the activating signal, AS/AS', being for example, a laser light electromagnetic signal, an electrical signal, an electronic signal, a chemical signal, or an electrochemical signal, directed at coupled unit, CU. In system 600, activating mechanism, AM, is preferably a laser light source with high repetition pulse rate. For example, a picosecond diode laser, operating at a repetition rate, that is, being turned on and off, in a range of from on the order of Hz to on the order of MHz, and preferably, for fast triggering, operating at a repetition rate of 40 MHz, with an accuracy of plus/minus 3 nm, and, with a wavelength in a range of from about 350 nm to about 570 nm, or, with a wavelength in a range of from about 700 nm to about 800 nm, preferably, in a range of from about 420 nm to about 450 nm.

With reference to the synthetic molecular assembly, SMA, previously described above and illustrated in FIG. 1, in system 600, illustrated in FIGS. 17A and 17B, during operation, following activating mechanism, AM, for example, a laser light source, sending an activating signal, AS/AS', that is, electromagnetic radiation, to a predetermined atom-axial ligand pair, for example, atom-axial ligand pair 12 of the synthetic molecular assembly, SMA, of coupled unit, CU, for physicochemically modifying the predetermined atom-axial ligand pair 12, there is activating at least one cycle of spring-type elastic reversible transitions between contracted and expanded linear conformational states, (A) and (B), respectively, of the substantially elastic molecular linker, ML, of the synthetic molecular assembly, SMA, of coupled unit, CU, thereby causing a dynamically controllable change in the system property of electronic behavior, relating to electrical/electronic toggling or coupled switching, exhibited by selected unit, U, that is, electronic circuit U, of system 600.

More specifically, as illustrated in FIG. 17A, initially, the synthetic molecular assembly, SMA, features the axial bidentate ligand, AL, reversibly physicochemically paired with the first atom, M, in the form of the atom-axial ligand pair 12, whereby section 1 of each of the two molecular linkers, ML and ML', is in a contracted linear conformational state (A), due to the atom-axial ligand pair 12, M-AL, bonding interaction, while section 2 of each of the two molecular linkers, ML and ML', is in an expanded linear conformational state (B). When activating mechanism, AM, is set on, for sending activating signal, AS/AS', to predetermined atom-axial ligand pair 12 of the synthetic molecular assembly, SMA, the M-AL bond is broken, during which section 1 of each of the two molecular linkers, ML and ML', changes into an expanded linear conformational state (B), while section 2 of each of the two molecular linkers, ML and ML', changes into a contracted linear conformational state (A), whereby the synthetic molecular assembly, SMA, then features the axial bidentate ligand, AL, reversibly physicochemically paired with the second atom, M', in the form of the atom-axial ligand pair 14, as illustrated in FIG. 17B. This causes the molecular conductivity of each section 1 and section 2 along designated electrical/electronic path 602 in coupled unit, CU, to be simultaneously temporarily modified, that is, dynamically changed in a controllable manner, thereby causing a dynamically controllable change in the system property of electronic behavior, relating to electrical/electronic toggling or coupled switching, exhibited by selected unit, U, that is, electronic circuit U, of system 600.

In the embodiment of system 600, shown in FIGS. 17A and 17B, the spring-type elastic reversible transition from the contracted (A) to the expanded (B) linear conformational state, or, from the expanded (B) to the contracted (A) linear conformational state, of section 1, is characterized by the parameter, herein, referred to as the molecular linker sectional inter-end effective distance change, $D_{E1}-D_{C1}$, or, $D_{C1}-D_{E1}$, respectively, indicating the sign, that is, positive or negative, respectively, and, the magnitude, of the change of the 'effective' distance, $D_1$, in the linear direction along a longitudinal axis extending between two arbitrarily selected ends of section 1, of each of the two molecular linkers, ML and ML', for example, ends 608 and 610 of section 1, of the molecular linker, ML, included in the synthetic molecular assembly, SMA, following the respective spring-type elastic reversible transition in linear conformational states. Similarly, the spring-type elastic reversible transition from the expanded (B) to the contracted (A) linear conformational state, or, from the contracted (A) to the expanded (B) linear conformational state, of section 2, is characterized by the parameter, herein, referred to as the molecular linker sectional inter-end effective distance change, $D_{C2}-D_{E2}$, or, $D_{E2}-D_{C2}$, respectively, indicating the sign, that is, positive or negative, respectively, and, the magnitude, of the change of the 'effective' distance, $D_2$, in the linear direction along a longitudinal axis extending between two arbitrarily selected ends of section 2, of each of the two molecular linkers, ML and ML', for example, ends 612 and 614 of section 2, of the molecular linker, ML, included in the synthetic molecular assembly, SMA, following the respective spring-type elastic reversible transition in linear conformational states.

For these parameters, $D_{Ci}$ refers to the molecular linker sectional inter-end effective distance, $D_i$, of section i of each of the two molecular linkers, ML and ML', in the contracted linear conformational state (A), and, $D_{Ei}$ refers to the molecular linker sectional inter-end effective distance, $D_i$, of section i of each of the two molecular linkers, ML and ML', in the expanded linear conformational state (B).

In the embodiment of system 600, shown in FIGS. 17A and 17B, the molecular linker sectional inter-end effective distance changes, $D_1$ and $D_2$, parameters, are analogous to the previously defined parameter, the molecular linker inter-end effective distance change, $D_E-D_C$, or, $D_C-D_E$, respectively, indicating the sign, that is, positive or negative, respectively, and, the magnitude, of the change in the inter-end effective distance, D, in the linear direction along a longitudinal axis extending between the two arbitrarily selected ends of either of the molecular linkers, ML and ML', for example, ends 24 and 26 of the second molecular linker, ML', following the respective spring-type elastic reversible transition in linear conformational states, as shown in FIG. 1.

With respect to operation of the embodiment of system 600, whereby the spring-type elastic reversible transitions between the conformational states of the molecular linker, ML, of the synthetic molecular assembly, SMA, cause a dynamically controllable change in the system property of electronic behavior, as relating to electrical/electronic toggling or coupled switching, exhibited by selected unit, U, being electronic circuit U, of system 600, variations of the above described parameters, molecular linker sectional inter-end effective distance changes, $D_{Ei}-D_{Ci}$, or, $D_{Ci}-D_{Ei}$, are therefore directly associated with and correlated to the extent by which the system property of electronic behavior is dynamically controllable by the synthetic molecular spring device.

Implementation of system 600, according to the present invention, is commercially applicable to a wide variety of different applications, as previously stated above when describing the additional advantages and benefits of the present invention. A few specifically notable examples of implementing system 600, according to the present invention, is whereby the synthetic molecular assemblies, SMAs, are incorporated into integrated circuits, semiconductor chips, electronic sensors, and molecular electronic components, mechanisms, devices, and systems.

The preceding five specific exemplary embodiments of the present invention, illustrated in FIGS. 13-17, are well illustrative of and completely consistent with the previously stated main aspect of novelty, inventiveness, and, commercial applicability, of the present invention, that is, of using a synthetic molecular spring device which exhibits multi-parametric controllable spring-type elastic reversible function, structure, and behavior, operable in a wide variety of different environments, for highly effectively dynamically controlling a system property, where, in the five preceding specific exemplary embodiments, being electronic behavior, of a system including the synthetic molecular spring device as one of its components.

As previously briefly indicated above, in the prior art, there are teachings of using a molecular device for controlling a system property of a system. For example, in U.S. Pat. No. 6,212,093, issued to Lindsey, there is disclosed a molecular electronic device for high-density non-volatile memory, featuring a metal porphyrin in a sandwich coordination compound, as part of a molecular system, for controlling electrical properties. However, neither Lindsey or other prior art teaches of utilizing the multi-parametric controllable spring-type elastic reversible function, structure, and behavior, exhibited by the synthetic molecular assembly included in the synthetic molecular spring device of the present invention, for dynamically controlling a system property of a system, as disclosed herein.

Thus, a significant advantage of the present invention is relatively diverse applicability of the synthetic molecular spring device for dynamically controlling a variety of very different types of system properties, such as momentum, topography, and electronic behavior.

As a direct result of this advantage, an additional advantage of the present invention is that the method and corresponding system are generally applicable to a wide variety of different technological fields and arts involving molecular level devices and systems including such molecular level devices, encompassing physics, chemistry, biology, in general, and, encompassing the various different sub-fields, combinations, and integrations thereof, in particular, involving a wide variety of different types of applications, each application featuring a system having a system property which is dynamically controllable.

More specifically, for example, in a non-limiting way, the method and corresponding system of the present invention are applicable to the technologies and arts of solid state physics, solid state chemistry, materials science, electro-active materials, photo-active materials, chemical active materials, acoustic materials, inorganic and/or organic semiconductors, integrated circuits, semiconductor chips, microelectronics, nanoelectronics, molecular electronics, robotics, chemical catalysis, biochemistry, biophysics, biophysical chemistry, biomedical chemistry, molecular biology, and, bio-mimetics.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A synthetic molecular spring device, comprising:
   (a) a synthetic molecular assembly having at least one chemical unit or module including:
      (i) at least one atom which is a cation of an element selected from the group consisting of magnesium, chromium, manganese, iron, ruthenium, osmium, cobalt, rhodium, nickel, copper, zinc, silicon, and titanium;
      (ii) at least one complexing group complexed to at least one of said at least one atom, wherein the complexing group is a macrocyclic compound selected from the group consisting of porphyrins, dihydroporphyrins and tetrahydroporphyrins;
      (iii) at least one axial ligand reversibly physicochemically paired with at least one said complexed atom via corresponding atom-axial ligand pairs, wherein said axial ligand is selected from the group consisting of imidazole, pyridine, 4-tert-butyl pyridine, 3-fluoropyridine, 1-methylimidazole, 4-picoline, 4-aminopyridine, piperidine and 4,4'-bipyridine; and
      (iv) at least one elastic molecular linker having a body and having two ends with at least one said end chemically bonded to another said component of said synthetic molecular assembly, wherein said elastic molecular linker is selected from the group consisting of alkanes, alkenes, alkynes, substituted phenyls, alcohols, ethers, phenyleneethynylenes, 1,4-substituted bicyclo[2.2.2]octanes and diethers; and
   (b) an activating mechanism operatively directed to at least one predetermined said atom-axial ligand pair, wherein following said activating mechanism sending an activating signal to said at least one predetermined atom-axial ligand pair for physicochemically modifying said at least one predetermined atom-axial ligand pair, there is activating at least one cycle of spring-type elastic reversible transitions between contracted and expanded linear conformational states, or, between said expanded and said contracted linear conformational states, of said at least one elastic molecular linker.

2. The device of claim 1, wherein a said axial ligand is a neutral compound selected from the group consisting of pyridine, imidazole, and 4,4' bipyridine.

3. The device of claim 1, wherein said activating signal has two controllable general complementary levels, each with defined amplitude and duration.

4. The device of claim 1, wherein said activating mechanism is a type of mechanism selected from the group consisting of electromagnetic mechanisms which send electromagnetic types of a said activating signal, electrical/electronic mechanisms which send electrical/electronic types of a said activating signal, chemical mechanisms which send chemical types of a said activating signal, electrochemical mechanisms which send electrochemical types of a said activating signal, magnetic mechanisms which send magnetic types of a said activating signal, acoustic mechanisms which send acoustic types of a said activating signal, photoacoustic mechanisms which send photoacoustic types of a said activating signal, and, combinations thereof which send combination types of a said activating signal.

5. The device of claim 1, wherein said activating mechanism is an electromagnetic type of activating mechanism selected from the group consisting of laser beam based activating mechanisms which send laser beam types of a said activating signals, maser beam based activating mechanisms which send maser beam types of a said activating signal, and, combinations thereof.

6. The device of claim 1, wherein a said synthetic molecular assembly is a scaled-up synthetic molecular assembly, formed by assembling and connecting a plurality of at least two said chemical units or modules of a single said synthetic molecular assembly, wherein each said chemical unit or module of said scaled-up synthetic molecular assembly includes said components and exhibits functionality of a single said chemical unit or module.

7. A system including a synthetic molecular spring device for dynamically controlling a system property, comprising:
   (a) the synthetic molecular spring device comprising:
      (i) at least one synthetic molecular assembly, each said synthetic molecular assembly featuring at least one chemical unit or module including components:
         (1) at least one atom which is a cation of an element selected from the group consisting of magnesium, chromium, manganese, iron, ruthenium, osmium, cobalt, rhodium, nickel, copper, zinc, silicon, and titanium;
         (2) at least one complexing group complexed to at least one of said at least one atom, wherein the complexing group is a macrocyclic compound selected from the group consisting of porphyrins, dihydroporphyrins and tetrahydroporphyrins;
         (3) at least one axial ligand reversibly physicochemically paired with at least one said complexed atom via corresponding atom-axial ligand pairs, wherein said axial ligand is selected from the group consisting of imidazole, pyridine, 4-tert-butyl pyridine, 3-fluoropyridine, 1-methylimidazole, 4-picoline, 4-aminopyridine, piperidine and 4,4'-bipyridine; and
         (4) at least one elastic molecular linker having a body and having two ends with at least one said end chemically bonded to another said component of said synthetic molecular assembly, wherein said elastic molecular linker is selected from the group consisting of alkanes, alkenes, alkynes, substituted phenyls, alcohols, ethers, phenyleneethynylenes, 1,4-substituted bicyclo[2.2.2]octanes and diethers; and (ii) an activating mechanism operatively directed to at least one predetermined said atom-axial ligand pair of each said synthetic molecular assembly; and (b) a selected unit of the system, said selected unit exhibits the system property which is dynamically controllable by the synthetic molecular spring device;

each said synthetic molecular assembly is operatively coupled to said selected unit, for forming a coupled unit, whereby following said activating mechanism sending an activating signal to said at least one predetermined atom-axial ligand pair of at least one said synthetic molecular assembly of said coupled unit, for physicochemically modifying said at least one predetermined atom-axial ligand pair, there is activating at least one cycle of spring-type elastic reversible transitions between contracted and expanded linear conformational states, or, between expanded and contracted linear conformational states, of said at least one substantially elastic molecular linker of said at least one said synthetic molecular assembly of said coupled unit, thereby causing a dynamically controllable change in the system property exhibited by said selected unit.

8. The system of claim 7, whereby said activating mechanism is a type of mechanism selected from the group consisting of electromagnetic mechanisms which send electromagnetic types of a said activating signal, electrical/electronic mechanisms which send electrical/electronic types of a said activating signal, chemical mechanisms which send chemical types of a said activating signal, electrochemical mechanisms which send electrochemical types of a said activating signal, magnetic mechanisms which send magnetic types of a said activating signal, acoustic mechanisms which send acoustic types of a said activating signal, photoacoustic mechanisms which send photoacoustic types of a said activating signal, and, combinations thereof which send combination types of a said activating signal.

9. A method using a synthetic molecular spring device in a system for dynamically controlling a system property, comprising the steps of:

(a) providing the synthetic molecular spring device comprising:
(i) at least one synthetic molecular assembly, each said synthetic molecular assembly featuring at least one chemical unit or module including components:
(1) at least one atom which is a cation of an element selected from the group consisting of magnesium, chromium, manganese, iron, ruthenium, osmium, cobalt, rhodium, nickel, copper, zinc, silicon, and titanium;
(2) at least one complexing group complexed to at least one of said at least one atom, wherein the complexing group is a macrocyclic compound selected from the group consisting of porphyrins, dihydroporphyrins and tetrahydroporphyrins;
(3) at least one axial ligand reversibly physicochemically paired with at least one said complexed atom via corresponding atom-axial ligand pairs, wherein said axial ligand is selected from the group consisting of imidazole, pyridine, 4-tert-butyl pyridine, 3-fluoropyridine, 1-methylimidazole, 4-picoline, 4-aminopyridine, piperidine and 4,4'-bipyridine; and
(4) at least one elastic molecular linker having a body and having two ends with at least one said end chemically bonded to another said component of said synthetic molecular assembly, wherein said elastic molecular linker is selected from the group consisting of alkanes, alkenes, alkanes, substituted phenyls, alcohols, ethers, phenyleneethynylenes, 1,4-substituted bicyclo[2.2.2]octanes and diethers; and
(ii) an activating mechanism operatively directed to at least one predetermined said atom-axial ligand pair of each said synthetic molecular assembly;

(b) selecting a unit of the system, said selected unit exhibits the system property which is dynamically controllable by the synthetic molecular spring device;

(c) operatively coupling each said synthetic molecular assembly to said selected unit, for forming a coupled unit; and (d) sending an activating signal from said activating mechanism to said at least one predetermined atom-axial ligand pair of at least one said synthetic molecular assembly of said coupled unit, for physicochemically modifying said at least one predetermined atom-axial ligand pair, for activating at least one cycle of spring-type elastic reversible transitions between contracted and expanded linear conformational states, or, between expanded and contracted linear conformational states, of said at least one elastic molecular linker of said at least one said synthetic molecular assembly of said coupled unit, thereby causing a dynamically controllable change in the system property exhibited by said selected unit.

10. The method of claim 9, whereby said activating mechanism is a type of mechanism selected from the group consisting of electromagnetic mechanisms which send electromagnetic types of a said activating signal, electrical/electronic mechanisms which send electrical/electronic types of a said activating signal, chemical mechanisms which send chemical types of a said activating signal, electrochemical mechanisms which send electrochemical types of a said activating signal, magnetic mechanisms which send magnetic types of a said activating signal, acoustic mechanisms which send acoustic types of a said activating signal, photoacoustic mechanisms which send photoacoustic types of a said activating signal, and, combinations thereof which send combination types of a said activating signal.

* * * * *